(12) United States Patent
Harumoto et al.

(10) Patent No.: US 9,372,831 B2
(45) Date of Patent: Jun. 21, 2016

(54) REMOTE STARTER

(71) Applicant: FUJITSU TEN LIMITED, Kobe-shi, Hyogo (JP)

(72) Inventors: Satoshi Harumoto, Kobe (JP); Ryuji Nishimura, Kobe (JP); Mitsuru Ohta, Kobe (JP); Itsuki Hamaue, Kobe (JP); Minoru Yoshimura, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 209 days.

(21) Appl. No.: 13/691,000

(22) Filed: Nov. 30, 2012

(65) Prior Publication Data

US 2013/0151038 A1 Jun. 13, 2013

(30) Foreign Application Priority Data

Dec. 9, 2011 (JP) ................................. 2011-270066
Dec. 9, 2011 (JP) ................................. 2011-270067
Dec. 9, 2011 (JP) ................................. 2011-270070

(51) Int. Cl.
*G06F 17/00* (2006.01)
*B60H 1/00* (2006.01)
*G07C 5/00* (2006.01)

(52) U.S. Cl.
CPC ............ *G06F 17/00* (2013.01); *B60H 1/00778* (2013.01); *G07C 5/008* (2013.01)

(58) Field of Classification Search
CPC .......... H04M 3/00; B60R 25/00; G06F 19/00; G06F 17/00; G06B 19/00; G01S 1/00; B60H 1/00778; G07C 5/008
USPC ...................... 701/2, 29.4; 455/418; 340/5.64
See application file for complete search history.

(56) References Cited

U.S. PATENT DOCUMENTS

| | | | |
|---|---|---|---|
| 4,983,980 A * | 1/1991 | Ando | 342/357.67 |
| 6,243,029 B1 | 6/2001 | Tomer | |
| 8,140,358 B1 | 3/2012 | Ling et al. | |
| 2005/0010336 A1 * | 1/2005 | Matsubara | F02D 41/064 701/2 |
| 2006/0136131 A1 | 6/2006 | Dugan et al. | |
| 2007/0038338 A1 | 2/2007 | Larschan et al. | |
| 2007/0050240 A1 | 3/2007 | Belani et al. | |
| 2008/0057929 A1 * | 3/2008 | Min | 455/418 |
| 2008/0103640 A1 * | 5/2008 | Watanabe et al. | 701/2 |

(Continued)

FOREIGN PATENT DOCUMENTS

| | | | |
|---|---|---|---|
| JP | H01-197146 A | 8/1989 | |
| JP | H09-240429 A | 9/1997 | |

(Continued)

OTHER PUBLICATIONS

U.S. Appl. No. 13/626,362, filed Sep. 25, 2013 in the name of Harumoto et al.

(Continued)

*Primary Examiner* — Helal A Algahaim
*Assistant Examiner* — Genna Mott
(74) *Attorney, Agent, or Firm* — Oliff PLC

(57) ABSTRACT

A remote starter transmits vehicle position information at a time of parking start to an information processor upon the parking start of a vehicle. The information processor judges whether to transmit a request for starting of the vehicle based on the vehicle position information and mobile-terminal position information upon reception of the request for starting of the vehicle and the mobile-terminal position information from a mobile terminal.

8 Claims, 40 Drawing Sheets

(56) References Cited

U.S. PATENT DOCUMENTS

| | | |
|---|---|---|
| 2008/0282817 A1 | 11/2008 | Breed |
| 2009/0045912 A1 | 2/2009 | Sakamoto et al. |
| 2011/0117933 A1 | 5/2011 | Andersson |
| 2011/0205017 A1* | 8/2011 | Lazzara .................. 340/5.64 |
| 2011/0246025 A1 | 10/2011 | Ishihara |
| 2011/0257817 A1* | 10/2011 | Tieman .................. B60R 25/24 701/2 |
| 2012/0028680 A1 | 2/2012 | Breed |
| 2012/0053778 A1* | 3/2012 | Colvin et al. ............... 701/29.4 |
| 2012/0188101 A1 | 7/2012 | Ganot |
| 2012/0190386 A1 | 7/2012 | Anderson |
| 2012/0209634 A1 | 8/2012 | Ling et al. |

FOREIGN PATENT DOCUMENTS

| | | |
|---|---|---|
| JP | A-2004-249863 | 9/2004 |
| JP | 2006-044491 A | 2/2006 |
| JP | A-2006-352460 | 12/2006 |
| JP | A-2009-028046 | 2/2009 |
| JP | A-2010-048238 | 3/2010 |
| JP | 2010-228691 A | 10/2010 |

OTHER PUBLICATIONS

U.S. Application No. 13/851,210, filed Mar. 27, 2013 in the name of Itsuki Hamaue et al.

Mar. 11, 2014 Office Action issued in U.S. Appl. No. 13/851,210.

Jun. 2, 2014 Office Action issued in U.S. Appl. No. 13/626,362.

Feb. 12, 2014 Office Action issued in U.S. Appl. No. 13/626,362.

Jun. 23, 2015 Office Action issued in Japanese Patent Application No. 2011-270067.

* cited by examiner

HISTORY TABLE

| PARKING POSITION | NO. OF TIMES OF PARKING | MONTH OF PARKING | NO. OF TIMES OF REMOTE STARTING | NO. OF TIMES OF CAR FINDER EXECUTED |
|---|---|---|---|---|
| aaa | 8 | 1 | 4 | 0 |
| | 6 | 4 | 0 | |
| | 4 | 8 | 3 | |
| | 5 | 10 | 0 | |
| | 3 | 12 | 1 | |
| bbb | 5 | 7 | 2 | 3 |
| ccc | 4 | 8 | 0 | 0 |
| ddd | 1 | 9 | 0 | 1 |

FIG.24

CAR FINDER EXECUTION HISTORY TABLE

| PARKING POSITION | NO. OF TIMES OF CAR FINDER EXECUTED |
|---|---|
| aaa | 0 |
| bbb | 3 |
| ccc | 0 |
| ddd | 1 |

FIG.27

REMOTE STARTER

BACKGROUND OF THE INVENTION

1. Field of the Invention

The invention relates to the technology of vehicle remote starting control by use of a mobile terminal.

2. Description of the Background Art

Known conventionally is a remote starter that controls a driving apparatus such as an engine or a motor of user's vehicle by use of a mobile terminal. By use of this technology, a user can start the driving apparatus of his or her vehicle that is away from the user. Therefore, in an example, the user can turn on an air conditioner to control the temperature of the vehicle cabin to be appropriate before the user gets in his or her vehicle. Known these days is a remote operation system that operates an on-vehicle apparatus of the vehicle via a center by use of a mobile phone as a mobile terminal.

In common cases when the user uses the remote starter, the user is far from the vehicle. However, when the user is too far away from the vehicle, it may be impossible for the user to get in the vehicle in a short time. In such a case, starting the driving apparatus by a remote starting function to control the temperature in the vehicle cabin may be useless. To prevent this, whether to start the driving apparatus may be judged based on the calculated distance between the user and the user's vehicle, upon reception of the request for starting.

However, in this case, the center has to communicate with the vehicle to check the vehicle position every time the user makes the request for starting. This causes frequent communications between the center and the vehicle, which may increase communication costs. Furthermore, since it takes a certain period of time for communications between the center and the vehicle, the procedure where the center confirms the vehicle position after receiving the request for starting from the user may take a longer time to actually transmit information of the appropriateness of starting to the user.

Furthermore, since keeping a vehicle in the idling condition exerts adverse effects on the environment, no vehicle is allowed, in some areas, to be kept in the idling condition. The driving apparatus of the vehicle parked in such an area can not be started remotely. Moreover, in some other areas where a user almost always comes back to the vehicle in a short time after getting out, there is no need to control the room temperature of the vehicle in advance. In such an area, remotely starting the driving apparatus of the vehicle is rarely executed.

If the vehicle position is transmitted to the center even in such a case where the remote starting is not executed, it generates communication with the center, and increases data communication traffic and communication costs.

SUMMARY OF THE INVENTION

According to one aspect of the invention, a remote starter is installed in a vehicle and executes a starting control of a driving apparatus of the vehicle. Moreover, the remote starter executes the starting control of the driving apparatus in response to a request for starting transmitted by an information processor that is located outside the vehicle, the request for starting being transmitted based on vehicle position information of the vehicle at a time of parking start prior to the request for starting. The remote starter includes a communicator that communicates with the information processor by transmitting and receiving information, a position-information-obtaining-part that obtains the vehicle position information of the vehicle, and a controller that obtains vehicle information of the vehicle, wherein when the controller obtains parking start information of the vehicle indicating that a parking operation of the vehicle is started, the position-information-obtaining-part obtains the vehicle position information at the time of the parking start, and the communicator transmits the vehicle position information at the time of the parking start to the information processor.

The controller can detect the parking start of the vehicle from the parking start information. At this time, the position-information-obtaining-part obtains the vehicle position information of the vehicle. As a result, the vehicle position information at the time of the parking start is obtained. This is because that position information of the remote starter essentially corresponds to the vehicle position information, since the remote starter is installed in the vehicle. Besides, the remote starter transmits the vehicle position information at the time of the parking start to the information processor, which allows the information processor to obtain a parking start position of the vehicle. Further, the information processor is capable of understanding the parking start position of the vehicle without communication with the vehicle when the information processor transmits to the vehicle the request for starting of the vehicle, which reduces communication costs and saves communication time.

According to another aspect of the invention, an information processor is configured to be communicatively coupled to a mobile terminal and a remote starter that is installed in a vehicle, and that transmits a request for starting of the vehicle to the remote starter based on the request for starting of the vehicle received from the mobile terminal. The information processor includes a communicator that communicates with the mobile terminal and the remote starter by transmitting and receiving information, and a controller that judges whether to transmit the request for starting of the vehicle to the remote starter, wherein the communicator obtains mobile-terminal of the mobile terminal at a time of the request for starting and vehicle position information of the vehicle at a time of the parking start prior to the request for starting, and the controller judges whether to transmit the request for starting of the vehicle based on the mobile-terminal position information at the time of the request for starting and the vehicle position information at the time of the parking start.

The information processor includes the communicator and is configured to be communicatively coupled to the mobile terminal and the remote starter. The information processor obtains the mobile-terminal position information at the time of the request for starting and the vehicle position information at the time of the parking start. The controller judges whether to transmit the request for starting based on the mobile-terminal position information and the vehicle position information, which prevents a processing for remote starting in some cases, for example, where a position of the vehicle is too far away from a position of the mobile terminal.

Therefore, the object of the invention is to provide a technology relevant to vehicle remote starting control that is capable of saving communication time and reducing communication costs, and of preventing useless starting.

These and other objects, features, aspects and advantages of the present invention will become more apparent from the following detailed description of the present invention when taken in conjunction with the accompanying drawings.

BRIEF DESCRIPTION OF THE DRAWINGS

FIG. 24 shows a history table.

FIG. 27 shows a car finder execution history table.

DESCRIPTION OF THE EMBODIMENTS

Hereinafter, some embodiments of the invention are described with reference to attached drawings.

1. First Embodiment

<1-1. Outline of System>

Figure 1:
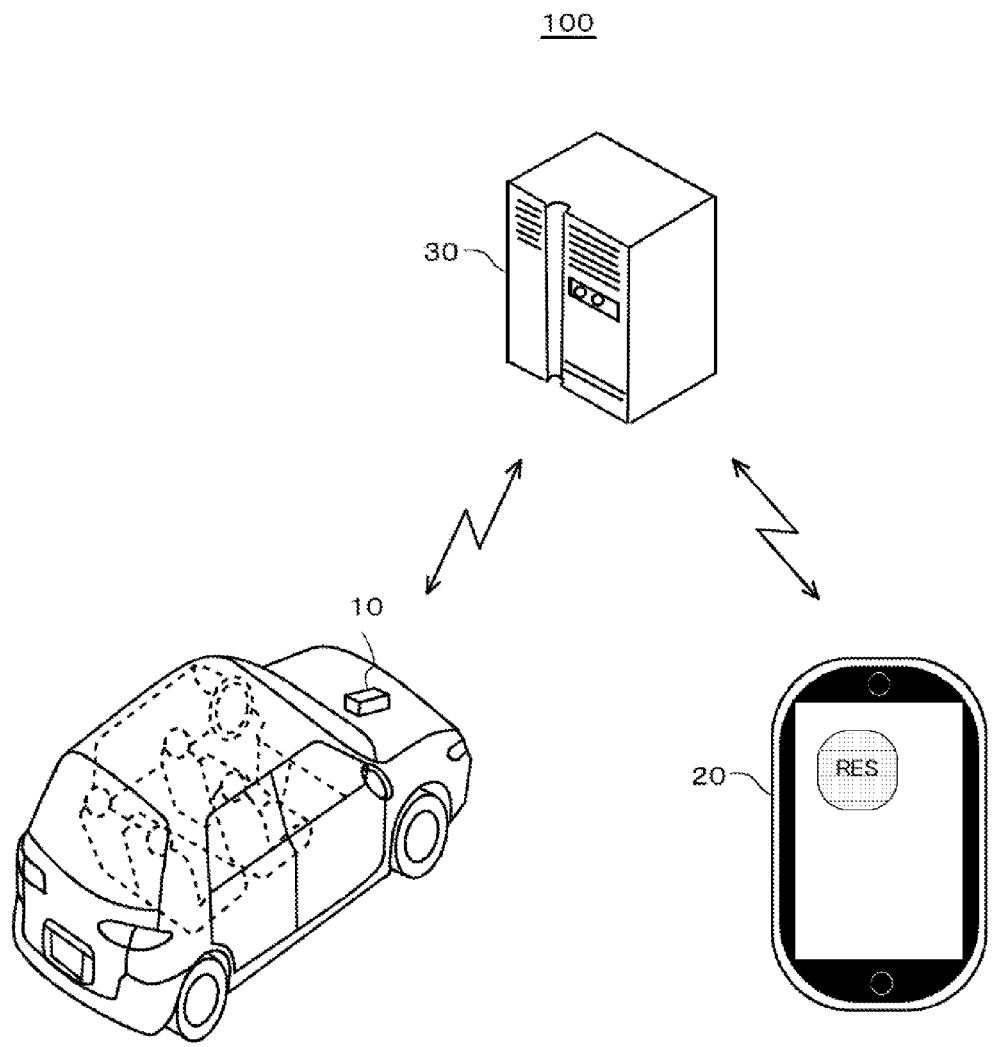
FIG. 1 shows a schematic remote starter system.

FIG. 1 shows an outline of a remote starter system 100 of the embodiment. The remote starter system 100 includes a remote starter 10, a mobile terminal 20 and a center 30.

The remote starter 10 is installed in a vehicle to control the vehicle in accordance with the control information transmitted by the center 30. The remote starter 10 is communicatively coupled to the center 30, transmits to the center 30 vehicle information including position information at a predetermined timing, and receives via the center 30 from the mobile terminal 20 the control information including a request for starting. Upon receiving the request for starting from the center 30, the remote starter 10 implements controls for starting of a driving apparatus and various apparatuses on the vehicle.

The driving apparatus is an engine or a motor. The invention is adaptable to both cases. However, for convenience sake, the embodiment may be described by use of the engine. The various apparatuses are, for example, an air conditioner and a door. That is, the remote starting control controls start or stop of the engine and the motor, on or off operation of the air conditioner, open or close of the door, and the like. In the description below, the target to be remote-started may be indicated simply as a "driving apparatus," and the action such as start or stop, or on or off operation may be indicated simply as "starting."

The mobile terminal 20 is a mobile electronic device carried by a user, for example, Smartphone, a tablet PC or a PDA (Personal Digital Assistant). The mobile terminal 20 stores an application for remotely starting the driving apparatus on the vehicle. The user can remotely send the request for starting or make various settings by executing an operation of the application stored in the mobile terminal 20. The mobile terminal 20 is configured to be communicatively coupled to the center 30, and transmits to the center 30 the request for starting, information on various settings and position information of the mobile terminal 20.

The center 30 is an information processor that controls the whole of the remote starter system 100. The center 30 is configured to be communicatively coupled to the remote starter 10 and to the mobile terminal 20, and controls starting of the driving apparatus by transmitting and receiving the request for starting and the vehicle information mutually. In a concrete example, the center 30 receives from the vehicle the vehicle information including the position information, and receives from the mobile terminal 20 the request for starting and the position information. Upon receiving the request for starting from the mobile terminal, the center 30 makes control, such as judgment or direction on whether to implement remote starting, based on the position information of the mobile terminal 20 and the position information of the vehicle.

As above, the remote starter system 100 of the embodiment is capable of vehicle remote starting control that prevents unnecessary starting while reducing communication costs and saving communication time by causing the center 30 to control starting of the driving apparatus based on the position information of the vehicle and the position information of the mobile terminal obtained at a predetermined timing. Described hereinafter are the configuration and the processing on the remote starter system 100.

<1-2. Configuration of Remote Starter>

Figure 2:
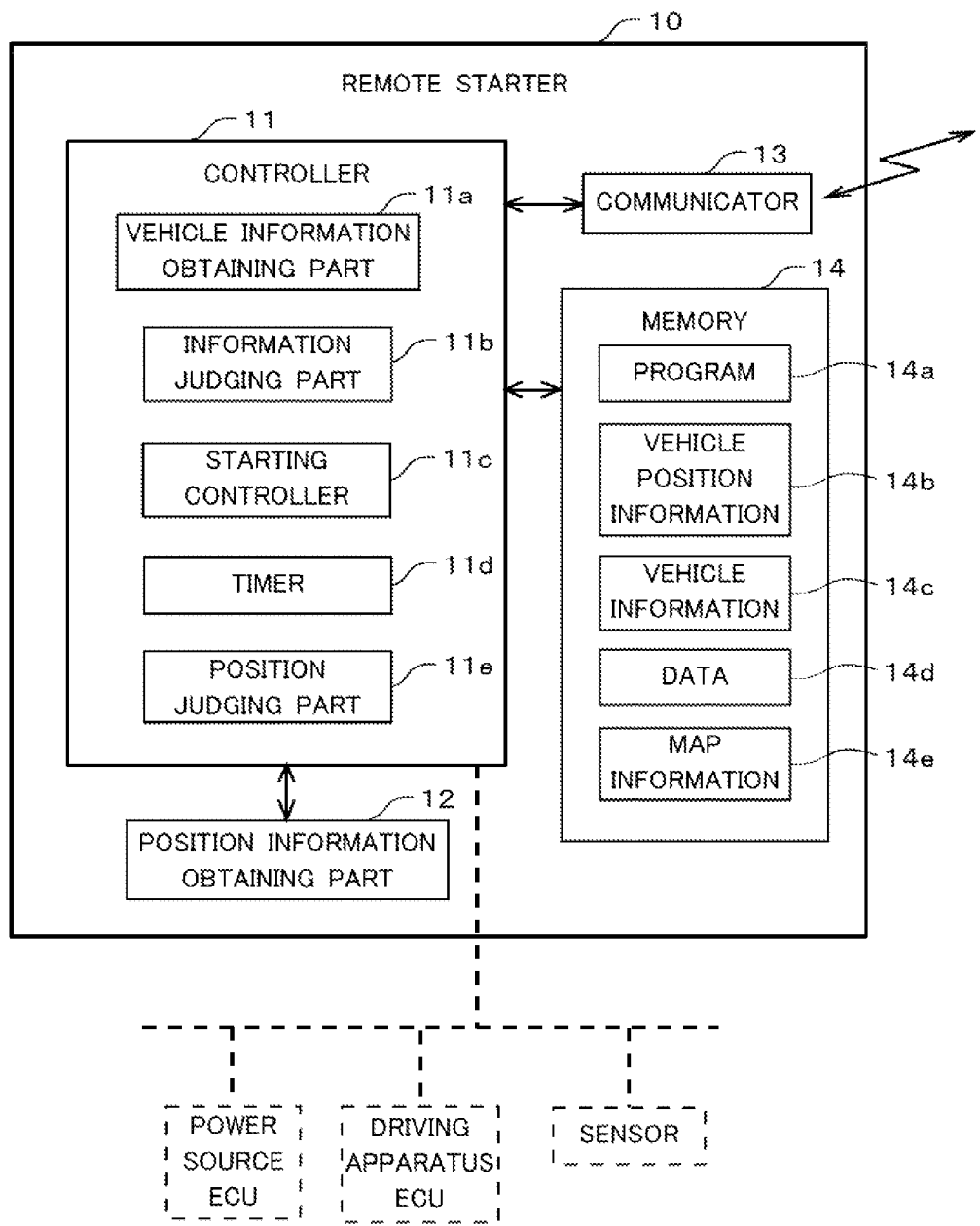
FIG. 2 shows a block diagram of a remote starter.

First, the configuration of the remote starter 10 is described. FIG. 2 shows a schematic block diagram of the remote starter 10. As shown in FIG. 2, the remote starter 10 includes a controller 11, a position information obtaining part 12, a communicator 13 and memory 14.

The controller 11 that includes a vehicle information obtaining part 11a, an information judging part 11b, a starting controller 11c, a timer 11d and a position judging part 11e, is a computer that has a CPU, RAM and ROM not shown in FIG. 2. The controller 11 that is connected to the communicator 13 and the memory 14 included in the remote starter 10, controls the whole of the remote starter 10 by transmitting and receiving information based on a program 14a stored in the memory 14. Arithmetic processing executed by the CPU based on the program stored in the memory 14 provides the functions of the controller 11, such as the information judging part 11b and the starting controller 11c.

The controller 11 is communicatively coupled to other various sensors and ECUs (Electronic Control Units) on the vehicle via an on-vehicle LAN (Local Area Network) such as a CAN (Controller Area Network) for transmitting and receiving various types of information. Since the controller 11 controls the overall processing of the remote starter 10, the controller 11 also controls the processing other than the processing executed by the vehicle information obtaining part 11a, the information judging part 11b, the starting controller 11c and the timer 11d described above.

The vehicle information obtaining part 11a obtains the vehicle information as the information indicating driving conditions or the conditions of other ECUs. The vehicle is equipped with various sensors that detect the vehicle driving conditions, such as a vehicle velocity sensor and a steering angle sensor. The vehicle is also equipped with an engine-control-type ECU such as a fuel injection ECU, and a body-control-type ECU such as a door-lock/unlock ECU. The vehicle information obtaining part 11a obtains, as the vehicle information, output from the sensors and the ECUs via the CAN.

The information judging part 11b judges the contents of the vehicle information obtained from other sensors and the ECUs in the vehicle, and judges the contents of the information received from the center 30. Besides the information described above, the vehicle information includes the information on an ignition switch being switched on or off. The information received from the center 30 includes a command relevant to the request for starting the driving apparatus.

The starting controller 11c controls the starting or the stopping of the driving apparatus and various apparatuses that are installed in the vehicle. That is, the starting controller 11c transmits an applicable direction to the ECU to be controlled upon receiving the command of the request for starting from the center 30. In an example, when receiving from the center 30 the command of the request for starting the driving apparatus, the starting controller 11c transmits via the CAN the direction for starting to the ECU that controls the driving of the driving apparatus. When receiving the command of the request for starting the air conditioner, the starting controller 11c transmits via the CAN the direction for starting to the ECU that controls the driving of the air conditioner.

The timer 11d measures elapsed time. In an example, when a period of time for driving the driving apparatus by remote starting is determined in advance, the timer 11d measures the elapsed time from the starting, and judges whether the predetermined period of time has elapsed. The timer 11d is also capable of measuring clock time, for example, measuring the clock time at the time of the starting.

Upon the vehicle information obtaining part 11a obtaining the information of the ignition switch being switched off (that is, parking start information), the position judging part 11e judges whether the vehicle is parked in a restricted area. The restricted area includes a no-idling zone and a specific area. In the no-idling zone, no vehicle is allowed to be kept in the idling condition. In the specific area, it is rear that the remote starter causes the vehicle to idle. That is, the specific area includes the place in which a user almost always comes back to the vehicle in a short time after getting out, such as a rest area and a parking area on an expressway, and a parking area of a convenience store. The information on these areas is included in map information 14e stored in the memory 14.

The position judging part 11e judges whether the vehicle is parked in the no-idling zone, by comparing the map information 14e and the parking start position of the vehicle. When judging that the vehicle is parked in the no-idling zone, the position judging part 11e does not execute the processing for transmitting vehicle position information.

The position judging part 11e identifies where the specific areas are located based on road information and facility information included in the map information 14e stored in the memory 14, and judges whether the vehicle is parked in the specific area based on the vehicle position information. The user may set the specific areas on the map information 14e in advance. The position judging part 11e judges whether the vehicle is parked in the specific area, by comparing the specific area and the parking start position of the vehicle. When judging that the vehicle is parked in the specific area, the position judging part 11e forbids the processing for transmitting the vehicle position information. When judging that the vehicle is not parked in the specific area, the position judging part 11e executes the processing for transmitting the vehicle position information.

The user may change the setting regarding whether to forbid or permit the processing for transmitting the vehicle position information when the vehicle is parked in the no-idling zone or in the specific area. Here is an example case where a restriction mode is provided to restrict the processing for transmitting the vehicle position information. In the case where the user activates the restriction mode, transmitting the vehicle position information is forbidden when the vehicle is parked in the restricted area. In the case where the user deactivates the restriction mode, transmitting the vehicle position information is executed wherever the vehicle is parked. The user can activate or deactivate the restriction mode by the mobile terminal 20 via the center 30.

The position information obtaining part 12 obtains the position information indicating the current position of the remote starter 10. GPS (Global Positioning System), for example, may be used as the position information obtaining part 12. The position information includes latitude information and longitude information. That is, the position information obtaining part 12 obtains the latitude information and the longitude information of the current position by use of the GPS.

In some environments where the remote starter 10 is installed, the position information using the GPS is not available. In this case, the position information obtaining part 12 obtains the information indicating that the position information is undetermined (hereinafter, referred to as "undetermined-information") as the information indicating that the position information is not available.

The position information indicates the position of a vehicle because the obtained position information indicates the position of the remote starter 10 that is installed in the vehicle. Therefore, the position information obtained by the position information obtaining part 12 is referred to as "vehicle position information," hereafter. That is, the vehicle position information includes the position information including the latitude information and the longitude information obtained by the GPS, and the undetermined-information when the position information using the GPS is not available. The vehicle position information 14b is stored in the memory 14.

The communicator 13 is communicatively coupled to the center 30 for transmitting information to and receiving information from the center 30. In an example, the communicator 13 transmits the vehicle position information or the vehicle information to the center 30, and receives from the center 30 a command such as of a request for communication connection or the request for starting, that is, the control information. Communications between the remote starter 10 and the center 30 are through a so-called mobile telephone network. Therefore, the communicator 13 also judges whether the communicator 13 is located in a "service area" where the communication with the center is available, or in an "out-of-service area" where the communications is not available. Data 14d such as the command transmitted by the center 30 are stored in the memory 14.

The memory 14 stores the program 14a, the vehicle position information 14b, vehicle information 14c, the data 14d and the map information 14e. The memory 14 of the embodiment is nonvolatile semiconductor memory that is capable of reading and writing data electrically, and of keeping data even in power-off state. For example, EEPROM (Electrical Erasable Programmable Read-Only Memory) or flash memory may be used as the memory 14. However, other memory medium or a hard disk drive including a magnetic disk may be used. The program is so-called system software that the controller 11 reads out to execute for controlling the remote starter 10. The map information 14e includes road information and facility information around the country or in a predetermined wide area.

In the embodiment, the memory 14 of the remote starter 10 stores the map information 14e, and the position judging part 11e judges whether the vehicle is parked in the restricted area, which is not limited to this. In an example case where the vehicle is equipped with a navigation apparatus, the map information stored in memory of the navigation apparatus may include the information of the restricted areas. In the configuration of this case, the position judging part 11e obtains the information of the restricted areas from the navigation apparatus, and judges whether the vehicle is parked in the restricted area.

In the embodiment, the specific areas are specified by the remote starter 10. However, in another configuration, the specific areas may be specified by the center 30, and the specified specific area information may be transmitted to the remote starter 10.

<1-3. Configuration of Mobile Terminal>

Figure 3:
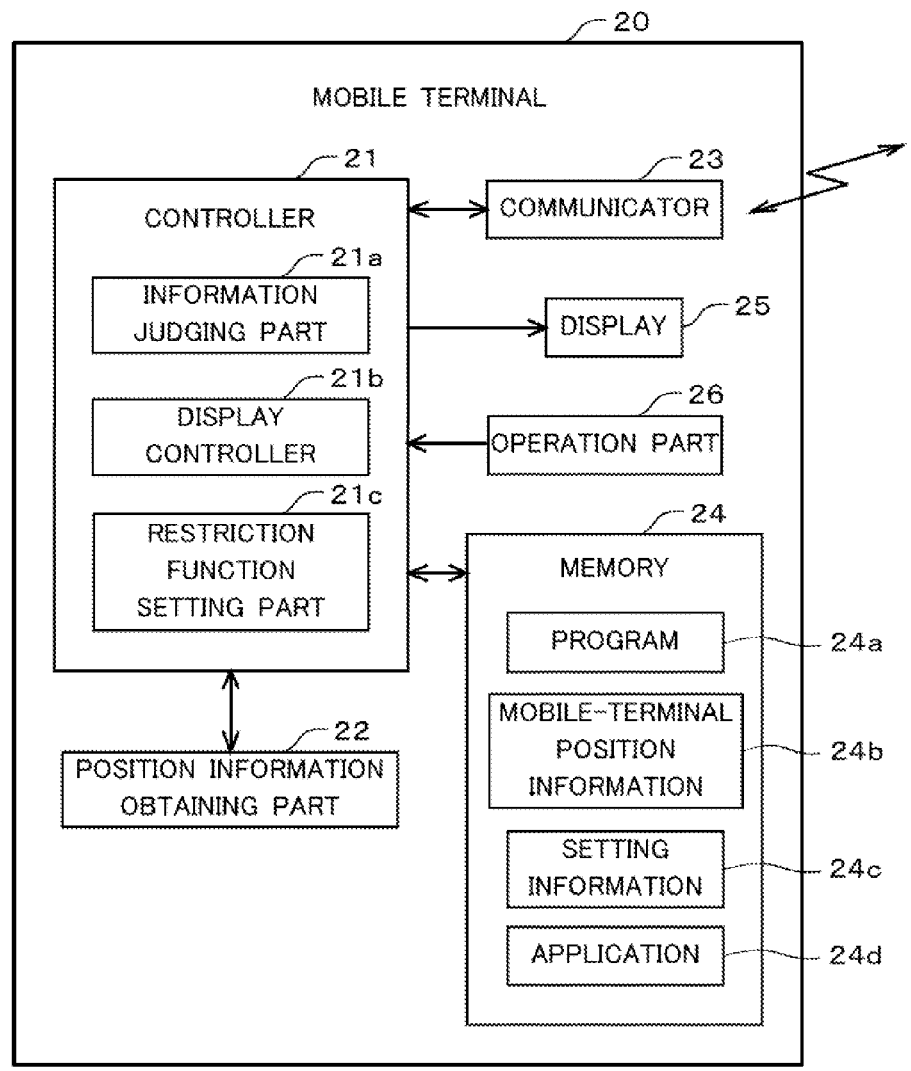
FIG. 3 shows a block diagram of a mobile terminal.

Described next is the configuration of the mobile terminal 20. FIG. 3 shows a schematic block diagram of the mobile terminal 20. As shown in FIG. 3, the mobile terminal includes a controller 21, a position information obtaining part 22, a communicator 23, memory 24, a display 25 and an operation part 26.

The controller 21 that includes an information judging part 21a, a display controller 21b and a restriction function setting part 21c, is a computer that has a CPU, RAM and ROM not shown in FIG. 3. The controller 21 that is connected to the communicator 23, the memory 24, and others included in the mobile terminal 20, transmits and receives information based on a program 24a stored in the memory 24, and controls the whole of the mobile terminal 20. Arithmetic processing executed by the CPU based on the program stored in the memory 24 provides the functions of the controller 21 such as the information judging part 21a and the display controller 21b. Since the controller 21 controls the overall processing of the mobile terminal 20, the controller 21 also controls the processing other than the processing executed by the information judging part 21a, the display controller 21b and the restriction function setting part 21c, including execution of the function of the application relevant to the remote starting.

The information judging part 21a judges the contents of the obtained information. In an example, the information judging part 21a judges the contents of the information received from the center 30, and judges the contents of the commands entered via the operation part 26 of the mobile terminal 20. The information received from the center 30 includes, for example, an inquiry relevant to the vehicle information and an inquiry on whether to implement the starting. The command entered via the operation part 26 of the mobile terminal 20 includes, for example, the command of the request for starting or stopping the driving apparatus.

The display controller 21b makes control so as to display an image on the display 25 of the mobile terminal 20. Concretely, the display controller 21b makes control to display on the display 25 an operation screen for direction for starting the driving apparatus, and a check screen received from the center 30.

The restriction function setting part 21c activates or deactivates the function that restricts the remote starting processing of the driving apparatus of the vehicle (hereinafter, referred to as "restriction function") when predetermined conditions are met. The predetermined conditions are the conditions that determine whether to execute the remote starting function of the driving apparatus of the vehicle (hereinafter, referred to as "restriction conditions"). The restriction function setting part 21c has a function to change the restriction conditions as well. One of the restriction conditions may relate to the distance between the mobile terminal position at the time of the request for starting and the vehicle position at the time of parking start. The restriction function based on this restriction condition is indicated as "distance-restriction function." Another one of the restriction conditions may relate to the difference between the vehicle positions at the time of parking start and at the time of the request for starting. The restriction function based on this restriction condition is referred to as "position-restriction function." Further, another one of the restriction conditions may relate to whether the door of the vehicle is locked, or whether a gear is set at a parking position.

The information indicating the restriction function activated or deactivated and the restriction conditions (hereinafter, referred to as "setting information" collectively) are stored in the memory 24. When the user selects a setting mode by operating the mobile terminal, setting information 24c is read out from the memory 24 and displayed on the display 25. The user can make new setting information in terms of the displayed setting information by activating or deactivating the restriction function, or by changing the conditions in accordance with a change screen. The new setting information is transmitted to the center 30 as well as being stored in the memory 24. The setting information 24c may not be stored in the memory 24 of the mobile terminal 20, but be stored only in the memory 33 of the center 30. In this case, the restriction function setting part 21*c* reads out the setting information from the memory 33 of the center 30.

The position information obtaining part 22 obtains the position information indicating the current position of the mobile terminal 20 (hereinafter, referred to as "mobile-terminal position information"). For example, the GPS may be used as the position information obtaining part 22. The mobile-terminal position information includes the latitude information and the longitude information. That is, the position information obtaining part 22 obtains the latitude information and the longitude information of the current position by use of the GPS. The obtained mobile-terminal position information 24*b* is stored in the memory 24.

The communicator 23 is communicatively coupled to the center 30 for transmitting information to and receiving information from the center 30. In an example, the communicator 23 transmits to the center 30 the command of the request for starting or the mobile-terminal position information, and receives from the center 30 the command of the request for communication connection or an inquiry on whether to implement the starting. Communication between the mobile terminal 20 and the center 30 is through the so-called mobile telephone network. Therefore, the communicator 23 also judges whether the communicator 23 is located in the "service area" where the communication with the center 30 is available, or in the "out-of-service area" where the communication is not available.

The memory 24 stores the program 24*a*, the mobile-terminal position information 24*b*, the setting information 24*c* and an application 24*d*. The memory 24 of the embodiment is nonvolatile semiconductor memory that is capable of reading and writing data electrically, and of keeping data even in power-off state. For example, EEPROM or flash memory may be used as the memory 24. However, other memory medium or a hard disk drive including a magnetic disk may be used. The program 24*a* is so-called system software that the controller 21 reads out to execute for controlling the mobile terminal 20. The application 24*d* is a control program for the remote starting function.

The display 25 displays the operation screen of the application for controlling the remote starting function, and the check screen on which the user checks the vehicle information transmitted by the center 30. For example, a liquid crystal display or an organic EL display is used as the display 25.

The operation part 26 is an information input apparatus including a mechanical button and a touch panel. The user can make various operations relevant to the control of the remote starting function, and set or change the setting information, by operating the operation part 26. The operation part 26 may be configured as a unit of the display 25.

<1-4. Configuration of Center>

Figure 4:
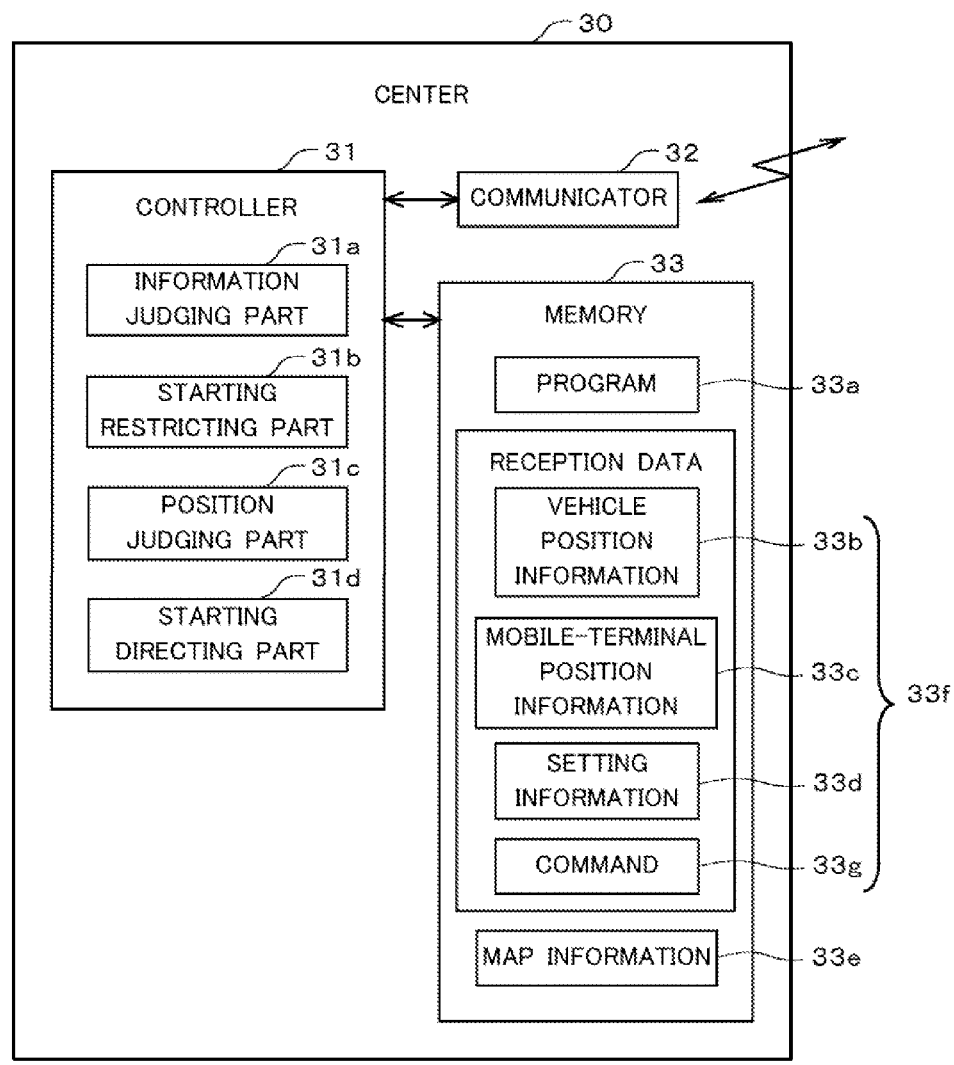
FIG. 4 shows a block diagram of a center.
Figure 5:
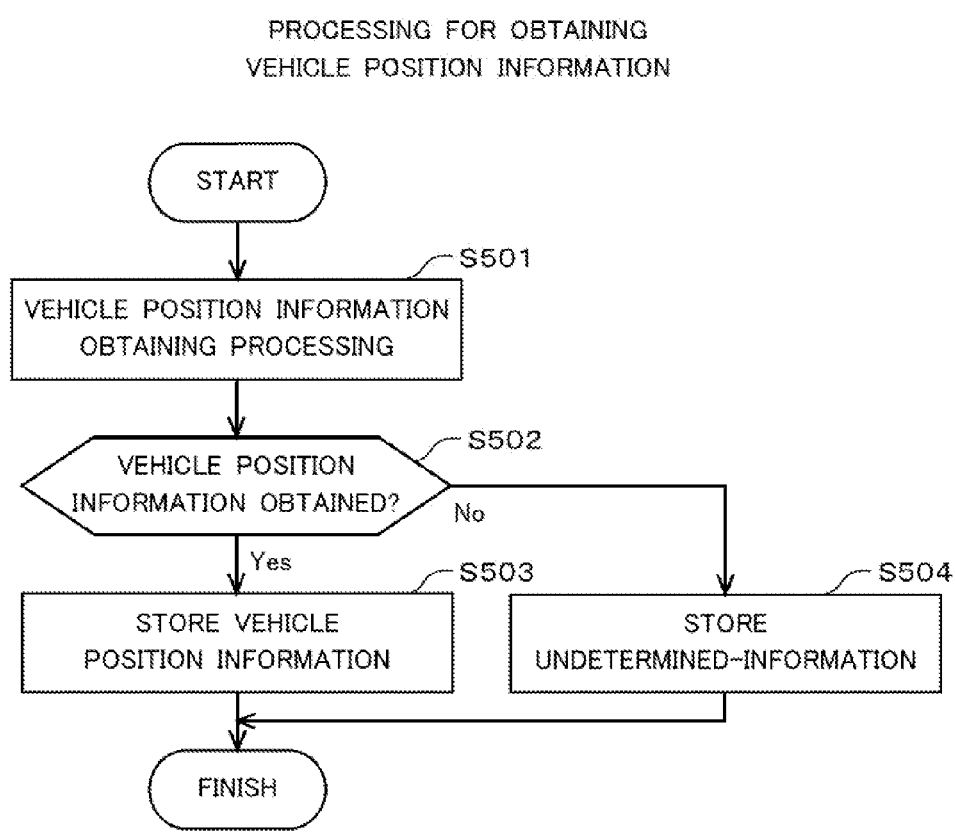
FIG. 5 shows a flowchart of the processing on the remote starter.

Next, the configuration of the center 30 is described. FIG. 4 shows a schematic block diagram of the center 30. As shown in FIG. 4, the center 30 includes a controller 31, a communicator 32 and memory 33.

The controller 31 that includes an information judging part 31*a*, a starting restricting part 31*b*, a position judging part 31*c* and a starting directing part 31*d*, is a computer that has a CPU, RAM and ROM not shown in FIG. 4. The controller 31 that is connected to the communicator 32, the memory 33 and others that are included in the center 30, transmits and receives information based on a program stored in the memory 33, and controls the whole of the center 30. Arithmetic processing executed by the CPU based on the program 33*a* stored in the memory 33 provides the functions of the controller 31, such as the information judging part 31*a* and the starting restricting part 31*b*. Since the controller 31 controls the overall processing of the center 30, the controller 31 also controls the processing other than the processing executed by the information judging part 31*a*, the starting restricting part 31*b*, the position judging part 31*c* and the starting directing part 31*d*.

The information judging part 31*a* judges the contents of the information or the command received from the remote starter 10 or the mobile terminal 20. Concretely, the information judging part 31*a* judges whether the information received from the remote starter 10 is the vehicle position information, the information indicating the starting of the driving apparatus, or the information on the ignition switch being switched on or off. The information judging part 31*a* also judges whether the information received from the mobile terminal 20 is the mobile-terminal position information, the command of the request for starting or stopping the driving apparatus, or the change information of the setting information.

Upon reception of the command of the request for starting from the mobile terminal 20, the starting restricting part 31*b* judges whether to restrict the starting of the driving apparatus based on the setting information. Concretely, upon the judgment that the command of the request for starting has been received from the mobile terminal 20, the starting restricting part 31*b* judges whether to start the driving apparatus based on the vehicle position information, the mobile-terminal position information and the setting information.

Here is an example case where the distance-restriction function is activated, and the restriction conditions are set based on the distance between the vehicle position at the time of parking start and the position of the mobile terminal at the time of the request for starting. The starting restricting part 31*b* obtains the distance between the vehicle position at the time of parking start and the position of the mobile terminal at the time of the request for starting based on the vehicle position information and the mobile-terminal position information, and judges whether to restrict the starting of the driving apparatus by comparing the obtained distance and the restriction conditions.

More concretely, the starting restricting part 31*b* calculates the distance between the vehicle and the mobile terminal 20 by comparing vehicle position information 33*b* at the time of the ignition switch being switched off read out from the memory 33 (that is, the vehicle position information at the time of parking start) and mobile-terminal position information 33*c* received from the mobile terminal 20 (that is, the mobile-terminal position information at the time of the request for starting). Then, the starting restricting part 31*b* reads out from the memory 33 a restriction distance included in setting information 33*d*, and judges whether the calculated distance is equal to or longer than the restriction distance. The restriction distance is one of the restriction conditions, in terms of the distance for restricting the starting.

The starting restricting part 31*b* continues the processing for starting the driving apparatus when the calculated distance is shorter than the restriction distance, and restricts the processing for starting when the calculated distance is equal to or longer than the restriction distance. The restriction of the processing for starting includes forbiddance of the processing for starting. That is, the processing for restricting the processing for starting is, for example, to cancel the processing for starting when forbidding the processing for starting, and to confirm with the user whether to continue the processing for starting when restricting the processing for starting.

Here is another example case where the position-restriction function is activated, and the restriction conditions are set based on the difference between the vehicle positions at the time of parking start and at the time of the request for starting. The starting restricting part 31*b* judges whether to restrict the starting of the driving apparatus based on the vehicle position information at the time of parking start and the vehicle position information at the time of the request for starting.

Concretely, the starting restricting part 31b judges the difference between the vehicle position information 33b at the time of the ignition switch being switched off read out from the memory 33 (that is, the vehicle position information at the time of parking start) and the vehicle position information 33b obtained from the remote starter 10 when the command of the request for starting is received from the mobile terminal 20 (that is, the vehicle position information at the time of the request for starting), by comparing them with each other. Then, the starting restricting part 31b reads out from the memory 33 the restriction conditions included in the setting information 33d, and compares the read-out restriction conditions and the result of the judged difference. One of the restriction conditions restricts the starting when the two of the vehicle position information are different.

Under this condition, upon the judgment that the two of the vehicle position information are different, the starting restricting part 31b restricts the processing for starting. That is, the judgment that the two of the vehicle position information are different indicates that the vehicle has moved from the position at the time of the parking start to the position at the time of the request for starting. The assumed factor of the vehicle having moved is that the vehicle has been stolen or towed away. Therefore, when the two of the vehicle position information are different, the starting restricting part 31b forbids the starting or restricts the starting such as by confirming with the user whether to continue the processing for starting.

Upon reception of the command of the request for starting from the mobile terminal 20, the position judging part 31c judges whether the vehicle is parked in the no-idling zone. The no-idling zone is, as described above, the zone in which no vehicle is allowed to be kept in the idling condition. The information of plural no-idling zones is included in map information 33e stored in the memory 33. The position judging part 31c judges whether the vehicle is parked in the no-idling zone by comparing the map information 33e and the parking start position of the vehicle read out from the memory 33. Upon the judgment that the vehicle is parked in the no-idling zone, the position judging part 31c does not execute the processing for starting.

If it is forbidden that the remote starter 10 transmits to the center 30 the parking position information when the vehicle is parked in the no-idling zone, this processing is not needed originally. However, since the user can change the setting of transmission processing forbidden or permitted in the embodiment, this processing is needed.

The position judging part 31c judges whether the vehicle is parked in the specific area, as well. The specific area is, as described above, the area in which the remote starting function rarely allows the vehicle to idle, and in which the user almost always comes back in a short time to the vehicle after getting out of the vehicle.

The position judging part 31c identifies where the specific areas are located based on the road information and the facility information of the map information 33e stored in the memory 33, and judges whether the vehicle is parked in the specific area based on the vehicle position information. The user may set the specific areas in the map information 33e in advance. The position judging part 31c judges whether the vehicle is parked in the specific area by comparing the specific area and the parking start position of vehicle read out from the memory 33. The position judging part 31c restricts the processing for starting when judging that the vehicle is parked in the specific area, and continues the processing for starting when judging that the vehicle is not parked in the specific area.

If it is forbidden that the remote starter 10 transmits the parking position information to the center 30 when the vehicle is parked in the specific area, this processing is not needed originally. However, since the user can change the setting of transmission processing forbidden or permitted in the embodiment, this processing is needed.

The starting directing part 31d makes the final decision on whether to execute the remote starting function based on the judgment results of the starting restricting part 31b and the position judging part 31c, and executes the processing for transmitting the command of the request for starting to the remote starter 10. Concretely upon the reception of the command of the request for starting from the mobile terminal 20, both of the starting restricting part 31b and the position judging part 31c judge whether to continue the processing for starting. When both of them judge that the processing for starting is to be continued, the starting directing part 31d makes the final decision to execute the remote starting, and transmits the command of the request for starting to the remote starter 10.

The communicator 32 is configured to be communicatively coupled to the remote starter and the mobile terminal 20 by transmitting and receiving information mutually. In an example, the communicator 32 transmits to the remote starter 10 the command of the request for starting, and to the mobile terminal 20 the information for confirming whether to continue the processing for starting. In another example, the communicator 32 receives from the remote starter 10 the vehicle position information and the vehicle information, and from the mobile terminal 20 the mobile-terminal position information and the command of the request for starting. Communications between the remote starter 10 and the mobile terminal 20 are through the so-called mobile telephone network.

The memory 33 stores the program 33a, the vehicle position information 33b, the mobile-terminal position information 33c, the setting information 33d, the map information 33e and a command 33g. Reception data 33f may be used for collective indication of the vehicle position information 33b, the mobile-terminal position information 33c, the setting information 33d and the command 33g. In adaptable configurations, the command 33g may be stored in the memory 33 so as to be read out when needed for execution, or may not be stored in the memory 33 and be executed upon reception.

The memory 33 of the embodiment is nonvolatile semiconductor memory that is capable of reading and writing data electrically, and of keeping data even in power-off state. For example, EEPROM or flash memory may be used as the memory 33. However, other memory medium or a hard disk drive including a magnetic disk may be used. The program 33a is so-called system software that the controller 31 reads out to execute for controlling the center 30. The map information 33e includes the road information and the facility information around the country or in a predetermined wide area.

<1-5. Processing on Remote Starter>

Described next is the processing on the remote starter 10. Each of FIG. 5, FIG. 6, FIG. 7, FIG. 8 and FIG. 9 shows a flowchart of the processing on the remote starter 10.

The remote starter 10 obtains the vehicle position information periodically while the ignition switch of the vehicle is in the on-state. Described here is the processing on the remote starter 10 for obtaining the vehicle position information. FIG.

5 shows the flowchart of the processing on the remote starter 10 for obtaining the vehicle position information.

First, the position information obtaining part 12 executes the processing for obtaining the vehicle position information, for example, every 50 ms or 100 ms (step S501). After executing the processing for obtaining the vehicle position information, the position information obtaining part 12 judges whether the vehicle position information has been obtained (step S502). The vehicle position information includes the latitude information and the longitude information. Thus, in an example, when the position information obtaining part 12 has succeeded in appropriately obtaining the latitude information and the longitude information, it is judged that the vehicle position information has been obtained. When the position information obtaining part 12 has not succeeded in obtaining them appropriately, it is judged that the vehicle position information has not been obtained.

When judging that the vehicle position information has been obtained (Yes at the step S502), the position information obtaining part 12 stores the obtained vehicle position information in the memory 14 (step S503). When judging that the vehicle position information has not been obtained (No at the step S502), the position information obtaining part 12 stores the undetermined-information in the memory 14 (step S504). In this case, the undetermined-information corresponds to the vehicle position information. The remote starter 10 repeats the same processing on a regular basis for obtaining the vehicle position information afterward.

Figure 6:
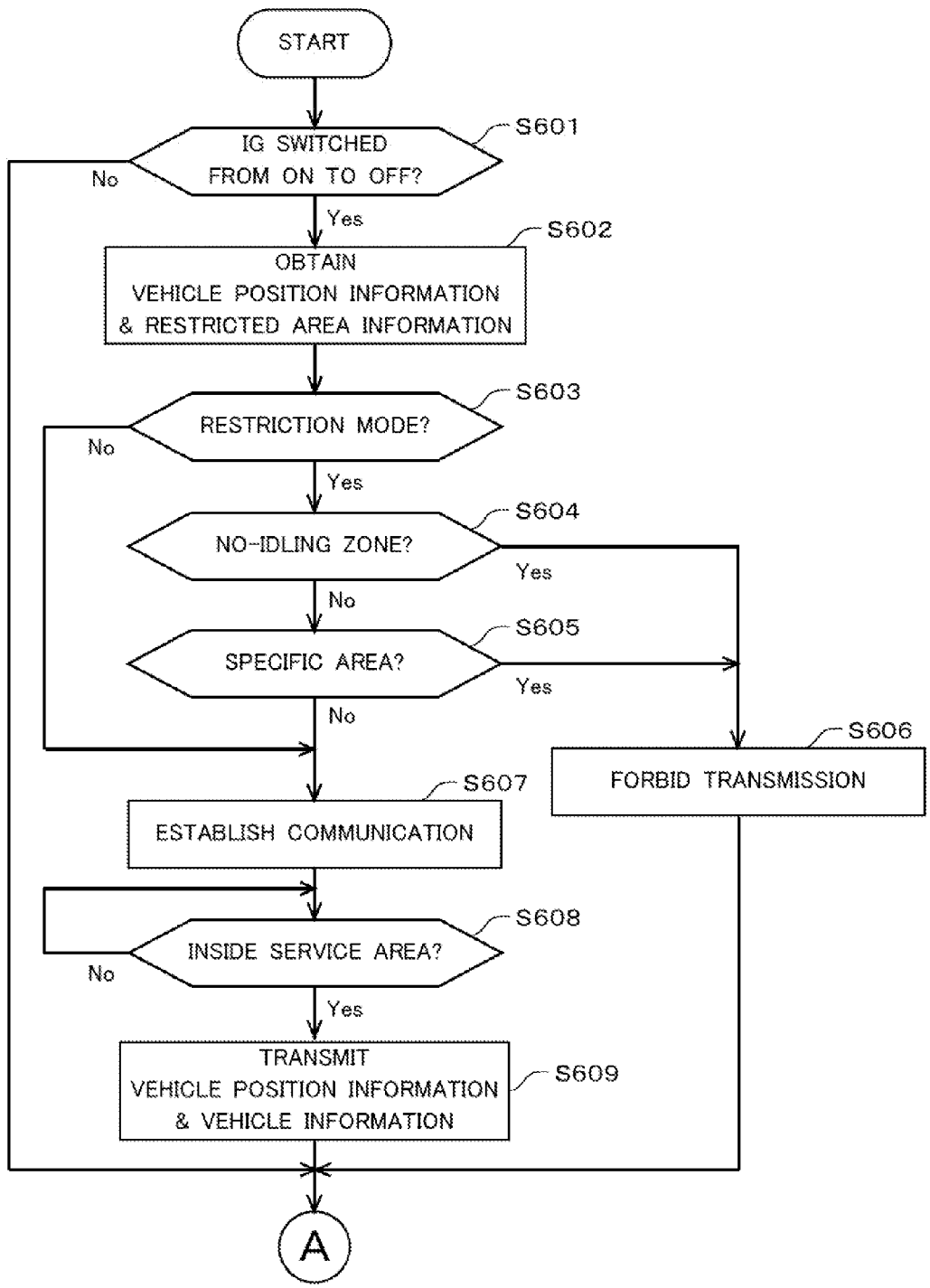
FIG. 6 shows another flowchart of the processing on the remote starter.
Figure 7:
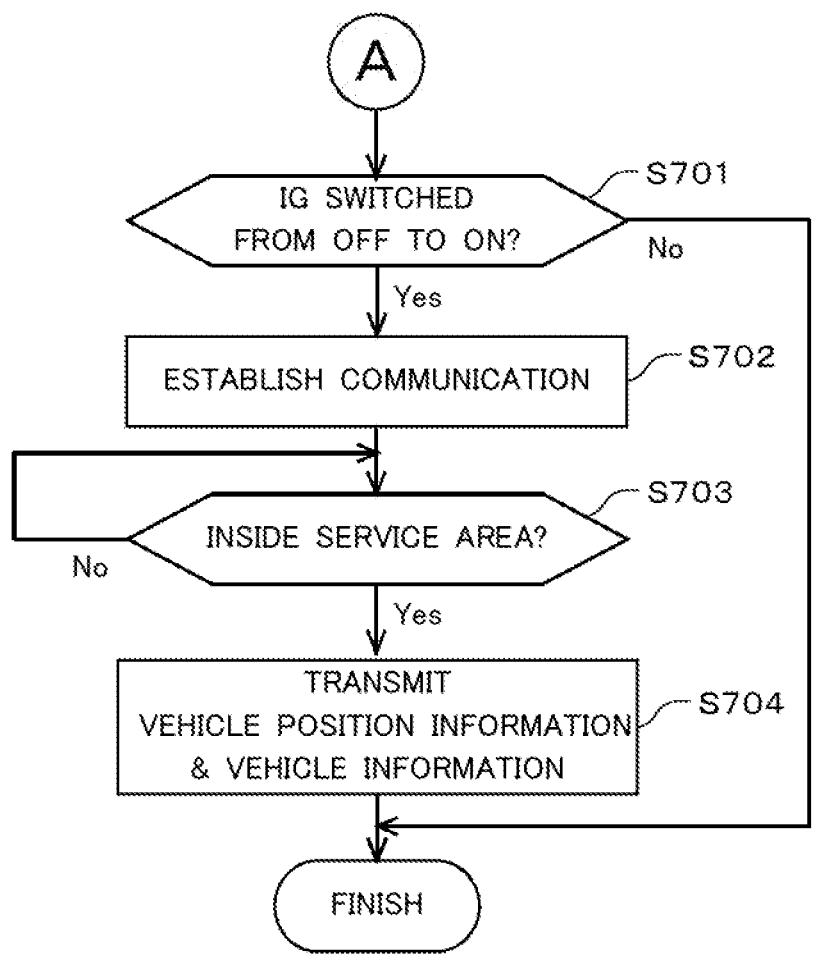
FIG. 7 shows another flowchart of the processing on the remote starter.

When the ignition switch is manually switched on or off, the remote starter 10 executes the processing for transmitting the vehicle position information and the vehicle information to the center 30 in the case where the vehicle is parked outside the restricted area. Described next is the processing on the remote starter 10 for transmitting the vehicle position information and the vehicle information. Each of FIG. 6 and FIG. 7 shows the flowchart of the processing on the remote starter 10 for transmitting the vehicle position information and the vehicle information to the center 30. In the figures, the ignition switch is indicated as "IG."

First, the vehicle information obtaining part 11a detects whether the ignition switch condition has been manually switched from the on-state to the off-state (step S601). Concretely, while the ignition switch is in the on-state, upon reception via CAN from a power source ECU, of the signal indicating that the ignition switch is in the off-state, the vehicle information obtaining part 11a detects that the ignition switch has been switched off from the on-state.

When the vehicle information obtaining part 11a does not detect that the ignition switch has been switched off from the on-state (No at the step S601), the procedure moves to the step, described later, for detecting whether the ignition switch has been switched on from the off-state (A in FIG. 6).

When the vehicle information obtaining part 11a detects that the ignition switch has been changed off from the on-state (Yes at the step S601), it is judged that the vehicle is now to be parked. Then, the controller 11 obtains the vehicle position information and the restricted area information (step S602). Concretely, the controller 11 obtains the restricted area information from the map information 14e of the memory 14, and as well, the vehicle position information at the time of parking start from the position information obtaining part 12. The restricted area information includes the no-idling zones and the specific areas.

Then, the controller 11 judges whether the restriction mode that restricts the processing for transmitting the vehicle position information is on (step S603). When the restriction mode is not on (No at the step S603), the procedure moves to the step for transmitting the vehicle position information (step S607).

When the restriction mode is on (Yes at the step S603), the position judging part 11e judges whether the vehicle is in the no-idling zone (step S604). That is, the position judging part 11e judges whether the parking start position of the vehicle is in the no-idling zone, by comparing the vehicle position information and the no-idling zones included in the restricted area information obtained at the step S602. When the position judging part 11e judges that the parking start position of the vehicle is in the no-idling zone (Yes at the step S604), the vehicle is not to be kept in the idling condition by the remote starting function. Thus, the processing for transmitting the vehicle position information is forbidden (step S606), and the procedure moves to the next step (A in FIG. 6).

When judging that the parking start position of the vehicle is not in the no-idling zone (No at the step S604), the position judging part 11e judges whether the parking start position of the vehicle is in the specific area (step S605). Concretely, the position judging part 11e judges whether the parking start position of the vehicle is in the specific area, by comparing the vehicle position information and the specific areas included in the restricted area information obtained at the step S602.

When the position judging part 11e judges that the parking start position of the vehicle is in the specific area (Yes at the step S605), the remote starting function is rarely executed. Thus, the processing for transmitting the vehicle position information is forbidden (step S606), and the procedure moves to the next step (A in FIG. 6). When the position judging part 11e judges that the parking start position of the vehicle is not in the specific area (No at the step S605), the procedure moves to the next step where the controller 11 transmits the vehicle position information.

The controller 11 establishes communication with the center 30 (step S607). Concretely, the controller 11 transmits the command of the request for communication connection to the center 30 via the communicator 13. Upon reception of the command of the request for communication connection, the center 30, if available, permits the communication connection to establish the communication.

However, when the vehicle is parked in the area where the communication is not available, establishing the communication at a step S607 is impossible. Therefore, the communicator 13 judges whether the vehicle is in the service area where the communication with the center 30 is available (step S608). That is, when the communication has been established at the step S607, the communicator 13 judges that the vehicle is in the service area for the communication. When the communication has not been established, the communicator 13 judges that the vehicle is in the out-of-service area for the communication.

When judging that the vehicle is in the service area for communications (Yes at the step S608), the communicator 13 transmits to the center 30 the vehicle position information and the vehicle information (step S609). The vehicle position information to be transmitted is the position information obtained by the position information obtaining part 12 when the ignition switch has been switched off, that is, the parking start position information (parking position information). The vehicle information to be transmitted is the vehicle information obtained by the vehicle information obtaining part 11a when the ignition switch has been switched off, and includes the information indicating that the ignition switch is in the off-state. The vehicle information to be transmitted may include the vehicle information that is stored in the memory 14 but has not been transmitted, besides the information indicating that the ignition switch is in the off-state.

When judging that the vehicle is not in the service area for communications (No at the step S608), the communicator 13 judges once again whether the vehicle is in the service area. This is because the communication conditions may have been temporarily bad due to bad weather or surround constructions. If so, there is a possibility that the communication conditions are improved later. When the vehicle is not in the service area, the controller 11 can not transmit the vehicle position information and other information to the center 30. Therefore, the controller 11 stores the information to be transmitted in the memory 14, and after it is judged that the vehicle is in the service area when the communication conditions are improved, executes the processing for transmitting to the center 30 via the communicator 13 the vehicle position information and the vehicle information read out from the memory 14.

However, when the communication conditions are changed from the condition of being in the out-of-service area to the condition of being in the service area, the controller 11 may obtain the new vehicle position information. When it is judged that the newly-obtained vehicle position information corresponds to the vehicle position information at the time when the ignition switch is switched off, which is stored in the memory 14, based on the comparison between the two, the controller 11 may transmit the newly-obtained vehicle position information to the center 30.

Next, the vehicle information obtaining part 11a detects whether the user manually has switched the ignition switch on from the off-state (step S701). Concretely, upon reception via CAN from the power source ECU, of the signal indicating that the ignition switch is in the on-state while the ignition switch is in the off-state, the vehicle information obtaining part 11a detects that the ignition switch has been switched on from the off-state.

When the vehicle information obtaining part 11a does not detect that the ignition switch has been switched on from the off-state (No at the step S701), the procedure is finished without execution of the processing.

When detecting that the ignition switch has been switched on from the off-state (Yes at the step S701), the vehicle information obtaining part 11a judges that the vehicle is not to be parked any more. Then, the controller 11 establishes the communication with the center 30 (step S702). Concretely, the controller 11 transmits the command of the request for communication connection to the center 30 via the communicator 13. Upon reception of the command of the request for communication connection, the center 30, if available, permits the communication connection to establish the communication. When the communication with the center 30 has been established already, the processing can be omitted.

After the communication has been established, the communicator 13 periodically judges whether the vehicle is in the service area where the communication with the center 30 is available (step S703). That is, besides the processing above, the communicator 13 judges whether the communication with the center 30 is available by monitoring deterioration of the communication condition when the communication with the center 30 has been established.

When judging that the vehicle is in the service area for communications (Yes at the step S703), the communicator 13 transmits to the center 30 the vehicle position information and the vehicle information (step S704). The vehicle position information to be transmitted is the position information obtained by the position information obtaining part 12 when the ignition switch has been switched on, that is, the position information at a time of parking end. The vehicle information to be transmitted is the vehicle information obtained by the vehicle information obtaining part 11a when the ignition switch has been switched on, and includes the information indicating that the ignition switch is in the on-state. The vehicle information to be transmitted may include the vehicle information that is stored in the memory 14 but has not been transmitted, besides the information indicating that the ignition switch is in the on-state.

When judging that the vehicle is not in the service area for communications (No at the step S703), the communicator 13 judges once again whether the vehicle is in the service area. Since the communicator 13 of the vehicle being not in the service area for communications can not transmit the vehicle position information and others to the center 30, the controller 11 stores the information to be transmitted in the memory 14. Then, the controller 11, after it is judged that the vehicle is in the service area, executes the processing for transmitting to the center 30 via the communicator 13 the vehicle position information and the vehicle information read out from the memory 14.

As above, in the case where the parked vehicle is outside the restricted area when the ignition switch has been manually switched off the remote starter 10 executes the processing for transmitting to the center 30 the vehicle position information obtained at the time when the ignition switch has been switched off besides the information indicating that the ignition switch is in the off-state. The remote starter 10 executes the processing shown in FIG. 6 and FIG. 7 periodically, for example, every 50 ms or 100 ms.

Figure 8:
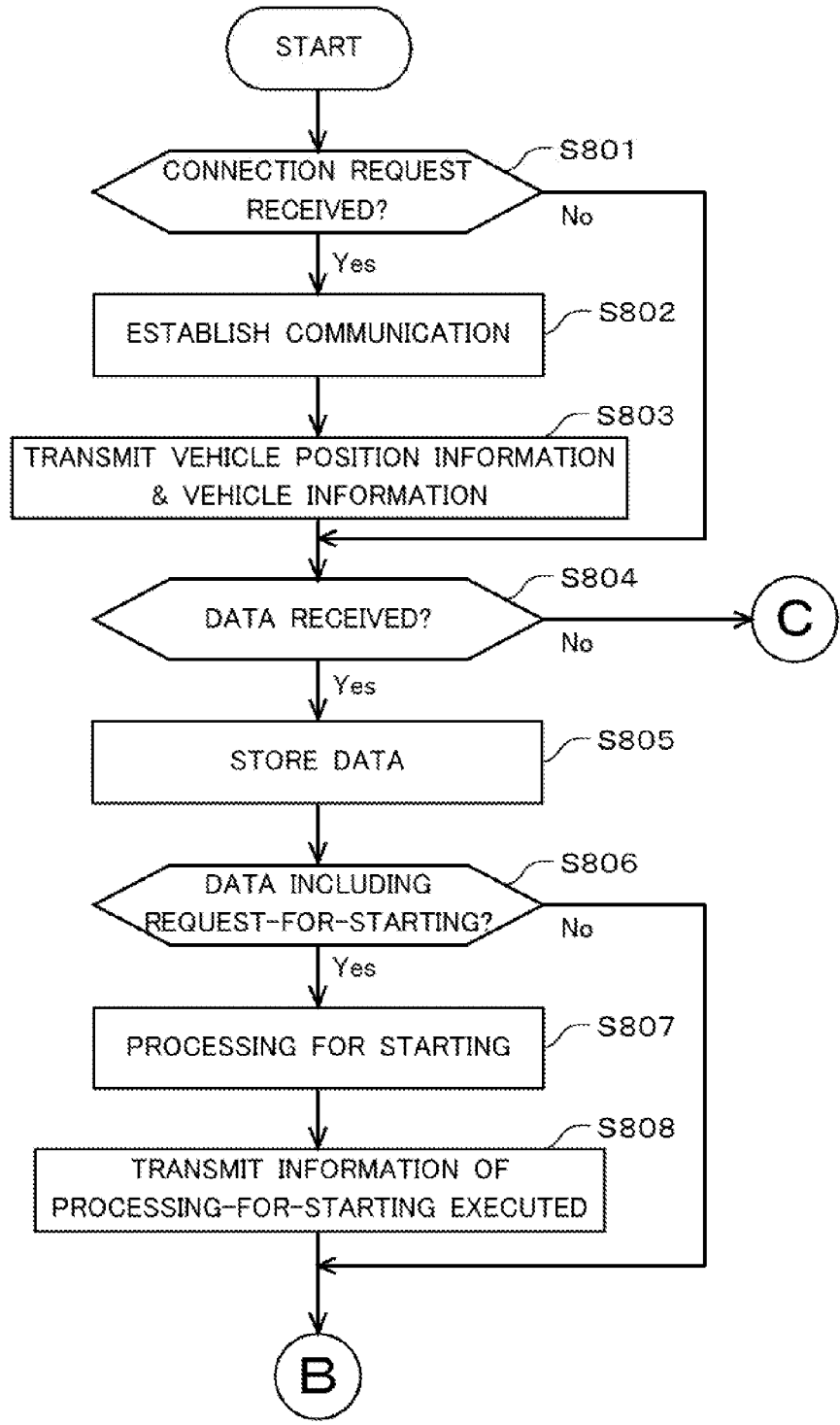
FIG. 8 shows another flowchart of the processing on the remote starter.
Figure 9:
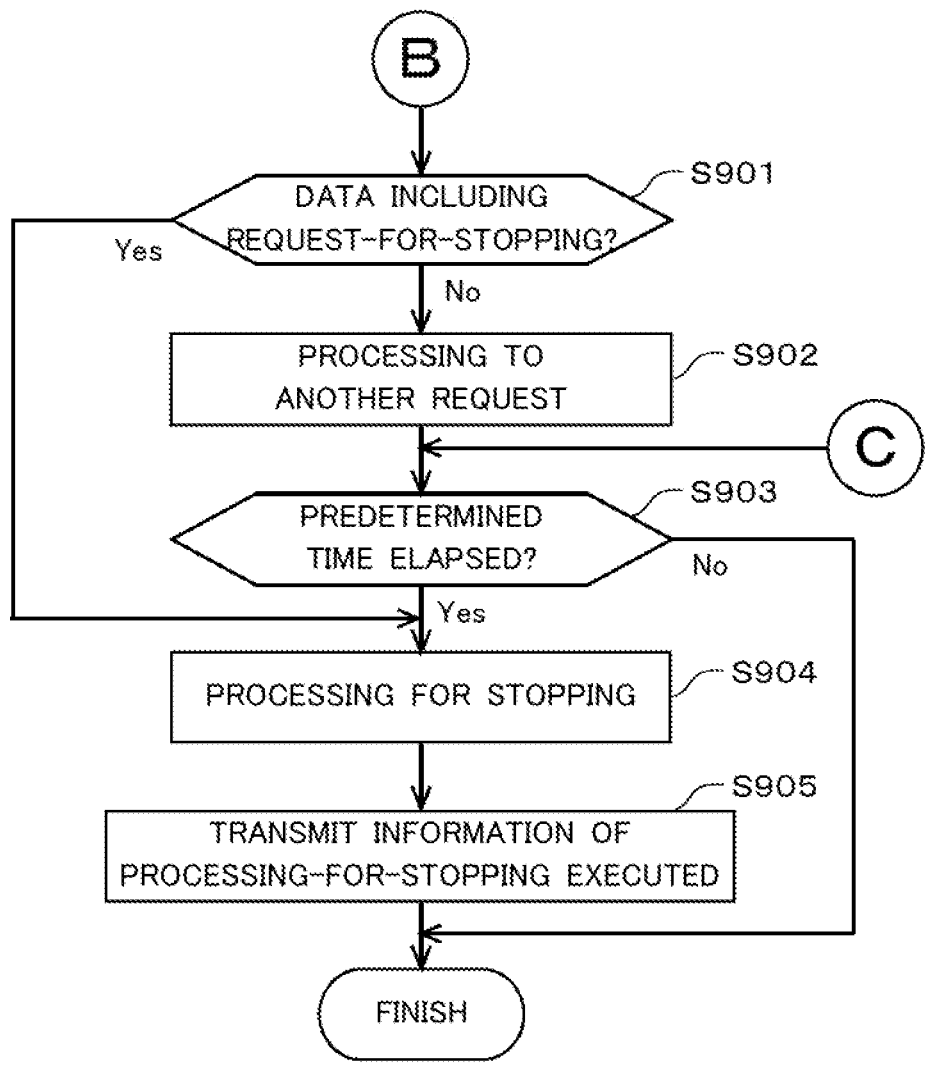
FIG. 9 shows another flowchart of the processing on the remote starter.

Described next is the processing on the remote starter 10 for starting the driving apparatus. Each of FIG. 8 and FIG. 9 shows the flowchart of the processing for starting on the remote starter 10.

First, the controller 11 judges whether the request for connection has been received from the center 30 (step S801). The controller 11 makes this judgment based on the judgment on whether the command of the request for communication connection has been received from the center 30 via the communicator 13. When the controller 11 judges that the request for communication connection has not been received (No at the step S801), the procedure moves to the step for judging whether any data have been received (step S804). When judging that the request for communication connection has been received (Yes at the step S801), the controller 11, if available, permits the communication connection to establish communication (step S802).

After the communication is established, the controller 11 obtains the current vehicle position information by starting up the position information obtaining part 12, and the current vehicle information from the vehicle information obtaining part 11a. Then, the controller 11 transmits the obtained current vehicle position information and the obtained current vehicle information to the center via the communicator 13 (step S803). The vehicle position information in this case is the position information obtained by the position information obtaining part 12 when the command of the request for communication connection has been received from the center 30. The vehicle information in this case is the vehicle information obtained by the vehicle information obtaining part 11a when the command of the request for communication connection has been received, or the vehicle information stored in the memory 14 but not having been transmitted. In this processing, the controller 11 may transmit only the vehicle position information, not the vehicle information.

Next, the controller 11 judges whether any data have been received from the center 30 (step S804). When the controller 11 judges that any data have not been received (No at the step S804), the procedure moves to the step, described later, for judging whether the predetermined period of time has elapsed (through C in FIG. 8 to step S903).

When judging that some data have been received (Yes at the step S804), the controller 11 stores the received data 14d in the memory 14 (step S805). The information judging part 11b may store the data 14d in the memory 14 after judging the contents of the data, or may store the data 14d without the judgment. The received data include various kinds of commands, for example, the command of the request for starting the driving apparatus or each of the various apparatuses, and the command of the request for transmitting the vehicle position information or the vehicle information.

Next, the information judging part 11b judges whether the data received from the center include the command of the request for starting the driving apparatus (step S806). The information judging part 11b makes this judgment by judging the contents of the received data. In the case where the contents of the received data are judged for storage in the memory 14, another processing for judging whether the command of the request for starting is stored in the memory 14 may be executed instead.

When the received data include the command of the request for starting the driving apparatus (Yes at the step S806), the starting controller 11c executes the processing for starting the driving apparatus (step S807). Concretely, upon reception of the command of the request for starting, the starting controller 11c transmits the signal for starting via CAN to the power source ECU. The power source ECU makes an ACC relay, an ignition switch relay and a starter relay be in the on-state, and transmits an ACC signal, an ignition signal and a starter signal to an engine ECU. Upon reception of these signals, the engine ECU starts a starter motor to start an engine. This enables remote control to start the engine. In the case of the vehicle equipped with a so-called immobilizer, the starting controller 11c executes the processing for certification with the ECU that controls the immobilizer.

After executing the processing for starting the driving apparatus based on the command of the request for starting, the controller 11 transmits to the center 30 via the communicator 13 the information indicating that the processing for starting has been executed (step S808), and the procedure moves to the next step (B in FIG. 8).

When the information judging part 11b judges that the data received from the center 30 do not include any command of the request for starting the driving apparatus (No at the step S806), the procedure moves to the next step without execution by the starting controller 11c in terms of the processing for starting (B in FIG. 8).

Next, the information judging part 11b judges whether the data received from the center include the command of the request for stopping the driving apparatus (step S901). The information judging part 11b makes this judgment by judging the contents of the received data, as well. When the received data include the command of the request for stopping the driving apparatus (Yes at the step S901), the starting controller 11c executes the processing for stopping the driving apparatus (step S904). The processing for stopping is described later.

When the information judging part 11b judges that the data received from the center 30 do not include the command of the request for stopping the driving apparatus (No at the step S901), the starting controller 11c executes the processing corresponding to another request without execution of the processing for stopping at this point (step S902). The processing corresponding to another request is executed when the received data include a command other than the ones of the request for starting and stopping the driving apparatus (hereafter, referred to as "another command"), as a response to the received another command.

That is, the information judging part 11b judges whether the received data include another command. The starting controller 11c executes the processing as the response to the command, if any. In an example, when the received data include the command for locking a door, the starting controller 11c executes the processing for locking the door. When the received data include the command for unlocking the door, the starting controller 11c executes the processing for unlocking the door. When the received data include the command of the request for transmitting the vehicle information, the starting controller 11c executes the processing for transmitting the requested vehicle information to the center 30 via the communicator 13. When the information judging part 11b judges that the received data do not include any another commands, there is nothing to be done at this step.

Next, the timer 11d judges whether the predetermined period of time has elapsed since the starting of the driving apparatus (step S903). The timer 11d starts measuring time from the starting of the driving apparatus, and judges whether the predetermined period of time has elapsed. The predetermined period of time is, for example, a certain amount of elapsed time since the starting of the driving apparatus, that is, a predetermined so-called warming-up time. For example, 10 minutes may be set as the warming-up time. Or, 20 minutes at maximum may be set as the total time of multiple warming-up operations. However, the predetermined period of time is not limited to these above. An appropriate period of time is permitted to be set.

When the timer 11d judges that the predetermined period of time has elapsed since the starting (Yes at the step S903), the starting controller 11c executes the processing for stopping the driving apparatus (step S904). In an example of the processing for stopping, the starting controller 11c transmits the signal for stopping to the power source ECU via CAN, and the power source ECU makes the ACC relay, the ignition relay and the starter relay be in the off-state to stop the engine drive. This enables remote control to stop the engine.

Then, after executing the processing for stopping the driving apparatus, the controller 11 transmits to the center 30 via the communicator 13 the information indicating that the processing for stopping has been executed (step S905), and the procedure of the processing for remote starting is finished.

When the timer 11d judges that the predetermined period of time has not elapsed (No at the step S903), the procedure of the processing for remote starting is finished without execution of the processing for stopping.

After the communication with the center 30 is established, the center 30 executes the processing for terminating the communication. The processing for termination on the center is described later.

<1-6. Processing on Mobile Terminal>

Figure 10A:
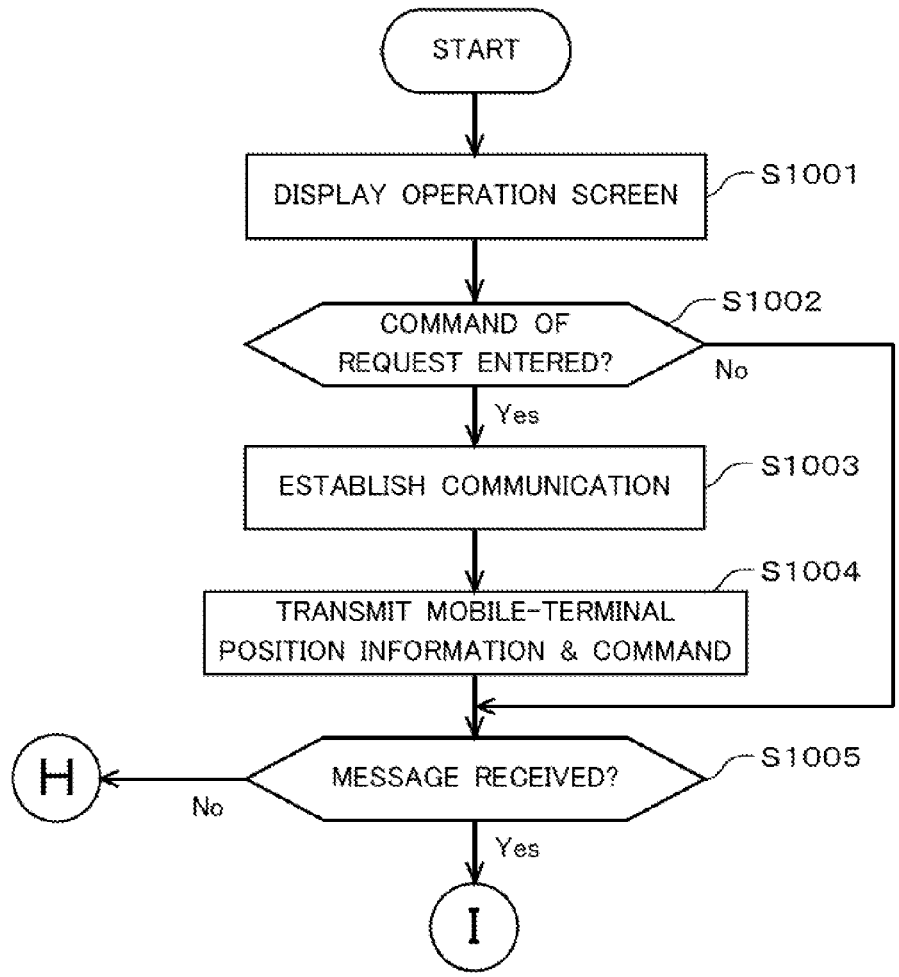
FIG. 10A shows a flowchart of the processing on the mobile terminal.
Figure 10B:
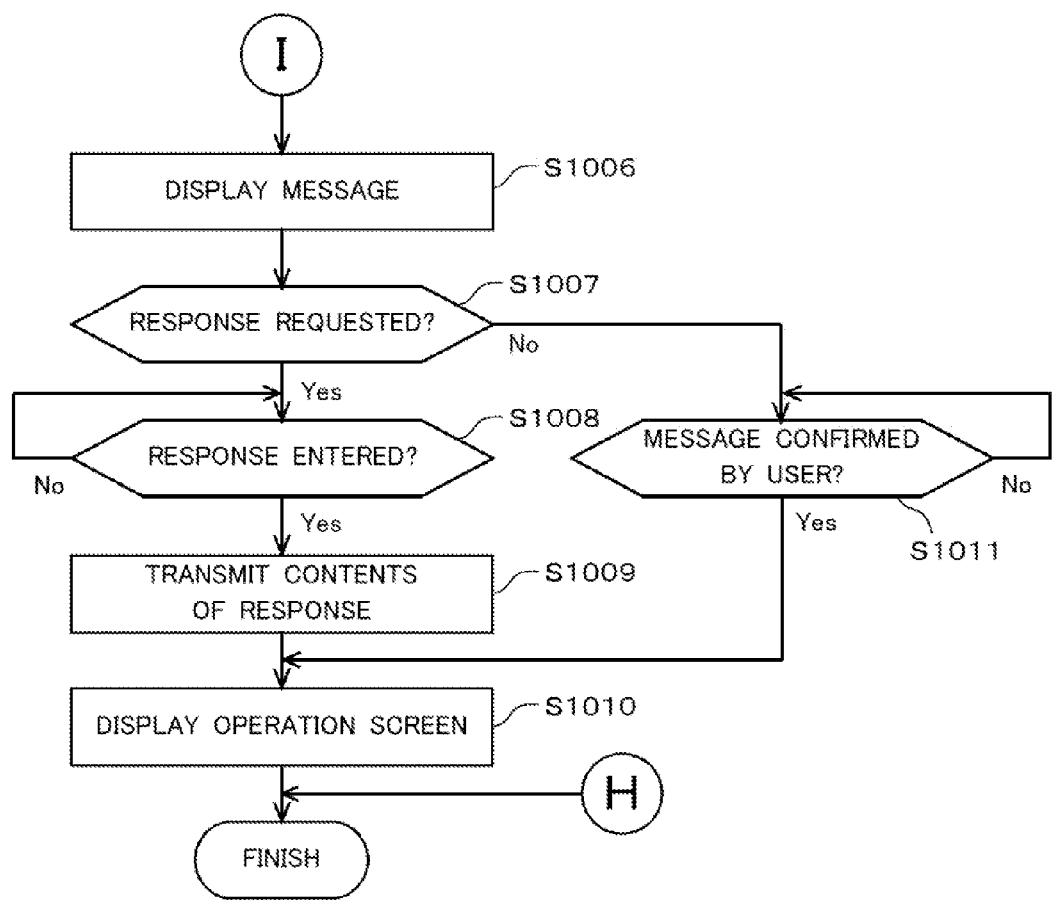
FIG. 10B shows another flowchart of the processing on the mobile terminal.

Next, the processing on the mobile terminal 20 is described. Each of FIG. 10A, FIG. 10B, FIG. 11A and FIG. 11B shows a flowchart of the processing on the mobile terminal 20. Described first is the processing for remote starting by use of the mobile terminal 20. Each of FIG. 10A and FIG. 10B shows the flowchart of the remote starting processing on the mobile terminal 20.

The processing for remote starting by the mobile terminal 20 starts with running the application 24d for remote starting stored in the mobile terminal 20. After the application 24d of the mobile terminal 20 is run, a main operation screen for operation for remote starting is displayed on the display 25 (step S1001). The display controller 21b displays the operation screen on the display 25 by reading out the operation screen stored in the application 24d.

Next, the controller 21 judges whether the command of a request to the center 30 has been entered by the operation of the user on the displayed operation screen (step S1002). When the controller 21 judges that the request command has been entered, the information judging part 21a judges the contents of the entered command. The command to be entered is, for example, of the request for starting or stopping the driving apparatus.

When judging that the request command has been entered (Yes at the step S1002), the controller 21 establishes the communication with the center 30 (step S1003). Concretely, the controller 21 transmits the command of the request for communication connection to the center 30 via the communicator 23. Upon reception of the command of the request for communication connection, the center 30, if available, permits the communication connection to establish the communication.

Next, the controller 21 transmits the entered request command to the center 30 via the communicator 23 (step S1004). Prior to transmission of the entered request command, the position information obtaining part 22 obtains the position information of the mobile terminal 20. Then, the controller 21 transmits the obtained mobile-terminal position information besides the entered request command. When the controller 21 judges that the request command has not been entered (No at the step S1002), the procedure moves to the next step without execution of the processing for transmitting the request command or others.

Next, the controller 21 judges whether any messages have been received from the center 30 (step S1005). Here, the controller 21 makes the judgment including whether any data have been received from the center 30, and whether the received data, if any, are messages. Concretely, the information judging part 21a makes this judgment on whether the received data are messages. The messages to be received from the center 30 are, for example, a confirmation message relevant to continuation of the processing for remote starting, and a response message to the information requested by the user to the center. The concrete examples of these messages are the confirmation message for confirming whether to continue the starting in the case where the restriction conditions for the restriction function are not satisfied, and the response message for transmitting the contents of the vehicle information that has been inquired by the user to the center.

When the controller 21 judges that the message has not been received (No at the step S1005), the procedure of the processing for remote starting is finished without execution of the following processing (H in FIG. 10A). When the controller 21 judges that the message has been received (Yes at the step S1005), the procedure moves to the next step (I in FIG. 10A). Then, the controller 21 displays an appropriate message on the display 25 (step S1006).

The information judging part 21a judges whether the received message is for requesting user's response (step S1007). The message for requesting user's response, in the examples described above, is the confirmation message for confirming whether to continue the starting. The message not for requesting user's response is the response message for transmitting the contents of the vehicle information.

When the information judging part 21a judges that the received message is for requesting user's response (Yes at the step S1007), the controller 21 monitors whether the user's response has been entered (step S1008). The response is entered when the user makes operations on the operation screen. The step for monitoring the user's response is repeated until when it is judged that the response has been entered (No at the step S1008).

When judging that the response has been entered (Yes at the step S1008), the controller 21 transmits the contents of the response to the center via the communicator 23 (step S1009). Then, the controller 21 redisplays the operation screen on the display (step S1010).

When the information judging part 21a judges that the received message is not for requesting the user's response at the step for judging the existence of the response request (No at the step S1007), the controller 21 monitors whether the user has confirmed the displayed message (step S1011). The message not for requesting the user's response is only for presenting the contents to the user. Thus, the controller 21 monitors simply whether the user has confirmed the message. However, the step for monitoring may be omitted, if not needed.

The controller 21 repeats the step for monitoring until it is judged that the user has confirmed the message (No at the step S1011). When judging that the user has confirmed the message (Yes at the step S1011), the controller 21 redisplays the operation screen on the display (step S1010). In an example, the user touches a confirmation button on the operation screen to express confirmation of the message. In this case, the controller 21 judges whether the message has been confirmed by judging whether the confirmation button has been touched.

Later, the user can execute again the processing for remote starting by re-executing the processing from the start. The user can complete the processing for remote starting by shutting down the application 24d for remote controlling.

The communication with the center 30 is terminated not just when the application 24d for remote controlling is shut down, but is automatically terminated when transmitting necessary data to and receiving necessary data from the center 30 are completed. That is, the communication is automatically terminated in the case where it is judged that after the controller 21 has established the communication at the step S1003, a series of responses from the center in terms of the request command transmitted at the step S1004 have been completed. The case where the responses from the center 30 have been completed is the case such as where time information at the time of starting has been received or where the message not for requesting the user's response has been received.

Figure 11A:
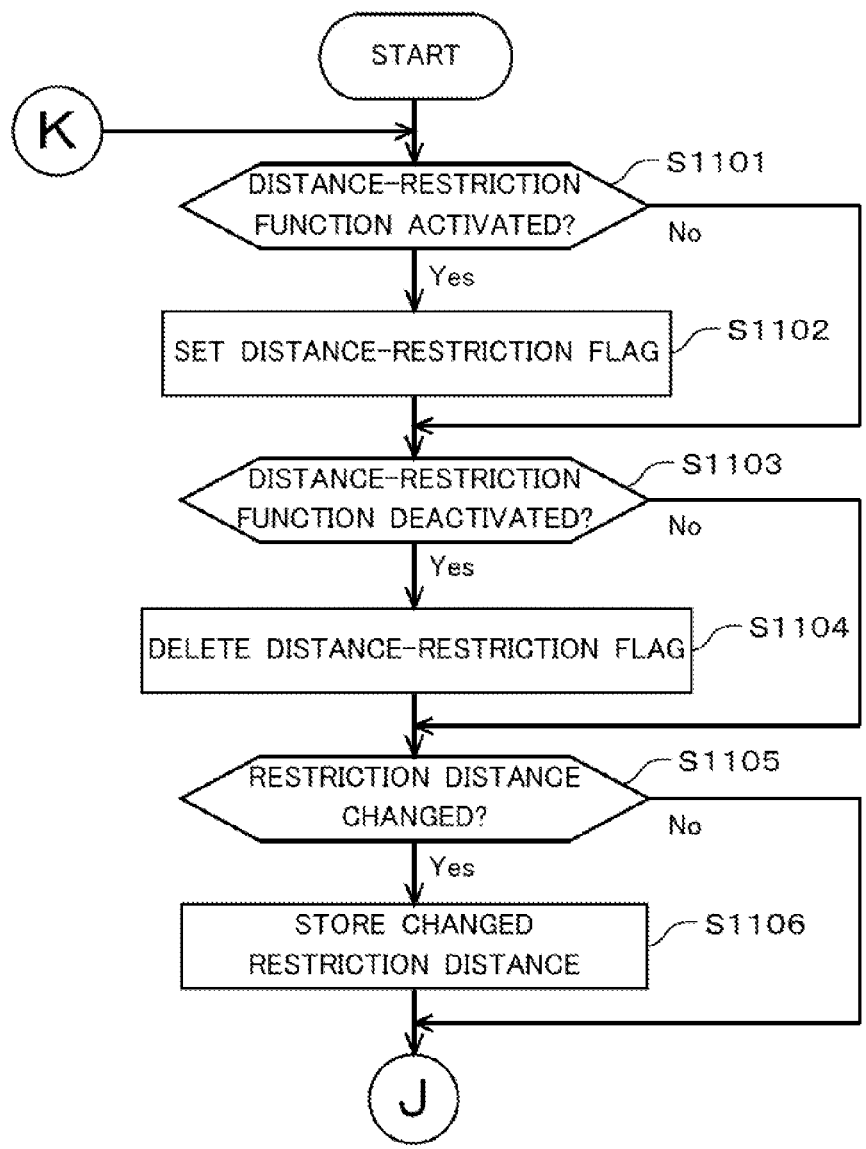
FIG. 11A shows another flowchart of the processing on the mobile terminal.
Figure 11B:
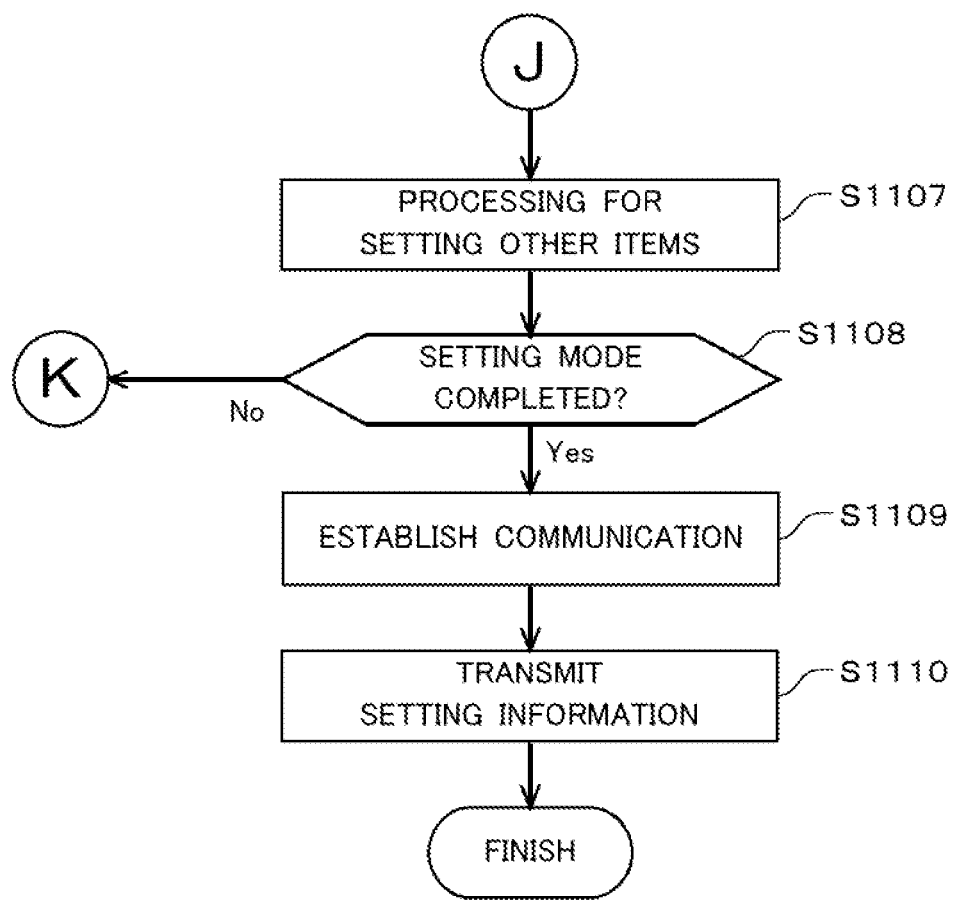
FIG. 11B shows another flowchart of the processing on the mobile terminal.

Described next is the processing for setting the restriction function and for changing the restriction conditions by use of the mobile terminal 20. Each of FIG. 11A and FIG. 11B shows the flowchart of the processing for setting the restriction functions and for changing the restriction conditions in the case where the distance-restriction function is adopted as the restriction function.

The processing for setting the restriction functions and for changing the restriction conditions starts when the user selects the setting mode of the mobile terminal. When the setting mode is selected, the restriction function setting part 21c judges whether the distance-restriction function of the mobile terminal 20 is activated (step S1101). When the distance-restriction function is activated (Yes at the step S1101), the restriction function setting part 21c sets the flag indicating that the distance-restriction function is activated (step S1102). When the distance-restriction function is not activated (No at the step S1101), the flag is not set.

Next, the restriction function setting part 21c judges whether the distance-restriction function is deactivated (step S1103). When the distance-restriction function is deactivated (Yes at the step S1103), the restriction function setting part 21c deletes the flag that activates the distance-restriction function (step S1104). When the distance-restriction function is not deactivated (No at the step S1103), the flag is not deleted.

Next, the restriction function setting part 21c judges whether the restriction distance, one of the restriction conditions, has been changed (step S1105). When the restriction distance is changed (Yes at the step S1105), the restriction function setting part 21c stores the changed restriction distance in the memory 24 (step S1106). Then, the procedure moves to the next step (J in FIG. 11A). When the restriction distance is not changed (No at the step S1105), the processing for changing the restriction conditions is not executed (J in FIG. 11A).

Next, the restriction function setting part 21c executes the processing for setting other items (step S1107). The processing for setting other items is for setting or changing the restriction conditions other than the restriction distance. One of the restriction conditions other than the restriction distance is, for example, the restriction condition relevant to the position-restriction function. When the processing for setting or changing the restriction conditions other than the restriction distance is executed, the restriction function setting part 21c stores the changed setting or the changed restriction conditions in the memory 24. When the processing for setting or changing the restriction conditions is not executed, this step can be omitted.

Next, the restriction function setting part 21c judges whether the setting mode has been completed (step S1108). When the restriction function setting part 21c judges that the setting mode has been completed (Yes at the step S1108), the controller 21 establishes the communication with the center 30 (step S1109). The communication is established in the same manner as the processing described above. When the communication with the center has been established already, this step can be omitted.

The controller 21 transmits to the center 30 via the communicator 23 the setting information 24c that has been read out from the memory 24 after completion of the processing for setting (step S1110), and then, the procedure of the processing for setting the restriction functions and for changing the restriction conditions is finished. When judging that the setting mode has not been completed (No at the step S1108), the restriction function setting part 21c re-executes the procedure starting from the step for judging whether the distance-restriction function is activated (through K in FIG. 11B to the step S1101).

<1-7. Processing on Center>

Figure 12:
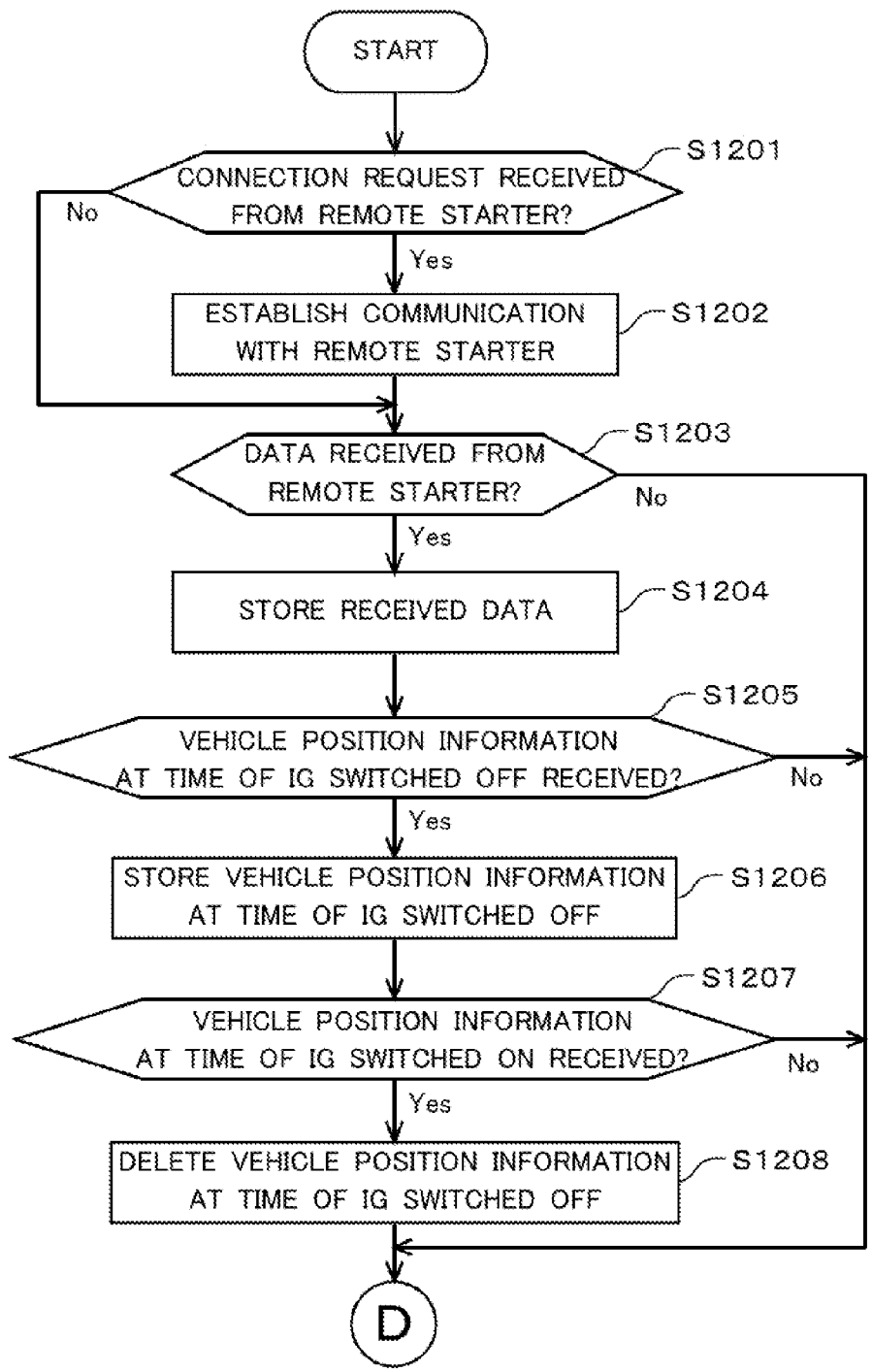
FIG. 12 shows a flowchart of the processing on the center.
Figure 13:
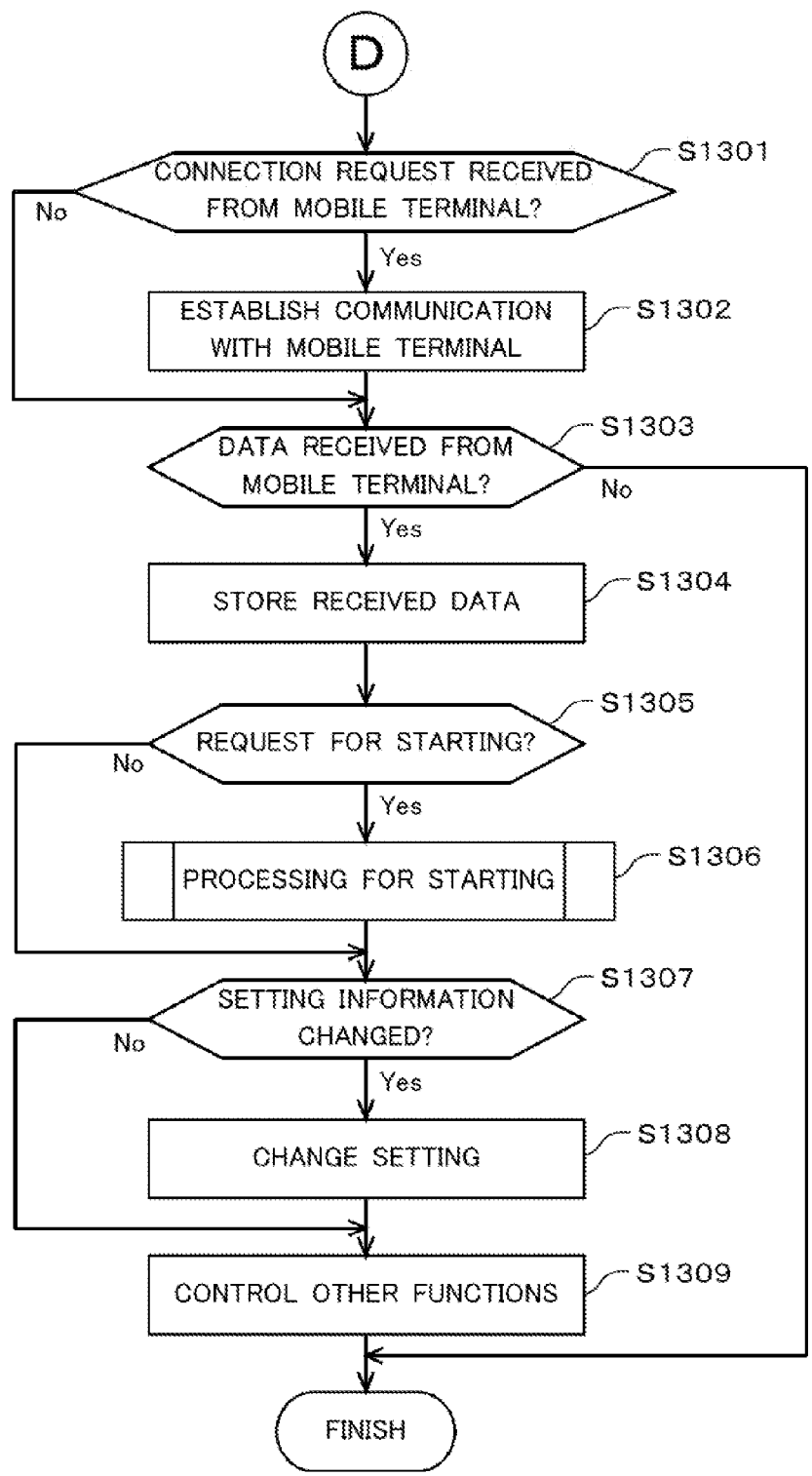
FIG. 13 shows another flowchart of the processing on the center.

Next, the processing on the center 30 is described. Each of FIG. 12, FIG. 13, FIG. 14, FIG. 15 and FIG. 16 shows a flowchart of the processing on the center 30. Described first is the processing on the center 30 for remote starting by communicating with the remote starter and the mobile terminal 20 for transmitting and receiving information. Each of FIG. 12 and FIG. 13 shows the flowchart of the processing for remote starting on the center 30.

The center 30 judges whether the request for connection has been received from the remote starter 10 (step 1201). The controller 31 makes this judgment by judging whether the command of the request for communication connection has been received from the remote starter 10. When judging that the request for communication connection has been received from the remote starter 10 (Yes at the step S1201), the controller 31, if available, permits the communication connection with the remote starter 10 to establish the communication (step S1202). When the controller 31 judges that the request for connection has not been received from the remote starter 10 (No at the step S1201), the procedure moves to the next step without execution of the processing for establishing the communication.

Next, the controller 31 judges whether any data have been received from the remote starter 10 (step S1203). Concretely, the controller 31 judges whether any data have been received via the communicator 32, or whether the source that has transmitted the data, if any, is the remote starter 10.

When judging that some data have been received from the remote starter 10 (Yes at the step S1203), the controller 31 stores the received data in the memory 33 (step S1204). Then, the information judging part 31a judges whether the reception data 33f include the vehicle position information 33b obtained at the time when the ignition switch has been switched off, that is, the vehicle position information at the time of parking start (step S1205).

When the information judging part 31a judges that the reception data 33f include the vehicle position information 33b obtained at the time when the ignition switch has been switched off (Yes at the step S1205), the controller 31 stores in the memory 33 the vehicle position information 33b as "the vehicle position information 33b at the time when the ignition switch has been switched off," that is, the parking start position (step S1206). When the reception data 33f correspond to the undetermined-information, the undetermined-information is stored in the memory 33 as "the vehicle position information 33b at the time when the ignition switch has been switched off."

Next, the information judging part 31a judges whether the reception data 33f include the vehicle position information 33b obtained at the time when the ignition switch has been switched on (step S1207). When the information judging part 31a judges that the reception data 33f include the vehicle position information 33b at the time when the ignition switch has been switched on (Yes at the step S1207), the controller 31 deletes "the vehicle position information 33b at the time when the ignition switch has been switched off" stored in the memory 33 (step S1208). Then, the procedure of the controller 31 moves to the next step (D in FIG. 12).

When the controller 31 judges that any data have not been received from the remote starter 10 (No at the step S1203), the procedure moves to the next step without execution of the processing to respond to the judgment (D in FIG. 12). When the information judging part 31a judges that the reception data 33f do not include the vehicle position information 33b at the time when the ignition switch has been switched off (No at the step S1205), or that the reception data 33f do not include the vehicle position information 33b at the time when the ignition switch has been switched on (No at the step S1207), the procedure moves to the next step without execution of the processing to respond to the judgment (D in FIG. 12).

Next, the center 30 judges whether the request for connection is received from the mobile terminal 20 (step 1301). The controller 31 makes this judgment by judging whether the command of the request for communication connection has been received from the mobile terminal 20. When judging that the request for communication connection has been received from the mobile terminal 20 (Yes at the step S1301), the controller 31, if available, permits the communication connection with the mobile terminal 20 to establish the communication (step S1302). When the controller 31 judges that the request for communication connection has not been received from the mobile terminal 20 (No at the step S1301), the procedure moves to the next step without execution of the processing for establishing the communication.

Next, the controller 31 judges whether any data have been received from the mobile terminal 20 (step S1303). Concretely, the controller 31 judges whether any data have been received via the communicator 32, or whether the source that has transmitted the data, if any, is the mobile terminal 20.

When judging that some data have been received from the mobile terminal 20 (Yes at the step S1303), the controller 31 stores the received data in the memory 33 (step S1304). The received data include the mobile-terminal position information. When the controller 31 judges that any data have not been received from the mobile terminal 20 (No at the step S1303), the procedure of the processing for remote starting is finished without execution of the processing to respond to the judgment.

After the data received from the mobile terminal 20 are stored, the information judging part 31a judges whether the reception data 33f include the command 33g of the request for starting (step S1305). When the information judging part 31a judges that the reception data 33f include the command 33g of the request for starting (Yes at the step S1305), the controller 31 executes the processing for starting (step S1306). The processing for starting is detailed later. When the information judging part 31a judges that the reception data 33f do not include the command 33g of the request for starting (No at the step S1305), the procedure moves to the next step without execution of the processing for starting.

Next, the information judging part 31a judges whether the reception data 33f include the data for changing the setting information 33d (step S1307). When the information judging part 31a judges that the reception data 33f include the data for changing the setting information 33d (Yes at the step S1307), the controller 31 changes the setting information 33d based on the received data, and stores the changed setting information 33d in the memory 33 (step S1308). That is, the controller 31 executes the processing for rewriting the setting information 33d stored in the memory 33 so as to change the setting information 33d to the contents after change. When the information judging part 31a judges that the reception data 33f do not include the data for changing the setting information 33d (No at the step S1307), the procedure moves to the next step without execution of the processing for changing the setting.

Next, the controller 31 executes the control of other functions (step S1309). Concretely, the information judging part 31a first judges whether the reception data 33f include another command 33g. When the information judging part 31a judges that the reception data 33f include another command 33g, the controller 31 executes the processing to respond to the corresponding command 33g. When the information judging part 31a judges that the reception data 33f do not include another command 33g, the controller 31 does not execute the processing. Then, the procedure of the processing for remote starting on the center 30 is finished.

Figure 14:
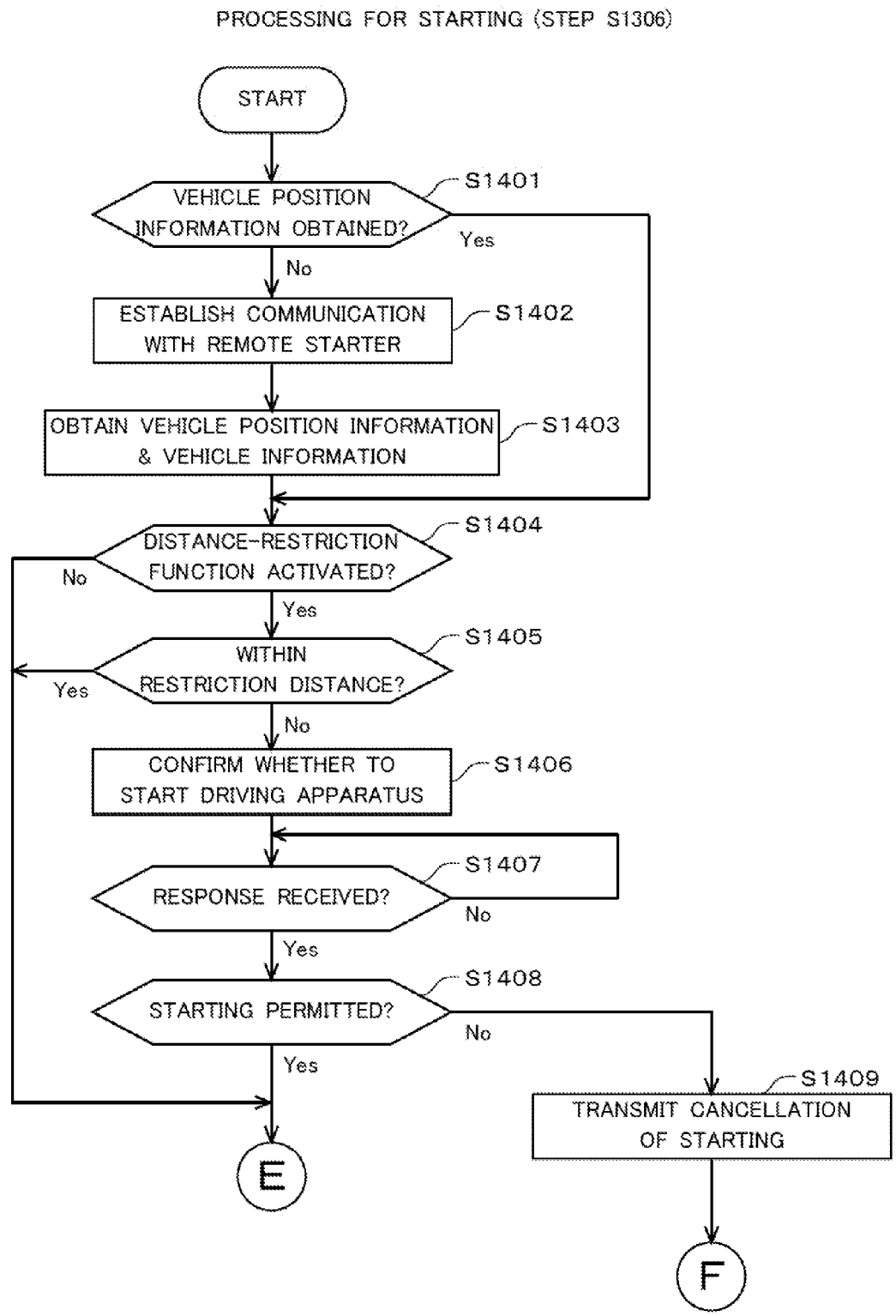
FIG. 14 shows another flowchart of the processing on the center.
Figure 15:
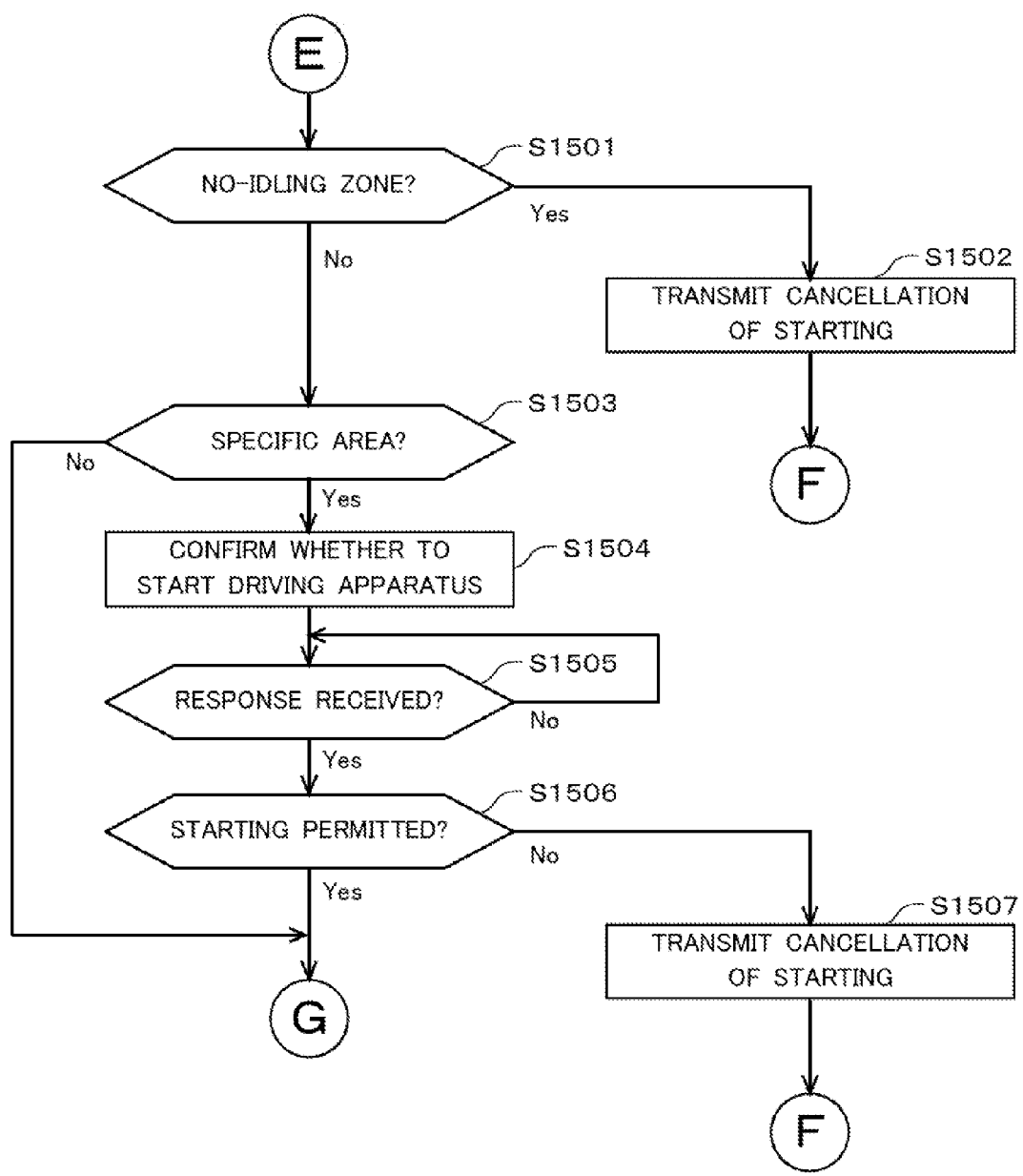
FIG. 15 shows another flowchart of the processing on the center.
Figure 16:
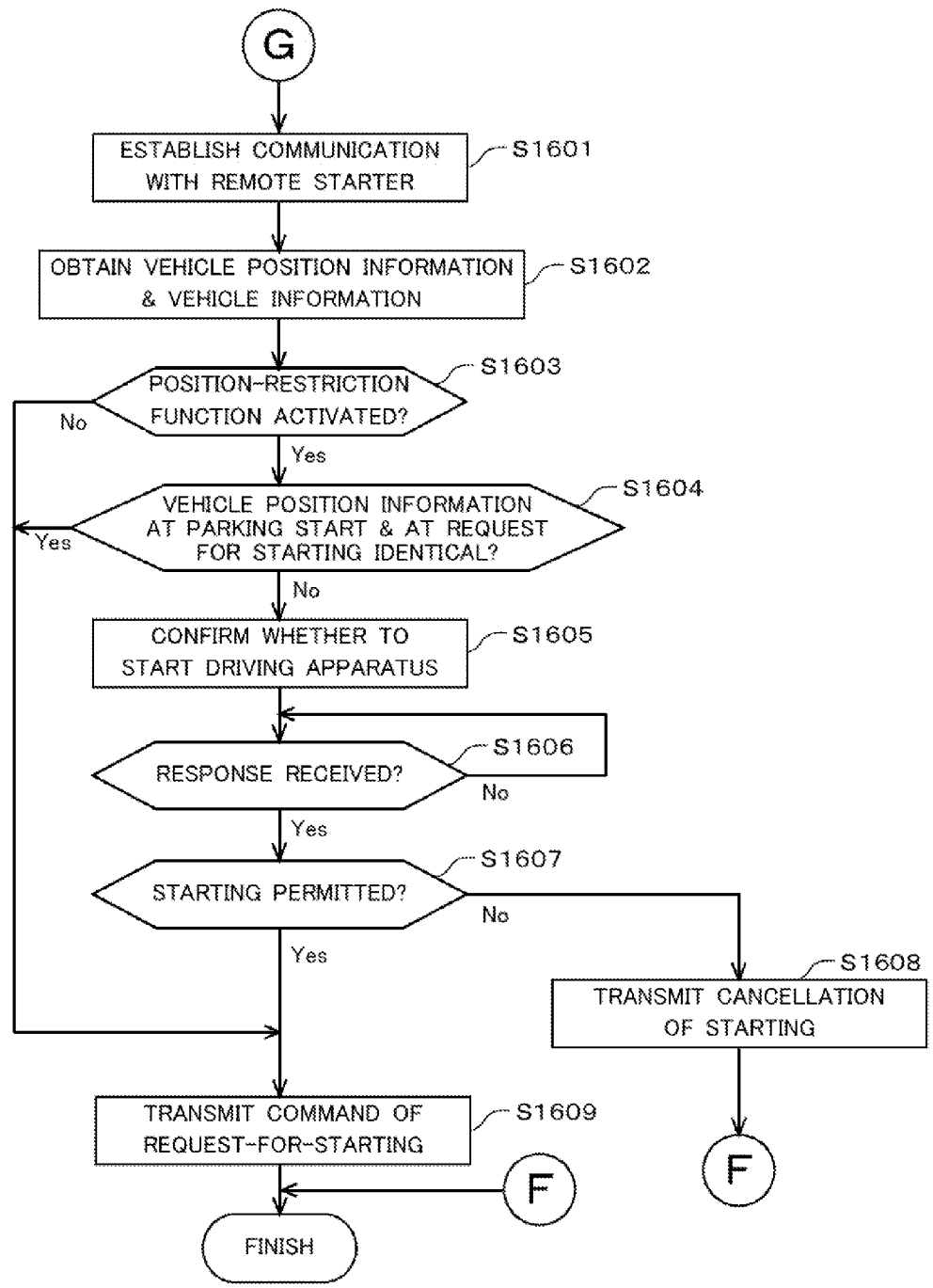
FIG. 16 shows another flowchart of the processing on the center.

Described next is the processing for starting executed by the controller 31 (step S1306). Each of FIG. 14, FIG. 15 and FIG. 16 shows the flowchart of the processing for starting executed by the controller 31.

After the processing for starting is started, the controller 31 first judges whether the vehicle position information has been obtained (step S1401). In the embodiment, when the vehicle under the restriction mode of the remote starter 10 being activated is parked in the restricted area, the processing for transmitting the vehicle position information is forbidden. In this case, the center 30 might not have obtained the vehicle position information. Therefore, the controller 31 judges whether the vehicle position information at the time of parking start has been obtained from the remote starter 10 at the step S1401.

When the controller 31 judges that the vehicle position information has been obtained (Yes at the step S1401), the procedure moves to the next step of the processing for starting without execution of the processing for communication with the remote starter 10. When judging that the vehicle position information has not been obtained (No at the step S1401), the controller 31 executes the processing for obtaining the vehicle position information so as to execute the following steps of the processing for starting. First, the controller 31 transmits the command of the request for communication connection to the remote starter 10 via the communicator 32, and establishes the communication with the remote starter 10 (step S1402).

After the communication is established, the controller 31 obtains the vehicle position information and the vehicle information from the remote starter 10 via the communicator 32 (step S1403). The received vehicle position information is the vehicle position information that has been transmitted at the step S803 in FIG. 8, and indicates the parking position at the time of the request for remote starting. That is, the remote starter 10 is on standby while the ignition switch is in the off-state, and only the communicator 13 is activated. After the communication with the center 30 is established, the remote starter 10 obtains the vehicle position information by activating the controller 11 and the position information obtaining part 12, and then transmits the obtained vehicle position information to the center 30. The obtained vehicle position information is stored in the memory 33 as the vehicle position information 33b (that is, the parking start position).

As above, in the configuration of the embodiment, the processing on the remote starter for transmitting the vehicle position information to the center 30 is forbidden when the vehicle is parked in the restricted area under the condition that the restriction mode of the remote starter 10 is activated. However, the center 30 needs to judge whether to transmit the request for starting when the user makes the request for starting. Therefore, in the configuration of the embodiment, the center 30 communicates with the remote starter 10 to make the request for transmitting the vehicle information.

The case where the center 30 has not obtained the parking start position when receiving the request for starting from the mobile terminal 20 may be occurred when the vehicle is parked in the restricted area, or when the remote starter 10 is not capable of transmitting the vehicle position information because of the remote starter 10 being in the out-of-service area for communications. In either case, it is undesirable that the center 30 transmit the request for starting to the remote starter 10. Therefore, when the parking start position has not been obtained, transmitting the request for starting may be forbidden without establishing the communication with the remote starter 10 to make the request for transmitting the vehicle information. In this case, it is desirable that the data indicating the cancellation of the remote starting be transmitted to the mobile terminal 20 instead of execution of the step S1402 and the step S1403. This further reduces the communication costs between the remote starter 10 and the center 30.

After the vehicle position information is obtained, the starting restricting part 31b judges whether the distance-restriction function is activated (step S1404). In the setting information 33d stored in the memory 33 of the center 30, the distance-restriction function is activated as initial settings. However, when the distance-restriction function is activated or deactivated on the mobile terminal 20, and when such information is transmitted as the setting information to the center 30, the setting information 33d is rewritten to the newly transmitted setting information. The starting restricting part 31b can judge whether the distance-restriction function is activated or deactivated in reference to the stored setting information 33d.

When the starting restricting part 31b judges that the distance-restriction function is not activated (No at the step S1404), the procedure moves to the step of the controller 31 for the processing for starting (E in FIG. 14). When judging that the distance-restriction function is activated (Yes at the step S1404), the starting restricting part 31b judges whether the distance between the position of the mobile terminal 20 and the vehicle position is equal to or shorter than the restriction distance (step S1405). Concretely, the starting restricting part 31b calculates the distance between the position of the mobile terminal 20 and the vehicle position by comparing the mobile-terminal position information 33c at the time of the request for starting and the vehicle position information 33b at the time when the ignition switch has been switched off (at the time of parking start) that are stored in the memory 33. Then, the starting restricting part 31b compares the calculated distance and the restriction distance by reading out the restriction distance from the setting information 33d stored in the memory 33.

When the starting restricting part 31b judges that the calculated distance is equal to or shorter than the restriction distance as a result of the comparison (Yes at the step S1405), the procedure moves to the next step of the processing for starting (E in FIG. 14). When the starting restricting part 31b judges that the calculated distance is longer than the restriction distance (No at the step S1405), the procedure of the controller 31 moves to the step for executing the processing for confirming whether to continue the processing for starting (step S1406). Concretely, the controller 31 transmits to the mobile terminal 20 via the communicator 32 the information indicating that the distance between the position of the mobile terminal 20 at the time of the request for starting and the vehicle position at the time of parking start is longer than the restriction distance, and the inquiry information for confirmation on whether to continue the processing for starting.

Then, the controller 31 monitors whether the response to the inquiry has been received from the mobile terminal 20 (step S1407). When judging that the response has not been received from the mobile terminal 20 (No at the step S1407), the controller 31 repeats the step for the monitoring until receiving the response. When judging that the response has been received from the mobile terminal 20 (Yes at the step S1407), the controller 31 judges whether the contents of the response indicate permission to continue the processing for starting (step S1408).

When the controller 31 judges that the contents of the response from the mobile terminal indicate permission to continue the processing for starting (Yes at the step S1408), the procedure moves to the next step of the processing for starting (E in FIG. 14). When judging that the contents of the response from the mobile terminal 20 indicate non-permission to continue the processing for starting (No at the step S1408), the controller 31 cancels the processing for starting and transmits the data indicating the cancellation to the mobile terminal 20 (step S1409), and the procedure of the processing for remote starting is finished (F in FIG. 14).

When the starting restricting part 31b judges that the calculated distance is longer than the restriction distance, the procedure of the processing for starting may be cancelled without the controller 31 confirming whether to continue the processing for starting. In this case also, the controller 31 executes the processing for transmitting to the mobile terminal 20 the information indicating that the processing for starting has been cancelled. That is, when No is obtained at the step S1405, the procedure moves to the step S1409.

Next, the position judging part 31c judges whether the vehicle is in the no-idling zone (step S1501). As above, the no-idling zones are included in the map information 33e stored in the memory 33. The position judging part 31c reads out the vehicle position information 33b from the memory 33 (that is, the parking start position) and the no-idling zones included in the map information 33e. Then, the position judging part 31c judges whether the parking start position of the vehicle is inside the no-idling zone by comparing the vehicle position information 33b and the no-idling zones. When the position judging part 31c judges that the parking start position of the vehicle is inside the no-idling zone (Yes at the step S1501), since no vehicle is allowed to be kept in the idling condition by the remote starting, the controller 31 cancels the processing for starting without confirming with the mobile terminal 20 on whether to start the driving apparatus, and transmits the information indicating the cancellation to the mobile terminal 20 (step S1502), and the procedure of the processing for remote starting is finished (F in FIG. 15).

When judging that the parking start position of the vehicle is not in the no-idling zone (No at the step S1501), the position judging part 31c judges whether the parking start position of the vehicle is in the specific area (step S1503). Concretely, the position judging part 31c reads out the vehicle position information 33b (that is, the parking start position) from the memory 33 and the specific areas included in the map information 33e. Then, the position judging part 31c judges whether the parking start position of the vehicle is in the specific area by comparing the vehicle position information 33b and the specific areas.

When the position judging part 31c judges that the parking start position of the vehicle is not in the specific area (No at the step S1503), the procedure moves to the next step of the controller 31 of the processing for starting (G in FIG. 15). When the position judging part 31c judges that the parking start position of the vehicle is in the specific area (Yes at the step S1503), the procedure of the controller 31 moves to the step of the processing for confirming whether to continue the processing for starting (step S1504). Concretely, the controller 31 transmits to the mobile terminal 20 via the communicator 32 the information indicating that the parking start position of the vehicle is in the specific area, and the inquiry information for confirmation on whether to continue the processing for starting.

Then, the controller 31 monitors whether the response to the inquiry has been received from the mobile terminal 20 (step S1505). When judging that the response has not been received from the mobile terminal 20 (No at the step S1505), the controller 31 repeats the step for the monitoring until receiving the response. When judging that the response has been received from the mobile terminal 20 (Yes at the step S1505), the controller 31 judges whether the contents of the response indicate permission to continue the processing for starting (step S1506).

When the controller 31 judges that the contents of the response from the mobile terminal indicate permission to continue the processing for starting (Yes at the step S1506), the procedure moves to the next step of the processing for starting (G in FIG. 15). When judging that the contents of the response from the mobile terminal 20 indicate non-permission to continue the processing for starting (No at the step S1506), the controller 31 cancels the processing for starting and transmits the information indicating the cancellation to the mobile terminal 20 (step S1507), and the procedure of the processing for remote starting is finished (F in FIG. 15).

When it is judged that the parking start position of the vehicle is in the specific area, the controller 31 may cancel the processing for starting without confirming whether to continue the processing for starting. In this case also, the controller 31 executes the processing for transmitting to the mobile terminal 20 the information indicating that the processing for starting has been cancelled. That is, when Yes is obtained at the step S1503, the procedure moves to the step S1507.

Next, the controller 31 transmits the command of the request for communication connection to the remote starter 10 via the communicator 32, and establishes the communication with the remote starter 10 (step S1601). After the communication is established, the controller 31 receives the vehicle position information and the vehicle information from the remote starter 10 via the communicator 32 (step S1602). The received vehicle position information is the vehicle position information that has been transmitted at the step S803 in FIG. 8, and indicates the parking position at the time of the request for remote starting. That is, the remote starter 10 is on standby while the ignition switch is in the off-state, and only the communicator 13 is activated. After the communication with the center 30 is established, the remote starter 10 obtains the vehicle position information by activating the controller 11 and the position information obtaining part 12, and then transmits the obtained vehicle position information to the center 30.

When judging that the vehicle position information has not been obtained at the step S1401, the controller 31 executes the processing for obtaining the vehicle position information by establishing the communication with the remote starter 10. That is, when No is obtained at the step S1401, the step S1402 and the step S1403 are executed. Therefore, at the step S1601, the communication with the remote starter 10 has been established, and the vehicle position information has been obtained as well. Therefore, when Yes is obtained at the step S1401, the controller 31 needs to execute the processing of the step S1601 and the step S1602. When No is obtained at the step S1401, the controller 31 need not execute the processing of the step S1601. Furthermore, the controller 31 may not, or may, execute the processing of the step S1602.

Next, the starting restricting part 31b judges whether the position-restriction function is activated (step S1603). In the setting information 33d stored in the memory 33 of the center 30, the position-restriction function is activated as initial settings. However, when the position-restriction function is activated or deactivated on the mobile terminal 20, and when such information is transmitted as the setting information to the center 30, the setting information 33d is rewritten to the newly transmitted setting information. The starting restricting part 31b can judge whether the position-restriction function is activated or deactivated in reference to the stored setting information 33d.

When it is judged that the position-restriction function is not activated (No at the step S1603), the starting directing part 31d transmits the command of the request for starting to the remote starter 10 (step S1609), and the procedure of the processing for remote starting is finished. When judging that the position-restriction function is activated (Yes at the step S1603), the starting restricting part 31b judges whether the vehicle position at the time of parking start (parking start position) is identical to the vehicle position at the time of the request for remote starting that has been received at the step S1602 (step S1604). Concretely, the starting restricting part 31b judges the difference between the vehicle position information 33b at the time when the ignition switch has been switched off (that is, the parking start position), which is stored in the memory 33, and the vehicle position information 33b received at the step S1602 (that is, the parking position at the time of the request for remote starting), by comparing them with each other.

When the vehicle position information at the time of parking start is identical to the vehicle position information at the time of the request for starting, the starting restricting part 31b judges that the positions are identical. When the vehicle position information at the time of parking start is different from the vehicle position information at the time of the request for starting, or when either of them corresponds to the undetermined-information, the starting restricting part 31b judges that the positions are different. Furthermore, when both of the vehicle position information at the time of parking start and the vehicle position information at the time of the request for starting correspond to the undetermined-information, the starting restricting part 31b judges that the positions are identical.

Then, the starting restricting part 31b reads out the restriction conditions included in the setting information 33d stored in the memory 33, and compares the read-out restriction conditions and the difference between the positions. As the restriction conditions in the embodiment, when the positions are identical, the remote starting is permitted; when the positions are different, confirmation on whether to continue the processing for starting is required.

As a result of the comparison, when it is judged that the positions are identical (Yes at the step S1604), the starting directing part 31d transmits the command of the request for starting to the remote starter 10 (step S1609), and the procedure of the processing for remote starting is finished. The judgment that the positions are identical indicates that the vehicle position at the time of parking start is identical to the current vehicle position. The judgment is made on the basis that the vehicle stays without moving against user's will.

When it is judged that the two positions are different (No at the step S1604), the procedure of the controller 31 moves to the step for executing the processing for confirming whether to continue the processing for starting (step S1605). Concretely, the controller 31 transmits to the mobile terminal 20 via the communicator 32 the information indicating that the vehicle position at the time of parking start is different from the vehicle position at the time of the request for starting, and the inquiry information for confirming whether to continue the processing for starting. The judgment that the two positions are different indicates that the vehicle position at the time of parking start is different from the current vehicle position. It is assumed that the vehicle has been moved against user's will such as by theft or tow-away.

Then, the controller 31 monitors whether the response to the inquiry has been received from the mobile terminal 20 (step S1606). When judging that the response has not been received from the mobile terminal 20 (No at the step S1606), the controller 31 repeats the step for the monitoring until receiving the response. When judging that the response has been received from the mobile terminal 20 (Yes at the step S1606), the controller 31 judges whether the contents of the response indicate permission to continue the processing for starting (step S1607).

When the controller 31 judges that the contents of the response from the mobile terminal indicate permission to continue the processing for starting (Yes at the step S1607), the starting directing part 31d transmits the command of the request for starting to the remote starter 10 (step S1609), and the procedure of the processing for remote starting is finished. When judging that the contents of the response from the mobile terminal 20 indicate non-permission to continue the processing for starting (No at the step S1607), the controller 31 cancels the processing for starting, and transmits the information indicating the cancellation to the mobile terminal 20 (step S1608), and the procedure of the processing for remote-starting is finished (F in FIG. 16).

When it is judged that the two positions are different, the procedure of the processing for starting may be cancelled without the controller 31 executing the processing for confirming whether to continue the processing for starting. In this case also, the controller 31 executes the processing for transmitting to the mobile terminal 20 the information indicating that the processing for starting has been cancelled. That is, when No is obtained at the step S1604, the procedure moves to the step S1608.

When all of the necessary data have been transmitted and received between the center and the remote starter 10, the center 30 automatically terminates the communication with the remote starter 10. In an example, when the request for connection is transmitted by the remote starter 10 (step S1201), the controller 31 automatically terminates the communication with the remote starter 10 after data are received from the remote starter 10. When the center 30 establishes the communication with the remote starter 10, the controller 31 automatically terminates the communication when judging that the remote starter 10 has completed transmitting a series of the responses to the received command, such as the command of the request for starting (step S1609). The judgment that the remote starter 10 has completed transmitting the series of the responses is made when information of starting completion or time information at the time of starting has been received.

In the distance-restriction function (from the step S1404 to the step S1409) and the restriction function in the no-idling zone and the specific area (from the step S1501 to the step S1507) based on the processing for remote starting described above, the center 30 judges whether the remote starting is available, by use of the vehicle position information received at the time when the ignition switch is switched off. Only when the remote starting is available, the center 30 transmits the command of the request for starting by establishing the communication with the remote starter 10. Therefore, it is no need for the center 30 to establish communication with the remote starter 10 every time the request for remote starting is received from the mobile terminal 20, which reduces communication costs.

The position-restriction function (step S1603 to step S1608) restricts the starting when the vehicle position at the time of parking start is different from the vehicle position at the time of the request for starting, that is, when the starting is not suitable, which prevents useless starting.

When the vehicle is parked in the no-idling zone or the specific area under the condition that the restriction mode of the remote starter 10 is activated, transmitting the vehicle position information at the time of parking start is forbidden, which reduces the communication costs further.

In the embodiment described above, the restriction mode (step S603 in FIG. 6) for restricting transmission of the vehicle position information at the time of parking start is provided on the remote starter 10, and transmitting the vehicle position information is restricted based on whether the vehicle is parked in the restricted area when the restriction mode is activated. However, the restriction mode is not necessary. In this case, when the vehicle is parked in the restricted area, transmitting the vehicle position information by the remote starter 10 to the center 30 is completely forbidden.

Further, in the embodiment described above, the center 30 executes the processing for starting based on the distance-restriction function, the processing for starting based on the judgment in terms of the no-idling zone and the specific area, and the processing for starting based on the position-restriction function, as the processing for remote starting. However, it is not necessary to execute all of the processing. One or more processing for starting including the processing for starting based on the distance-restriction function may be executed individually or in appropriate combination.

Further, in the embodiment described above, the information of the ignition switch switched off is used as the parking start information. When the ignition switch is switched off, it is judged that parking has started. Thus, the vehicle position information is transmitted to the center. However, making the judgment on the parking start is not limited to this case. Other kinds of the vehicle information are acceptable as long as the information helps to make the judgment on the parking start. In an example of using an engine as the driving apparatus, the judgment that parking has started may be made based on the engine revolution indicating that the engine has stopped. In another example on the vehicle equipped with a keyless entry apparatus, the judgment that parking has started may be made based on the information indicating that a door has been locked by the keyless entry apparatus. The point is just transmitting the vehicle position information after judging that parking has started.

Further, in the embodiment described above, various functions are executed by software, specifically by CPU processing based on programs. However, some of these functions may be executed by electrical hardware circuits. Contrarily, some of the functions executed through hardware circuits in the above descriptions may be executed through software.

In the invention, even when a position information obtaining part can not obtain any position information, the position information obtaining part obtains undetermined-information and transmits the obtained undetermined-information to an information processor. This allows the information processor to understand that the position information obtaining part has not been able to obtain any position information.

Further in the invention, prevented is executing useless processing, such as the processing for transmitting information under the environment where communications are disconnected.

Further in the invention, the position information is read out from memory and transmitted after communications become available, which enables effective processing for communications.

Further in the invention, whether the vehicle position has been changed can be confirmed by comparing the vehicle position at the time when communications have become available and the vehicle position at the time of parking start. This prevents erroneous position information from being transmitted when parking position of the vehicle has been changed.

Further in the invention, the fact that parking has started is certainly detected.

Further in the invention, the information processor can understand that there is a possibility for the vehicle to move from the parking start position, based on the position information at the time of the parking end that is transmitted to the information processor.

Further in the invention, the fact that a user has gotten in the vehicle and manually finished parking state is detected.

Further in the invention, the case where the distance between the vehicle position and the mobile terminal position is longer than a predetermined distance is seen when the vehicle is too far away from the mobile terminal. In such a case, executing the processing for starting on the vehicle may be useless. Therefore, restricting transmission of the request for starting in such a case avoids executing the processing for starting on the vehicle, which prevents executing the useless processing for starting.

Further in the invention, the user can confirm whether to execute the processing for starting of the vehicle, on the mobile terminal to which the information for confirmation on whether to transmit the request for starting is transmitted. Therefore, even when the vehicle position is not identified because the vehicle position information at the time of parking start is unavailable, whether to remotely start the driving apparatus on the vehicle is judged.

Further in the invention, the remote starter can obtain the vehicle position information at the time of parking start by obtaining the vehicle position information and the vehicle information. The remote starter has the restricted area information. Thus, the remote starter is capable of judging whether the vehicle is located inside the restricted area by comparing the position information at the time of parking start and the restricted area information. The remote starter restricts transmission of the position information in the case where the vehicle is located inside the restricted area. This omits unnecessary communications, and prevents the increase of the data communication traffic and communication costs.

Further in the invention, when the vehicle is located inside the area where remote starting is not to be executed or rarely executed, transmission can be restricted.

Further in the invention, the function for switching execution of judgment by the judging part is provided. Therefore, the user can change whether to restrict the transmission at will.

2. Second Embodiment

Next, the second embodiment is described. In the second embodiment, described are the contents to be judged whether to transmit position information based on the execution history of the application stored in a mobile terminal.

There is a so-called car finder, one of the applications used on a mobile phone, which calculates a distance and a direction to a user's vehicle, and displays them. The car finder calculates the distance and the direction to the user's vehicle based on the current user's position and the parking position of the vehicle. Thus, confirming the vehicle position is needed for every use of the car finder. However, if a center communicates with the vehicle every time the user uses the car finder, communication costs increase. Therefore, it is desirable that the parking position of the vehicle be transmitted in advance to the center when the vehicle is parked.

However, if the parking position is to be transmitted to the center every time the vehicle is parked, the vehicle position is transmitted even when the vehicle is parked in the area where remote starting is forbidden, or where the car finder is not needed. This causes unnecessary communication costs. Therefore, it is desirable that the parking position of the vehicle can be transmitted to the center while the communication costs can be reduced.

Hereinafter, some embodiments of the invention are described with reference to attached drawings.

<2-1. Outline of System>

Figure 17:
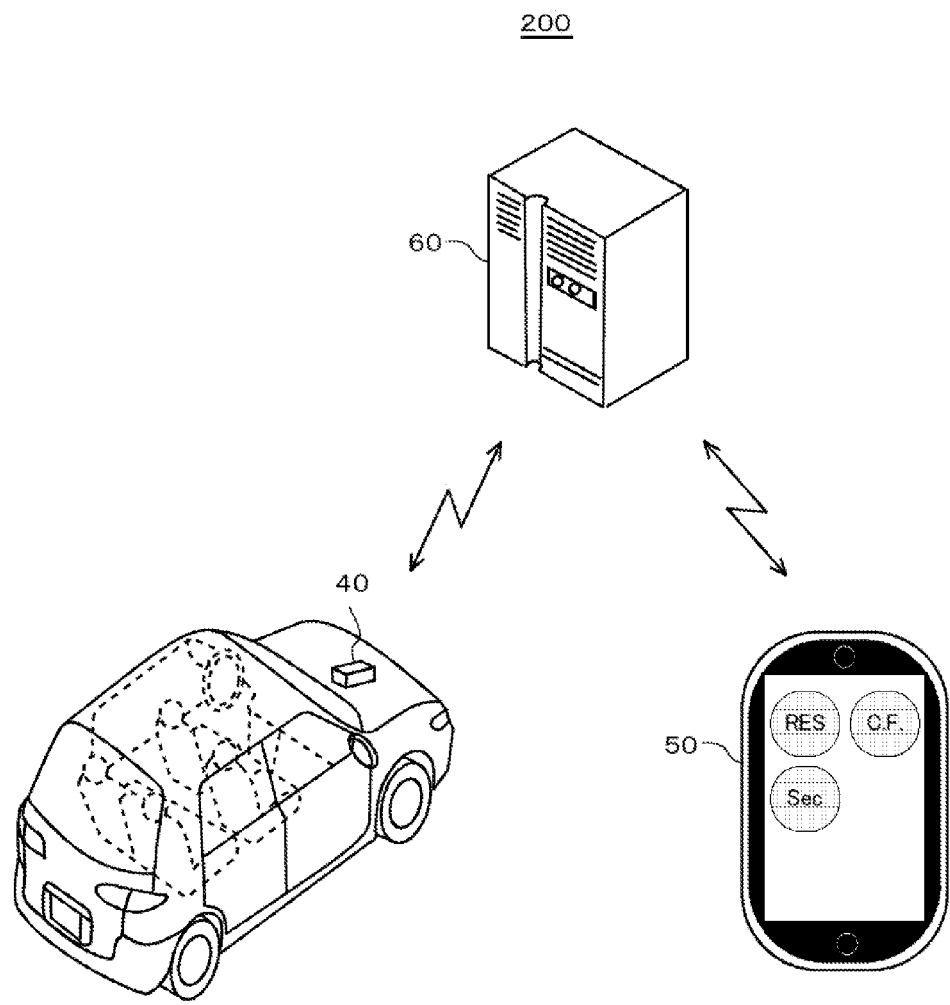
FIG. 17 shows a schematic vehicle control system.

FIG. 17 shows an outline of a vehicle control system 200 of the embodiment. The vehicle control system 200 includes a remote starter 40, a mobile terminal 50 and a center 60.

The remote starter 40 is a vehicle controller that is installed in a vehicle to control the vehicle in accordance with the control information transmitted from the center 60. The remote starter 40 is communicatively coupled to the center 60, and transmits to the center 60 vehicle information including position information at a predetermined timing. Especially, the remote starter 40 transmits the position information at a time of parking start, and also restricts the transmission of the position information based on the execution history of the application stored in the mobile terminal 50. The remote starter 40 receives control information including a request for starting via the center 60 from the mobile terminal 50. Upon receiving the request for starting from the center 60, the remote starter 40 implements controls for starting of a driving apparatus and various apparatuses on the vehicle.

The driving apparatus and the various apparatuses are the same as the ones of the first embodiment. The meanings of "starting" and other descriptions are the same as the ones of the first embodiment.

The mobile terminal 50 is a mobile electronic device carried by the user. The same type of the mobile terminal of the first embodiment can be used as the mobile terminal 50. The mobile terminal 50 stores an application for remotely starting the driving apparatus on the vehicle (hereinafter, referred to as remote starting application). In some cases, the mobile terminal 50 may store an application for displaying the direction and the distance from the current position of the mobile terminal 50 to the parking position of the vehicle (hereinafter, referred to as "car finder application"), or an application for executing an antitheft function (hereinafter, referred to as "security application"). The user can remotely send the request for starting or make various settings by executing operations of the remote starting application stored in the mobile terminal 50. The mobile terminal 50 that is configured to be communicatively coupled to the center 60 receives from the center 60 the parking position information of the vehicle, and transmits to the center 60 the information on the request for starting and the various settings, the position information of the mobile terminal 50, and other information.

The center 60 is an information processor that controls the whole of the vehicle control system 200. The center 60 has the same basic configuration as the one of the remote starter system 100 of the first embodiment. In response to the car finder application activated on the mobile terminal 50, the center 60 of the embodiment controls the transmission of the parking position information of the vehicle to the mobile terminal 50. In the case of the mobile terminal 50 having the security application, the center 60 obtains the vehicle position information from the remote starter 40 at the time of the parking start and periodically during the vehicle being parked. If the obtained vehicle position information is different from the past (that is, the parking position is changed), the center 60 judges that the vehicle has been stolen, and transmits to the mobile terminal 50 the notice indicating that the vehicle has been stolen.

As above, the vehicle control system 200 of the embodiment is capable of controlling the transmission of the vehicle parking position to the information processor while reducing the communication costs, by judging whether to transmit the parking position information based on the execution history of the application stored in the mobile terminal 50. Described hereafter are the configuration and the processing on the vehicle control system 200.

<2-2. Configuration of System>

Figure 18:
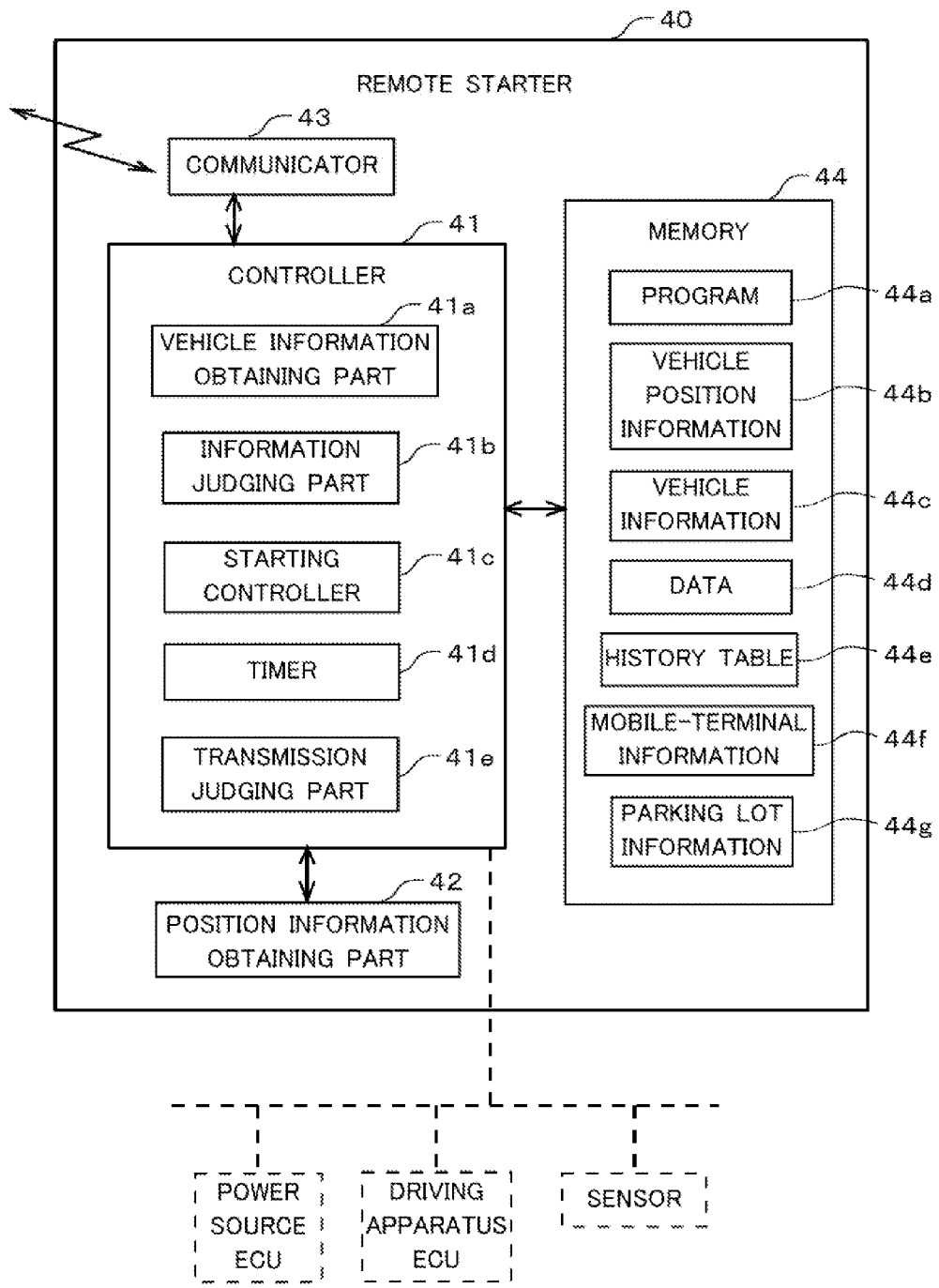
FIG. 18 shows another block diagram of the remote starter.

First, the configuration of the remote starter 40 is described. FIG. 18 shows a schematic block diagram of the remote starter 40. As shown in FIG. 18, the remote starter 40 includes a controller 41, a position information obtaining part 42, a communicator 43 and memory 44.

The controller 41 that includes a vehicle information obtaining part 41a, an information judging part 41b, a starting controller 41c, a timer 41d and a transmission judging part

41*e*, is a computer that has a CPU, RAM and ROM not shown in FIG. 18. The controller 41 is connected to the communicator 43 and the memory 44 that are included in the remote starter 40, and controls the whole of the remote starter 40 by transmitting and receiving information based on a program 44*a* stored in the memory 44. Arithmetic processing by the CPU based on the program stored in the memory 44 provides the functions of the controller 41, such as the information judging part 41*b* and the starting controller 41*c*.

The controller 41 is communicatively coupled to other various sensors and ECUs (Electronic Control Units) installed in the vehicle via an on-vehicle LAN (Local Area Network) such as a CAN (Controller Area Network) for transmitting and receiving various types of information. Since the controller 41 controls the overall processing of the remote starter 40, the controller 41 also controls the other processing besides the processing executed by the vehicle information obtaining part 41*a*, the information judging part 41*b*, the starting controller 41*c*, the timer 41*d* and the transmission judging part 41*e* described above.

The vehicle information obtaining part 41*a* obtains the vehicle information as the information indicating driving conditions or the conditions of other ECUs. The information judging part 41*b* judges the contents of the vehicle information obtained from other sensors and ECUs installed in the vehicle, and judges the contents of the information received from the center 60. The starting controller 41*c* controls the starting or the stopping of the driving apparatus and various apparatuses that are installed in the vehicle. The timer 41*d* measures elapsed time. Each of the vehicle information obtaining part 41*a*, the information judging part 41*b*, the starting controller 41*c* and the timer 41*d* has the same configuration as the each of the first embodiment.

The transmission judging part 41*e* judges whether to transmit the position information to the center 60 at the time of the parking start. The transmission judging part 41*e* judges whether to transmit the parking position information based on the parking position information and the information on the execution history of the application stored in the mobile terminal 50.

The position information obtaining part 42 that obtains the position information as the information indicating the current position of the remote starter 40, has the same configuration as the one of the first embodiment. The communicator 43 that is communicatively coupled to the center 60 and transmits information to and receives information from the center 60, has the same configuration as the one of the first embodiment.

The memory 44 stores the program 44*a*, vehicle position information 44*b*, vehicle information 44*c*, data 44*d*, a history table 44*e*, mobile-terminal information 44*f* and parking lot information 44*g*. The memory 44 of the embodiment is nonvolatile semiconductor memory that is capable of reading and writing data electrically, and of keeping data even in power-off state. For example, EEPROM or flash memory may be used as the memory 44. However, other memory medium or a hard disk drive including a magnetic disk may be used. The program is so-called system software that the controller 41 reads out to execute for controlling the remote starter 40.

The history table 44*e* is the table relevant to the information of the execution history of the application that is stored in the mobile terminal 50 and that is run by use of the parking position information. The mobile-terminal information 44*f* indicates the type of the application that is stored in the mobile terminal 50 and that uses the parking position information. The information of the type of the application is stored as the mobile-terminal information 44*f*, being input on an input apparatus that is not shown in FIG. 18 when the application is stored in the mobile terminal 50, or is obtained from the center 60 for storage. The parking lot information 44*g* associates parking lot information with the area of the parking lot or the parking capacity. The parking lot information 44*g* may be stored in the memory 44 in advance, or may be received from a navigation apparatus for storage in response to the parking position information transmitted to the navigation apparatus not shown in FIG. 18 every time the vehicle is parked.

Figure 19:
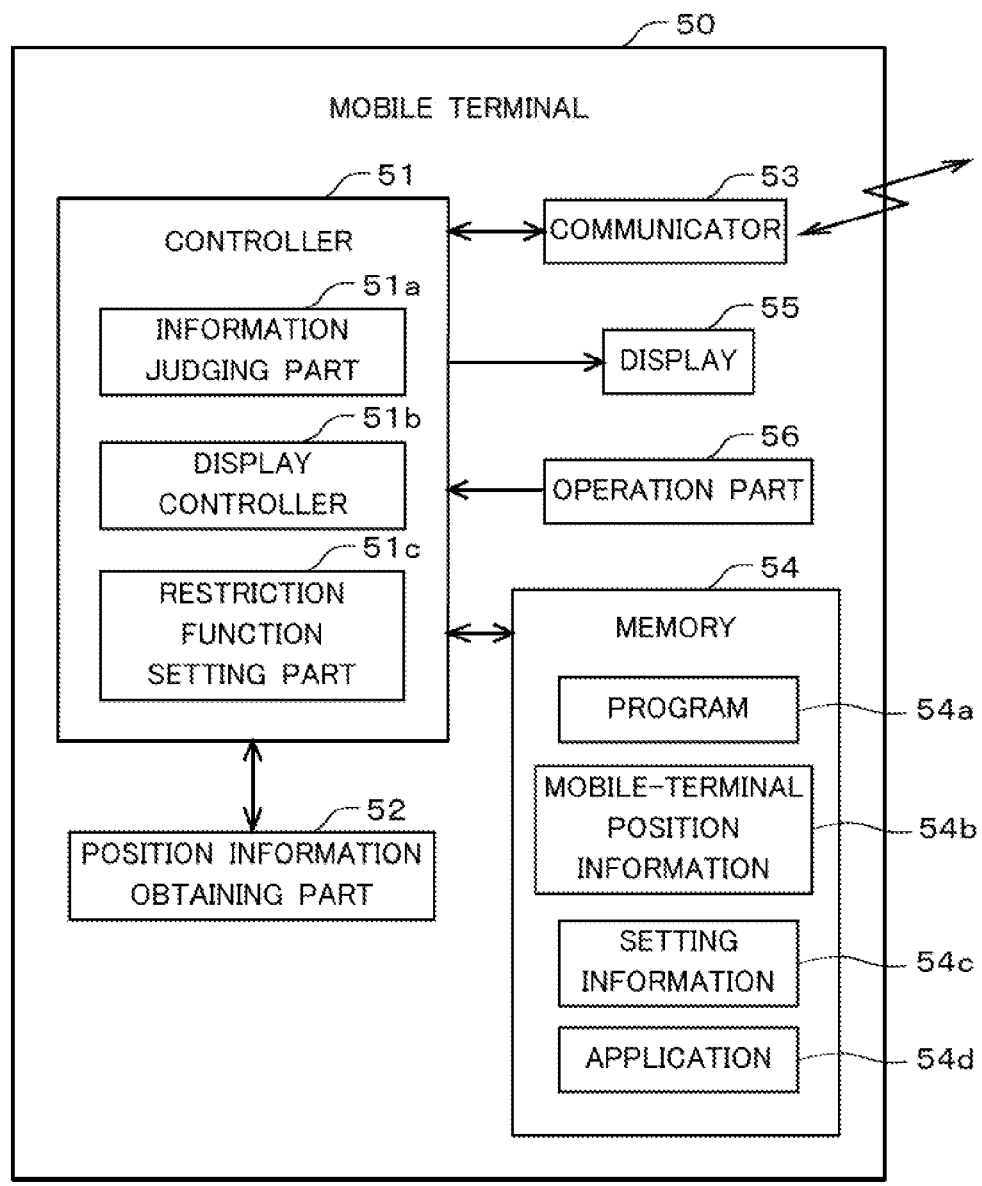
FIG. 19 shows another block diagram of the mobile terminal.

Described next is the configuration of the mobile terminal 50. FIG. 19 shows a schematic block diagram of the mobile terminal 50. As shown in FIG. 19, the mobile terminal 50 includes a controller 51, a position information obtaining part 52, a communicator 53, memory 54, a display 55 and an operation part 56. Each element has the same configuration as the one of the mobile terminal 20 described in the first embodiment.

In the second embodiment, there are some cases where the car finder application or the security application is stored as an application 54*d* stored in the memory 54, besides the remote starting application as the control program for remote starting. Therefore, the display controller 51*b* makes control to display on the display 55 an operation screen for receiving direction for starting the driving apparatus or a check screen received from the center 60, when the remote starting application is run, and makes control to display the direction and the distance to the parking position of the vehicle when the car finder application is run.

Figure 20:
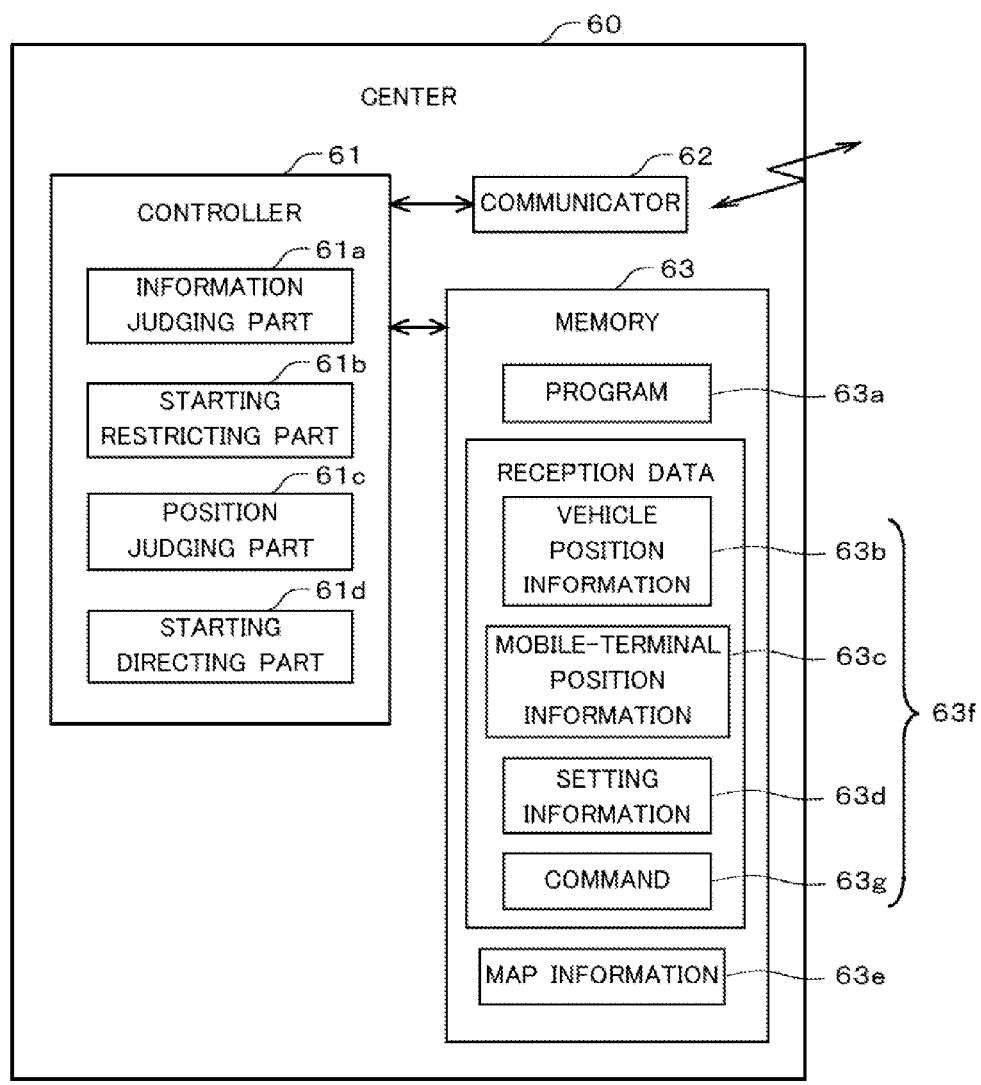
FIG. 20 shows another block diagram of the center.

Next, the configuration of the center 60 is described. FIG. 20 shows a schematic block diagram of the center 60. As shown in FIG. 20, the center 60 includes a controller 61, a communicator 62 and memory 63. Each element has the same configuration as the one of the center 30 described in the first embodiment.

<2-3. Processing on Remote Starter>

Figure 21:
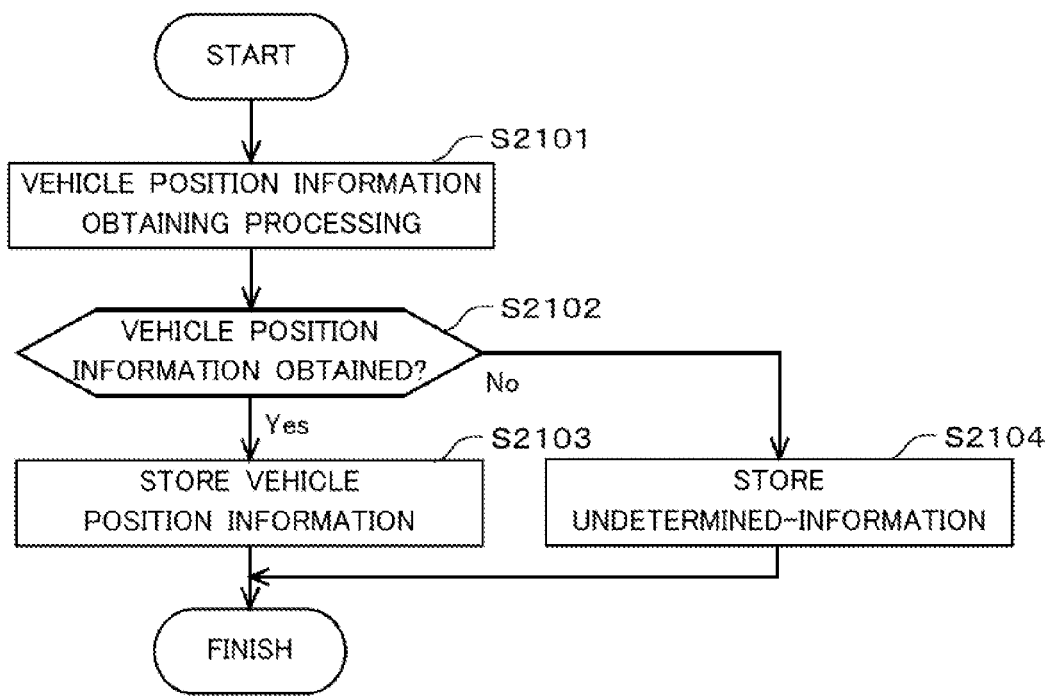
FIG. 21 shows another flowchart of processing on the remote starter.
Figure 22:
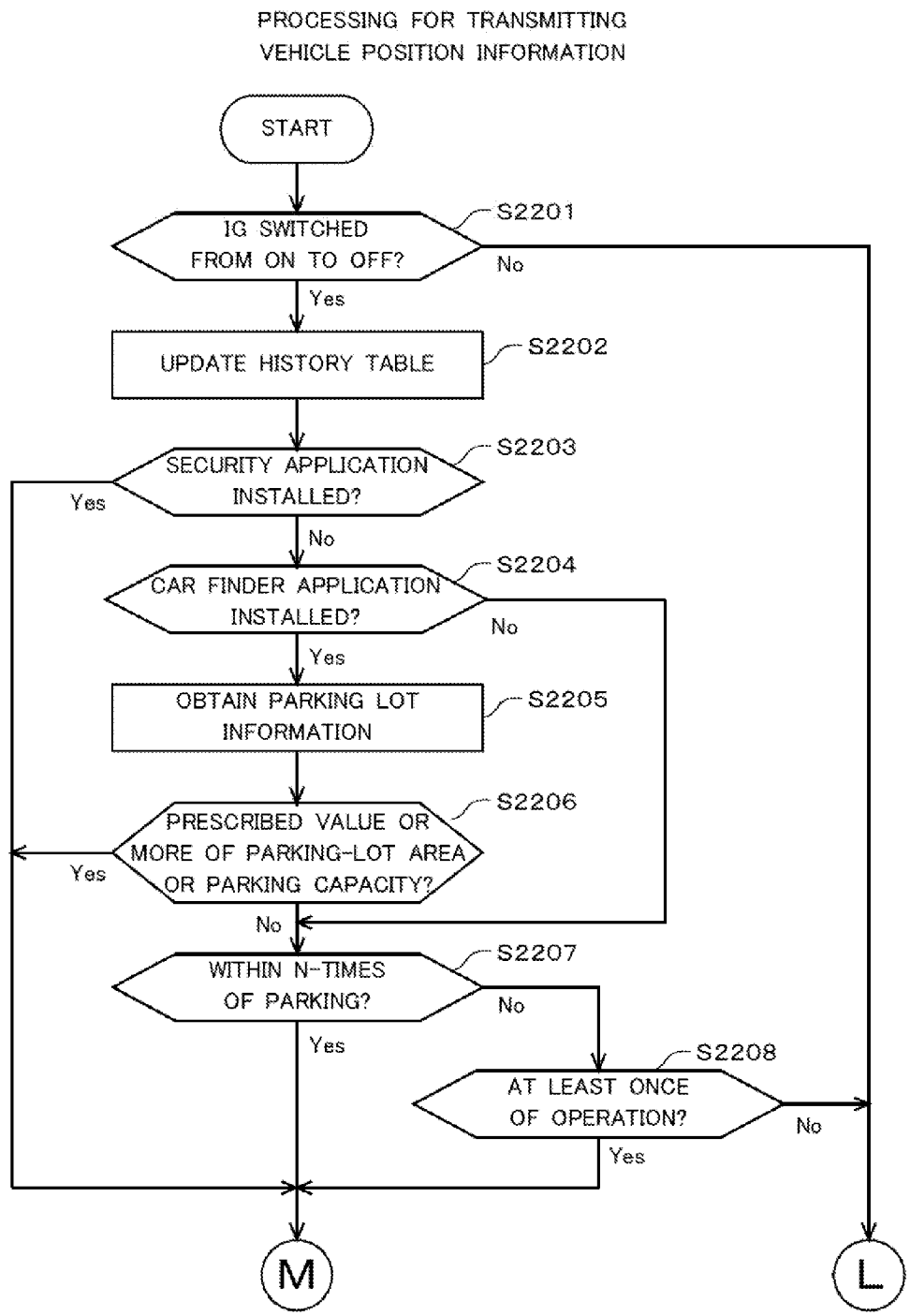
FIG. 22 shows another flowchart of processing on the remote starter.
Figure 23:
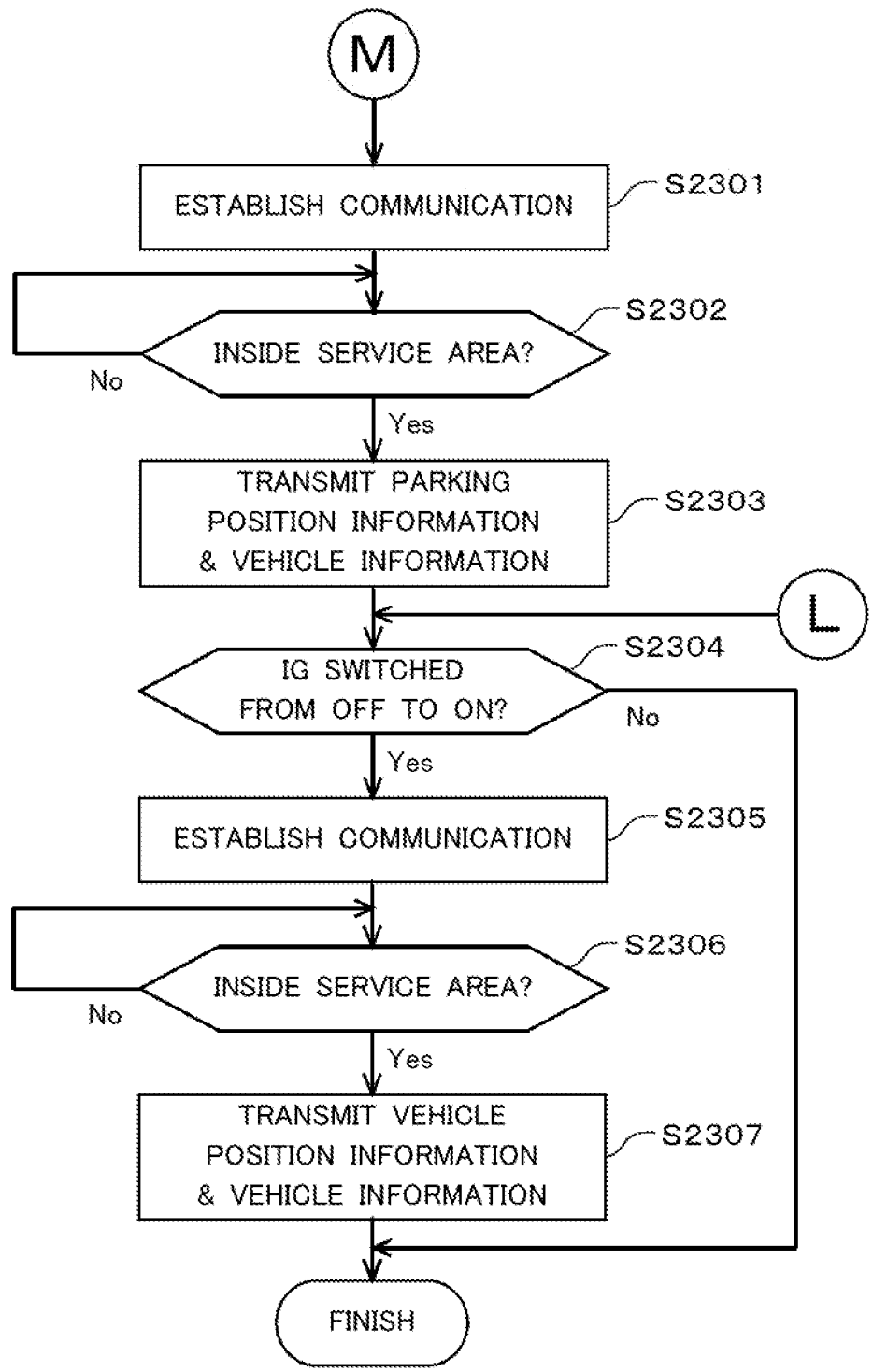
FIG. 23 shows another flowchart of processing on the remote starter.

Described next is the processing on the remote starter 40. Each of FIG. 21, FIG. 22 and FIG. 23 shows a flowchart of the processing on the remote starter 40.

The remote starter 40 obtains the vehicle position information periodically while the ignition switch of the vehicle is in the on-state. Here, described is the processing on the remote starter 40 for obtaining the vehicle position information. FIG. 21 shows the flowchart of the processing on the remote starter 40 for obtaining the vehicle position information.

First, the position information obtaining part 42 executes the processing for obtaining the vehicle position information, for example, every 50 ms or 100 ms (step S2101). When judging that the vehicle position information has been obtained (Yes at the step S2102), the position information obtaining part 42 stores the obtained vehicle position information in the memory 44 (step S2103). When judging that the vehicle position information has not been obtained (No at the step S2102), the position information obtaining part 42 stores undetermined-information in the memory 44 (step S2104). The remote starter 40 repeats the same processing on a regular basis for obtaining the vehicle position information afterward. Each step from the step S2101 to the step S2104 is the same as each of the steps from the step S501 to the step S504 described in the first embodiment.

When an ignition switch is manually switched on or off, the remote starter 40 executes the processing for transmitting the vehicle position information and the vehicle information to the center 60 based on the execution history of the application stored in the mobile terminal 50. Described next is the processing on the remote starter 40 for transmitting the vehicle position information and the vehicle information. Each of FIG. 22 and FIG. 23 shows the flowchart of the processing on the remote starter 40 for transmitting the vehicle position information and the vehicle information to the center 60. In the figures, the ignition switch is indicated as "IG"

First, the vehicle information obtaining part 41a detects whether the ignition switch has been manually switched from the on-state to the off-state (step S2201). Concretely, while the ignition switch is in the on-state, upon reception via CAN from a power source ECU, of the signal indicating that the ignition switch is in the off-state, the vehicle information obtaining part 41a detects that the ignition switch has been switched off from the on-state.

When the vehicle information obtaining part 41a does not detect that the ignition switch has been switched off from the on-state (No at the step S2201), the procedure moves to the step, described later, for detecting whether the ignition switch has been switched on from the off-state (L in FIG. 22).

When the vehicle information obtaining part 41a detects that the ignition switch has been switched off from the on-state (Yes at the step S2201), it is judged that the vehicle is now to be parked. Thus, the position information obtaining part 42 obtains the parking position information. Then, the procedure moves to the step for judgment by the controller 41 on whether to transmit the obtained parking position information to the center 60.

As the processing for judging whether to transmit the parking position information, the controller 41 starts with updating the history table (step S2202). Concretely the controller 41 reads out the history table stored in the memory 44, and executes the processing for adding "1" to the number of times of parking corresponding to the parking position in the history table.

Here is an example of the history table for explanation. FIG. 24 shows a sample history table. As shown in FIG. 24, the history table includes the parking position, the number of times of parking, the month of parking, the number of times of the remote starting executed and the number of times of the car finder executed, which are in an associated manner.

For example, the table indicates that the vehicle has been parked at the parking position "aaa" 26 times in total, including 8 times of the vehicle parked in January. Moreover, the table indicates that, among the cases where the vehicle has been parked at the parking position "aaa" in January; the remote starting has been executed four times, and the car finder has never been executed. The table also indicates that the vehicle has been parked at the parking position "bbb" in July 5 times that includes twice of the remote starter executed, and three times of the car finder application executed. The table may indicate the month of parking not only by one-month unit, but 2-months unit or 3-month unit, or by seasons such as "spring," "summer," "fall" and "winter."

Description here is back to the step S2202 in FIG. 22. When obtaining the parking position information after the ignition switch has been switched off from the on-state, the controller 41 judges whether the parking position corresponding to the parking position information is included in the history table. When the parking position is included, the controller 41 executes the processing for adding "1" to the number of times of parking corresponding to the parking position. When the parking position is not included, the controller 41 executes the processing for adding a new line of the parking position corresponding to the parking position information and for counting the number of times of parking as "1." In the case where it is judged that the vehicle has been parked at "ccc" in August, the controller 41 indicates "5" as the number of times of parking in the history table shown in FIG. 24. In another case where it is judged that the vehicle has been parked at "eee" in October, the controller 41 adds a new line of the parking position "eee," counts the number of times of parking as "1," and indicates "10" as the month of parking.

Next, the transmission judging part 41e judges whether the security application is stored in the mobile terminal 50 (step S2203). The transmission judging part 41e makes this judgment based on whether the mobile-terminal information 44f stored in the memory 44 includes the security application. When judging that the security application is included in the mobile terminal 50 (Yes at the step S2203), the transmission judging part 41e judges that the parking position information is to be transmitted to the center 60. Then, the procedure moves to the step for transmission (M in FIG. 22). This is because, when the security application is included, the anti-theft function may be executed regardless of the parking position and the number of times of parking, and uses the parking position information at the time of execution.

When judging that the security application is not included (No at the step S2203), the transmission judging part 41e judges whether the mobile terminal 50 includes the car finder application at the next step (step S2204). In this case also, the transmission judging part 41e makes this judgment based on whether the mobile-terminal information 44f includes the car finder application. When the transmission judging part 41e judges that the car finder application is not included in the mobile terminal 50 (No at the step S2204), the procedure moves to the next step of the processing for making judgment based on the number of times of parking (step S2207).

When judging that the car finder application is included in the mobile terminal 50 (Yes at the step S2204), the transmission judging part 41e obtains the parking lot information 44g from the memory 44 (step S2205). Then, the transmission judging part 41e judges whether the area or the parking capacity of the parking lot where the vehicle is parked is equal to or more than the prescribed value (step S2206). The prescribed value indicates the area or the parking capacity of the parking lot where it is highly possible that the user of the vehicle uses the car finder application when the user comes back to the user's vehicle.

That is, in the case where the vehicle is parked in a wider parking lot, it is highly possible that the user uses the car finder application for checking the position of the user's vehicle when the user comes back to the vehicle. Therefore, the prescribed value corresponding to the wide area of the parking lot is arbitrarily set. Whether the parking lot is wide enough for the car finder application to be used may be judged not only based on its area or its parking capacity, but based on information of the facility. In the case of the facility obviously having a wide parking lot, such as a major theme park, it is easily judged that the parking lot is wide by only the information of the facility without the area or the parking capacity being judged.

When judging that the area or the parking capacity of the parking lot is bigger than or equal to the prescribed value (Yes at the step S2206), the transmission judging part 41e judges that it is highly possible that the car finder application is used. Then, the procedure moves to the step of the processing for transmitting the parking position information to the center 60 (M in FIG. 22). When judging that the area or the parking capacity of the parking lot is smaller than the prescribed value (No at the step S2206), the transmission judging part 41e judges whether the number of times of parking at the parking lot is n times or less (step S2207).

In the second embodiment, when the vehicle is parked in the place where it is highly possible that the application stored in the mobile terminal 50 is used, the parking position information is to be transmitted. When the vehicle is parked in the place where it is slightly possible on that point, the parking position information is not to be transmitted. Therefore, the transmission judging part 41*e* judges based on the history table, whether the application has been executed in the parking place. In the case of the parking lot where the vehicle has been parked only several times, it is difficult to judge the reason why the user has not used the application, whether the user deems the use of the application is not necessary or the user just has not used the application in that time even there is a possibility of the use.

Therefore, for accurate judgment on the possibility of the application being used by the user, the parking position information is to be transmitted unconditionally until the number of times of parking reaches the predetermined number of times. The number n of times for unconditionally transmitting the parking position information may be small but enough for judging whether it is highly possible that the user uses the application in the parking lot. Arbitral number such as "3," "5" can be set as the number n.

Therefore, the transmission judging part 41*e* judges whether the number of times of parking is equal to or smaller than n at the step S2207. When judging that the number is equal to or smaller than n (Yes at the step S2207), the transmission judging part 41*e* judges that the parking position information is to be transmitted, and the procedure moves to the step for transmission (M in FIG. 22). In the case of n=3 being set, when the vehicle is parked at "ddd" in September, the number of times of parking has been "1" based on the history table in FIG. 24. Thus, the parking position information is to be transmitted.

When judging that the number of times of parking is bigger than n (No at the step S2207), the transmission judging part 41*e* judges whether the number of times of remote starting executed or the number of times of the car finder executed at the parking position is one or above (step S2208). In the case of n=3 being set, when the vehicle is parked at "ccc" in August, the number of times of parking has been "4" based on the history table in FIG. 24. Or when the vehicle is parked at "bbb" in July, the number has been "5". In such cases, the transmission judging part 41*e* judges that the parking position information is not to be transmitted at the step S2207. Then, the procedure moves to the step S 2208 for judging the number of times of execution.

At the step S2208, the transmission judging part 41*e* judges whether the number of times of the remote starting executed or the car finder executed at the parking position is equal to or above "1," based on the history table. When judging that the number of times of the remote starting executed or the car finder executed is smaller than "1" (No at the step S2208), the transmission judging part 41*e* judges that the parking position information is not to be transmitted. Then, the procedure moves to the next step (L in FIG. 22). In the case where the vehicle is parked at "ccc" in August as above, both of the numbers of times of the remote starting executed and the car finder executed are "0." Thus, due to no result of execution, the step for transmitting the parking position information is to be omitted.

When judging that either the number of times of the remote starting executed or the car finder executed is "1" or above (Yes at the step S2208), the transmission judging part 41*e* judges that the parking position information is to be transmitted. Then, the procedure moves to the step for transmission (M in FIG. 22). In the case where the vehicle is parked at "bbb" in July as above, both of the numbers of times of the remote starting executed and the car finder executed are "1" or above. Thus, due to existing of the result of execution, the parking position information is to be transmitted.

The judgment at the step S2208 described above is made based on the number of times of the remote starting executed or the car finder executed corresponding to both of the parking position and the month of parking indicated in the history table. However, the judgment may be made based on the number of times of the remote starting executed or the car finder executed corresponding only to the parking position, regardless of the month of parking. In the case of the mobile terminal 50 not storing the car finder application, the history table includes the data naturally only regarding the remote starting, without the data regarding the car finder application.

As the following step, the controller 41 establishes the communication with the center 60 (step S2301). Then, the communicator 43 judges whether the vehicle is inside the service area where the communication with the center 60 is available (step S2302). In the case of judging that the vehicle is in the service area for communications (Yes at the step S2302), the communicator 43 transmits to the center 60 the parking position information and the vehicle information (step S2303). When judging that the vehicle is not in the service area for communications (No at the step S2302), the communicator 43 judges once again whether the vehicle is in the service area.

Next, the vehicle information obtaining part 41*a* detects whether the ignition switch has been manually switched on from the off-state (step S2304). When the vehicle information obtaining part 41*a* does not detect that the ignition switch has been switched on from the off-state (No at the step S2304), the procedure is finished without execution of the processing.

When detecting that the ignition switch has been switched on from the off-state (Yes at the step S2304), the vehicle information obtaining part 41*a* judges that the vehicle is not to be parked any more. Then, the controller 41 establishes the communication with the center 60 (step S2305). After the communication is established, the communicator 43 periodically judges whether the vehicle is inside the service area where the communication with the center 60 is available (step S2306).

When judging that the vehicle is inside the service area for communications (Yes at the step S2306), the communicator 43 transmits to the center 60 the vehicle position information and the vehicle information (step S2307). When judging that the vehicle is not inside the service area for communications (No at the step S2306), the communicator 43 judges once again whether the vehicle is inside the service area. The procedure from the step S2301 to the step S2307 is the same procedure from the step S607 to the step S704.

As above, when the ignition switch is manually switched off, the remote starter 40 judges whether to transmit the parking position information, based on the parking position and the execution history of the application stored in the mobile terminal 50. When judging that the parking position information is to be transmitted, the remote starter 40 executes the processing for transmitting to the center 60 the parking position information besides the information of the ignition switch being switched off. When the ignition switch is manually switched on, the remote starter 40 executes the processing for transmitting to the center 60 the information indicating that the ignition switch has been switched on, besides the vehicle position information obtained at the time when the ignition switch has been switched on. The remote starter 40 executes the processing shown in FIG. 22 and FIG. 23 periodically, for example, every 50 ms or 100 ms.

Figure 25:
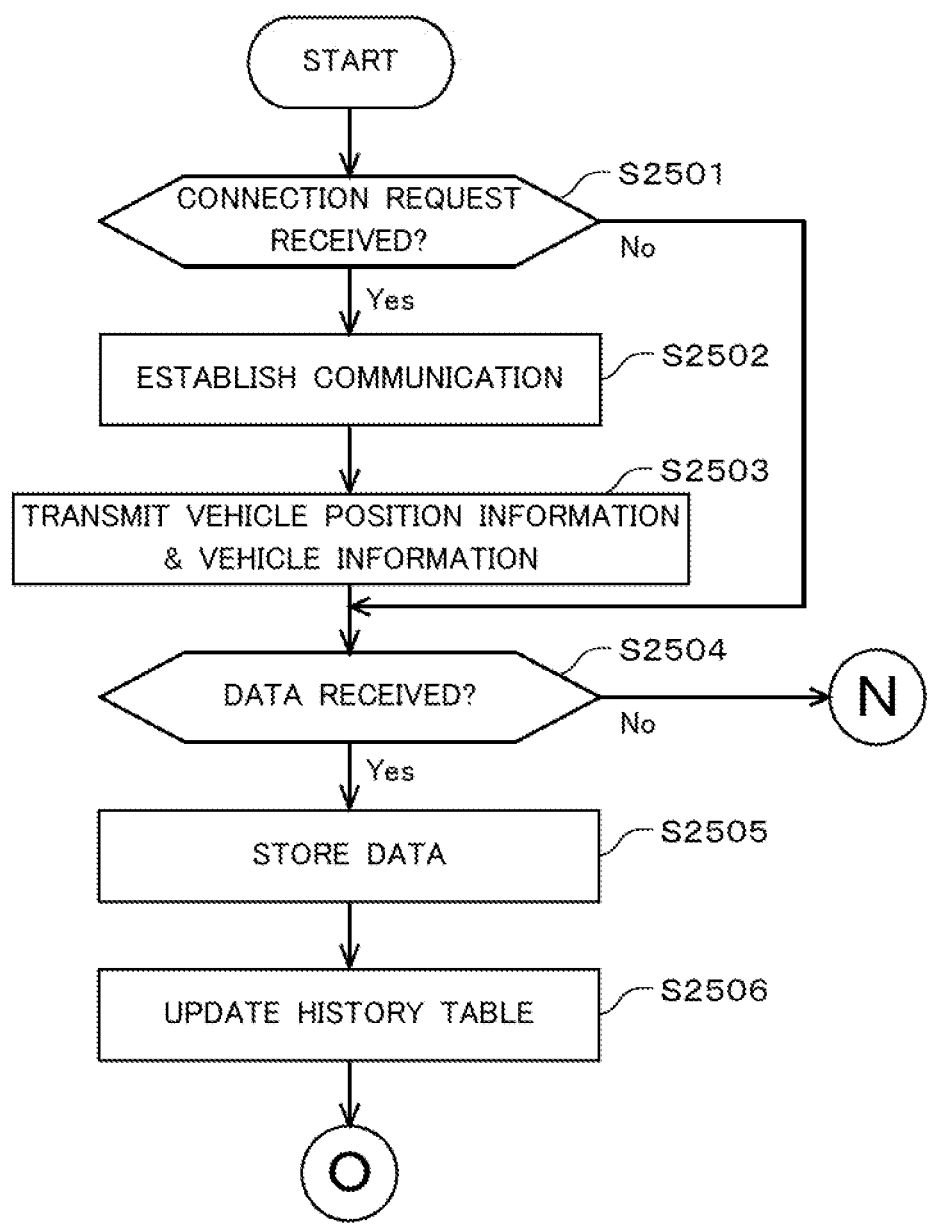
FIG. 25 shows another flowchart of the processing on the remote starter.
Figure 26:
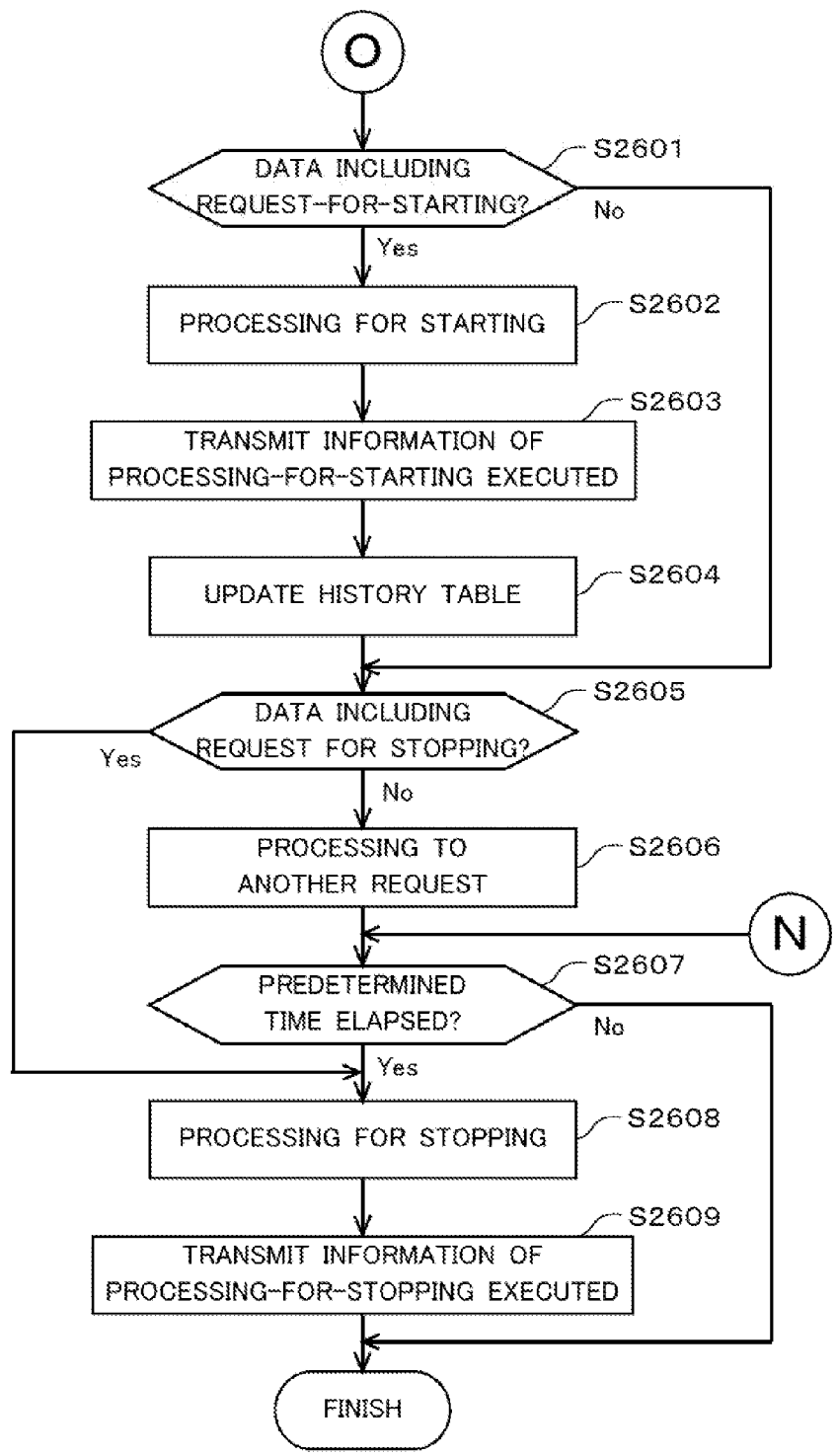
FIG. 26 shows another flowchart of the processing on the remote starter.

Described next is the processing on the remote starter 40 for starting the driving apparatus. Each of FIG. 25 and FIG. 26 shows a flowchart of the processing for starting on the remote starter 40.

First, the controller 41 judges whether the request for connection has been received from the center 60 (step S2501). When the controller 41 judges that the request for connection has not been received (No at the step S2501), the procedure moves to the step for judging whether any data have been received (step S2504). When judging that the request for connection has been received (Yes at the step S2501), the controller 41, if available, permits the connection to establish the communication (step S2502).

After the communication is established, the controller 41 obtains the current vehicle position information by starting up the position information obtaining part 42, and the current vehicle information from the vehicle information obtaining part 41*a*. Then, the controller 41 transmits the obtained current vehicle position information and the obtained current vehicle information to the center via the communicator 43 (step S2503).

Next, the controller 41 judges whether any data have been received from the center 60 (step S2504). When the controller 41 judges that any data have not been received (No at the step S2504), the procedure moves to the next step (N in FIG. 25). When judging that some data have been received (Yes at the step S2504), the controller 41 stores the received data 44*d* in the memory 44 (step S2505). The procedure from the step S2501 to the step S2505 is the same procedure from the step S801 to the step S805.

The received data include various kinds of commands, for example, the command of the request for starting the driving apparatus or each of the various apparatuses, and the command of the request for transmitting the vehicle position information or the vehicle information. The received data include a car finder execution history table. The car finder execution history table includes, as shown in FIG. 27, the number of times of the car finder application executed on the mobile terminal 50 and the parking position information at the time of execution, which are in an associated manner.

The controller 41 updates the history table 44*e* based on the received car finder execution history table (step S2506). That is, upon the reception of the car finder execution history table, the controller 41 rewrites the parking position and the number of times of the car finder executed in the history table 44*e* stored in the memory 44. The method for updating is not limited to this. In an example of another method, the parking positions and the numbers of times of the car finder executed are respectively compared between in the received car finder execution history table and in the history table 44*e*, and then only the changed parts are to be updated.

Next, the information judging part 41*b* judges whether the data received from the center 60 include the command of the request for starting the driving apparatus (step S2601). When the received data include the command of the request for starting the driving apparatus (Yes at the step S2601), the starting controller 41*c* executes the processing for starting the driving apparatus (step S2602). After executing the processing for starting the driving apparatus based on the command of the request for starting, the controller 41 transmits to the center 60 via the communicator 43 the information indicating that the processing for starting has been executed (step S2603). The procedure from the step S2601 to the step S2603 is the same procedure from the step S806 to the step S808.

After that, the controller 41 updates the history table 44*e* (step S2604). That is, the controller 41 executes the processing for adding "1" to the number of times of remote starting corresponding to the parking position and the month of parking relevant to the executed processing for starting in the history table 44*e*.

When the information judging part 41*b* judges that the data received from the center 60 do not include the command of the request for starting the driving apparatus (No at the step S2601), the procedure moves to the next step without execution by the starting controller 41*c* in terms of the processing for starting.

Next, the information judging part 41*b* judges whether the data received from the center 60 include the command of the request for stopping the driving apparatus (step S2605). When the received data include the command of the request for stopping the driving apparatus (Yes at the step S2605), the starting controller 41*c* executes the processing for stopping the driving apparatus (step S2608).

When the information judging part 41*b* judges that the data received from the center 60 do not include the command of the request for stopping the driving apparatus (No at the step S2605), the starting controller 41*c* executes the processing corresponding to another request without execution of the processing for stopping at this point (step S2606).

Next, the timer 41*d* judges whether the predetermined period of time has elapsed since the starting of the driving apparatus (step S2607). When the timer 41*d* judges that the predetermined period of time has elapsed since the starting (Yes at the step S2607), the starting controller 41*c* executes the processing for stopping the driving apparatus (step S2608). Then, after executing the processing for stopping the driving apparatus, the controller 41 transmits to the center 60 via the communicator 43 the information indicating that the processing for stopping has been executed (step S2609), and the procedure of the processing for remote starting is finished.

When the timer 41*d* judges that the predetermined period of time has not elapsed (No at the step S2607), the procedure of the processing for remote starting is finished without execution of the processing for stopping. The procedure from the step S2605 to the step S2609 is the same procedure from the step S901 to the step S905.

Termination of the communication with the center 60 after the communication with the center 60 has been established is conducted by the center 60 in the same manner as the one of the first embodiment.

<2-4. Processing on Mobile Terminal>

Figure 28A:
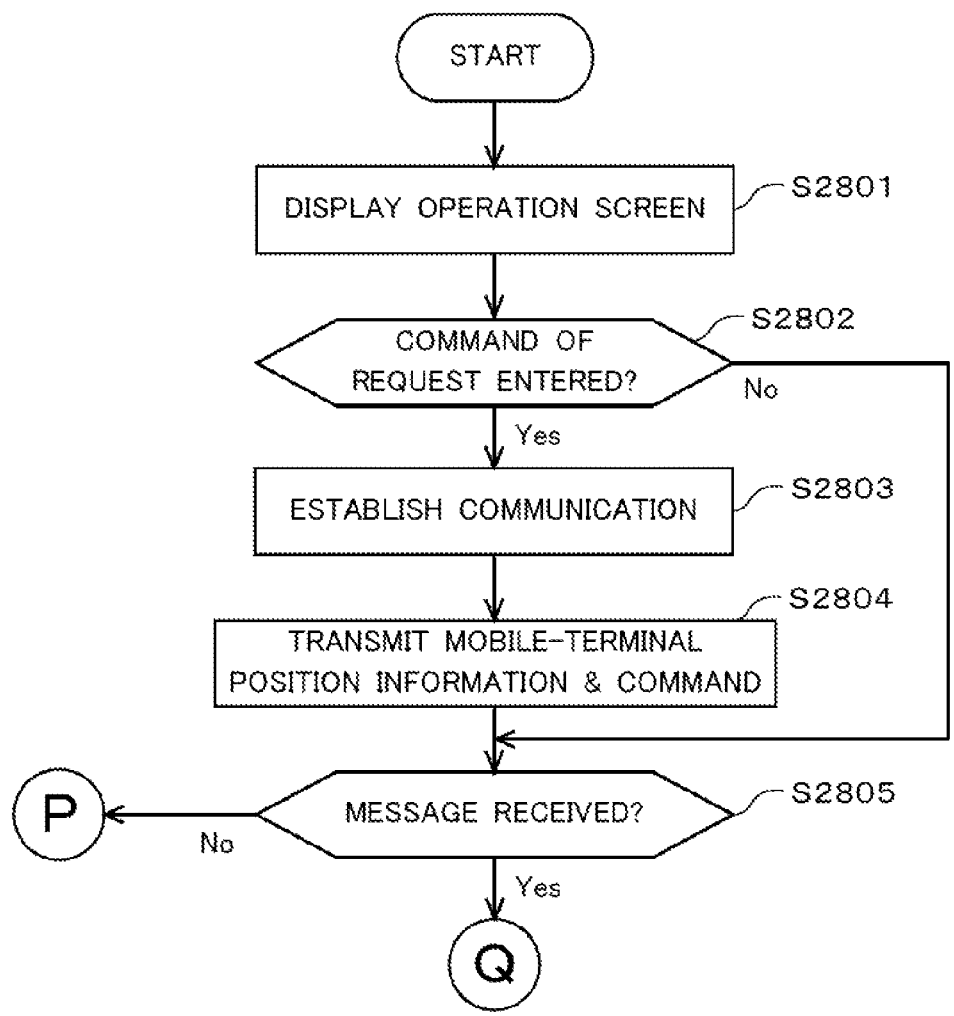
FIG. 28A shows another flowchart of the processing on the mobile terminal.
Figure 28B:
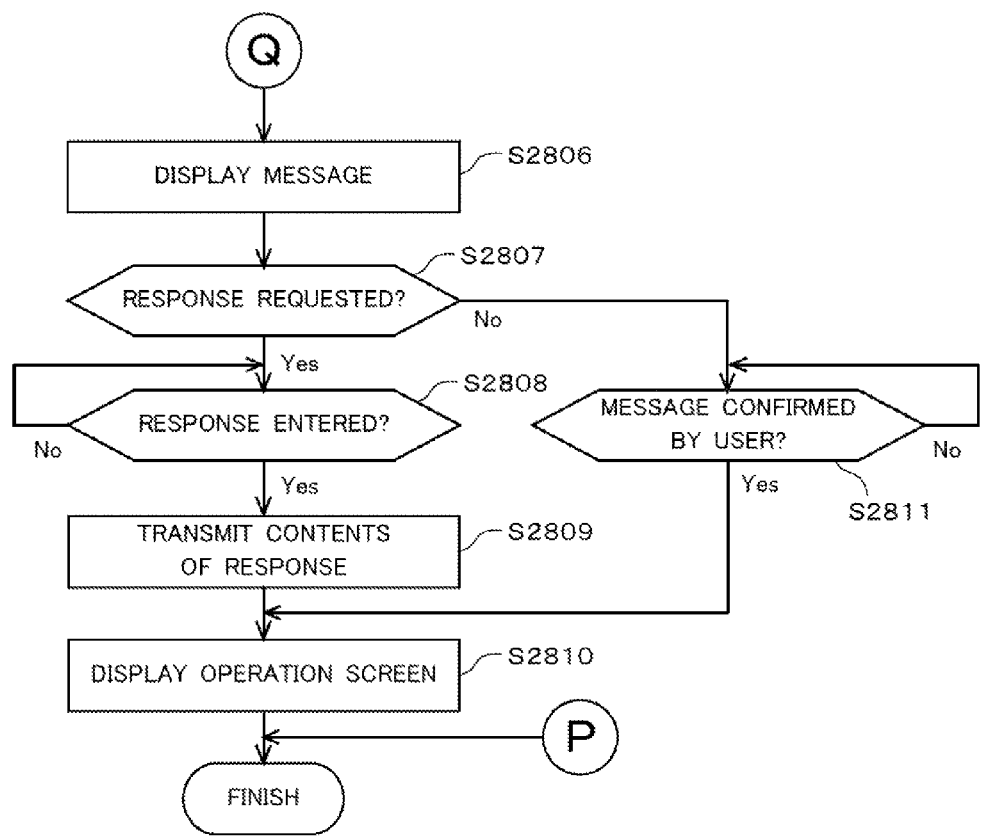
FIG. 28B shows another flowchart of the processing on the mobile terminal.

Next, the processing on the mobile terminal 50 is described. Each of FIG. 28A, FIG. 28B, FIG. 29A, FIG. 29B and FIG. 30 shows a flowchart of the processing on the mobile terminal 50. Described first is the processing for remote starting by use of the mobile terminal 50. Each of FIG. 28A and FIG. 28B shows the flowchart of the processing for remote starting on the mobile terminal 50.

The processing for remote starting on the mobile terminal 50 starts with running the application 54*d* for the remote starting stored in the mobile terminal 50. After the application 54*d* for the remote starting stored in the mobile terminal 50 is nm, a main operation screen for operation for remote starting is displayed on the display 55 (step S2801). Next, the controller 51 judges whether the command of a request to the center 60 has been entered by the operation of the user on the displayed operation screen (step S2802).

When judging that the request command has been entered (Yes at the step S2802), the controller 51 establishes the communication with the center 60 (step S2803). Next, the controller 51 transmits the entered request command to the center 60 via the communicator 53 (step S2804). When the controller 51 judges that the request command has not been entered (No at the step S2802), the procedure moves to the next step without execution of the processing for transmitting the request command or others.

Next, the controller 51 judges whether any message has been received from the center 60 (step S2805). When the controller 51 judges that any message has not been received (No at the step S2805), the procedure of the processing for remote starting is finished without execution of the following processing. When judging that a message has been received (Yes at the step S2805), the controller 51 displays the relevant message on the display 55 (step S2806).

The information judging part 51a judges whether the received message is for requesting user's response (step S2807). When the information judging part 51a judges that the received message is for requesting user's response (Yes at the step S2807), the controller 51 monitors whether the user's response has been entered (step S2808). The step for monitoring the user's response is repeated until when it is judged that the response has been entered (No at the step S2808).

When judging that the response has been entered (Yes at the step S2808), the controller 51 transmits the contents of the response to the center via the communicator 53 (step S2809). Then, the controller 51 redisplays the operation screen on the display (step S2810).

When the information judging part 51a judges that the received message is not for requesting the user's response at the step for judging the existence of the response request (No at the step S2807), the controller 51 keeps the monitoring until it is judged that the user has confirmed the message (No at the step S2811). When judging that the user has confirmed the message (Yes at the step S2811), the controller 51 redisplays the operation screen on the display (step S2810).

Later, the user can execute again the processing for remote starting by re-executing the processing from the start. The user can complete the processing for remote starting by shutting down the application 54d for remote controlling. The procedure from the step S2801 to the step S2811 is the same procedure from the step S1001 to the step S1011.

Figure 29A:
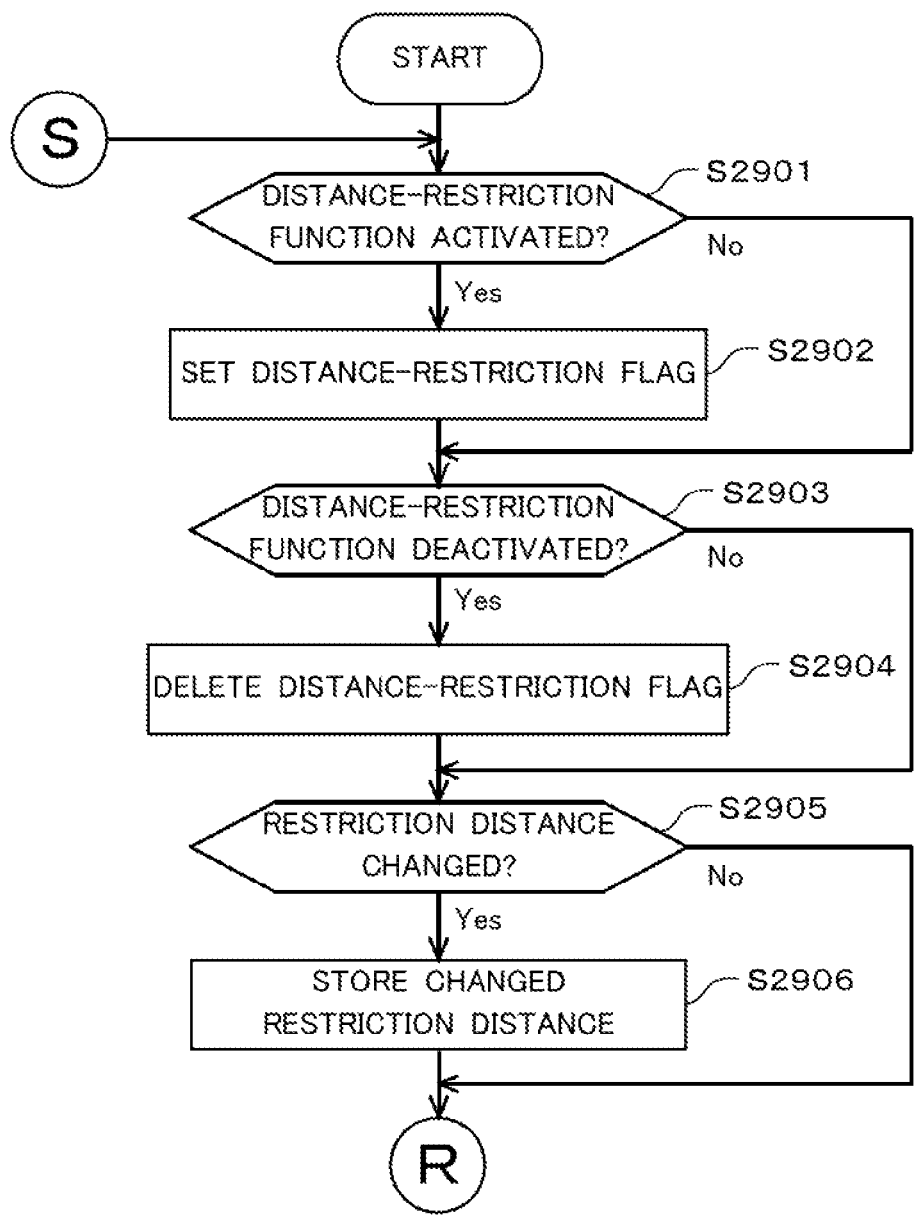
FIG. 29A shows another flowchart of the processing on the mobile terminal.
Figure 29B:
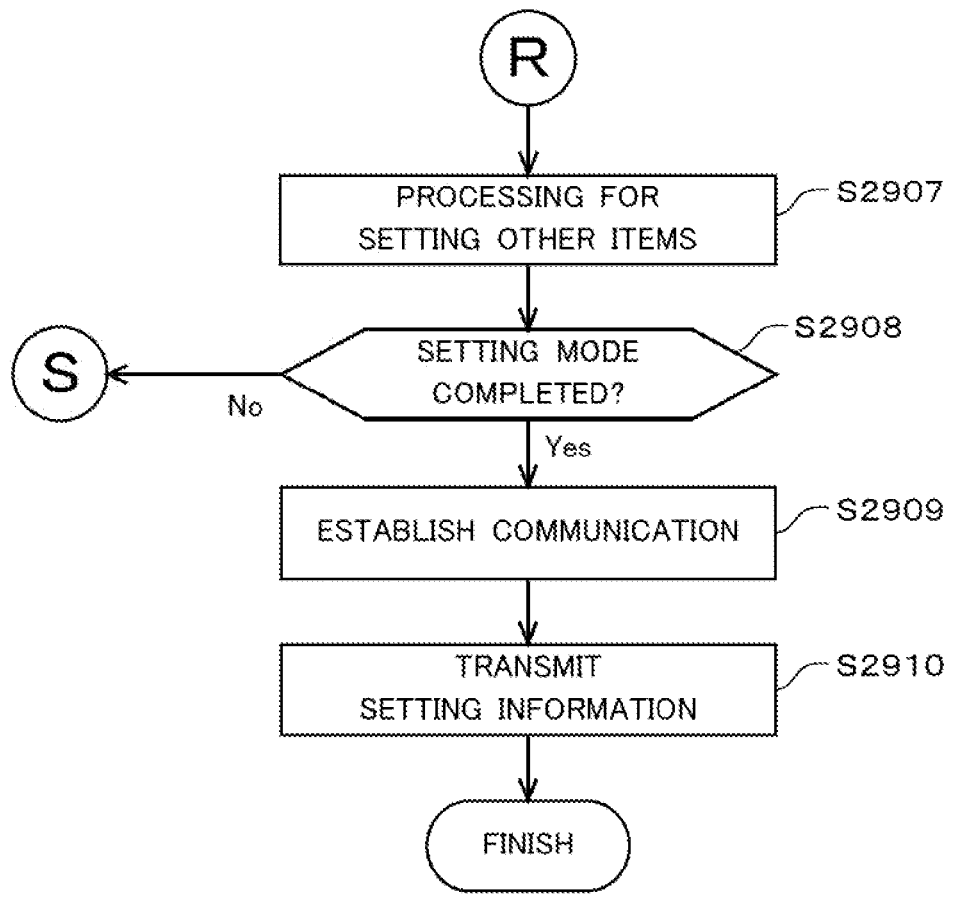
FIG. 29B shows another flowchart of the processing on the mobile terminal.

Described next is the processing for setting the restriction functions and for changing the restriction conditions by use of the mobile terminal 50. Each of FIG. 29A and FIG. 29B shows the flowchart of the processing for setting the restriction function and for changing the restriction conditions in the case where the distance-restriction function is adopted as the restriction function.

The processing for setting the restriction function and for changing the restriction conditions starts when the user selects the setting mode of the mobile terminal. When the setting mode is selected, the restriction function setting part 51c judges whether the distance-restriction function of the mobile terminal 50 is activated (step S2901). When the distance-restriction function is activated (Yes at the step S2901), the restriction function setting part 51c sets the flag indicating that the distance-restriction function is activated (step S2902). When the distance-restriction function is not activated (No at the step S2901), the flag is not set.

Next, the restriction function setting part 51c judges whether the distance-restriction function is deactivated (step S2903). When the distance-restriction function is deactivated (Yes at the step S2903), the restriction function setting part 51c deletes the flag for activating the distance-restriction function (step S2904). When the distance-restriction function is not deactivated (No at the step S2903), the flag is not deleted.

Next, the restriction function setting part 51c judges whether the restriction distance as one of the restriction conditions has been changed (step S2905). Upon the change of the restriction distance (Yes at the step S2905), the restriction function setting part 51c stores the changed restriction distance in the memory 54 (step S2906). When the restriction distance is not changed (No at the step S2905), the processing for changing the restriction conditions is not executed.

Next, the restriction function setting part 51c executes the processing for setting other items (step S2907). Next, the restriction function setting part 51c judges whether the setting mode has been completed (step S2908). When the restriction function setting part 51c judges that the setting mode has been completed (Yes at the step S2908), the controller 51 establishes the communication with the center 60 (step S2909).

The controller 51 transmits setting information 54c that has been read out from the memory 54 after completion of the processing for setting, to the center 60 via the communicator 53 (step S2910). Then, the processing for setting the restriction functions and changing the restriction conditions is finished. When judging that the setting mode has not been completed (No at the step S2908), the restriction function setting part 51c re-executes the procedure starting from the processing for judging whether the distance-restriction function is activated (step S2901). The procedure from the step S2901 to the step S2910 is the same procedure from the step S1101 to the step S1110.

Figure 30:
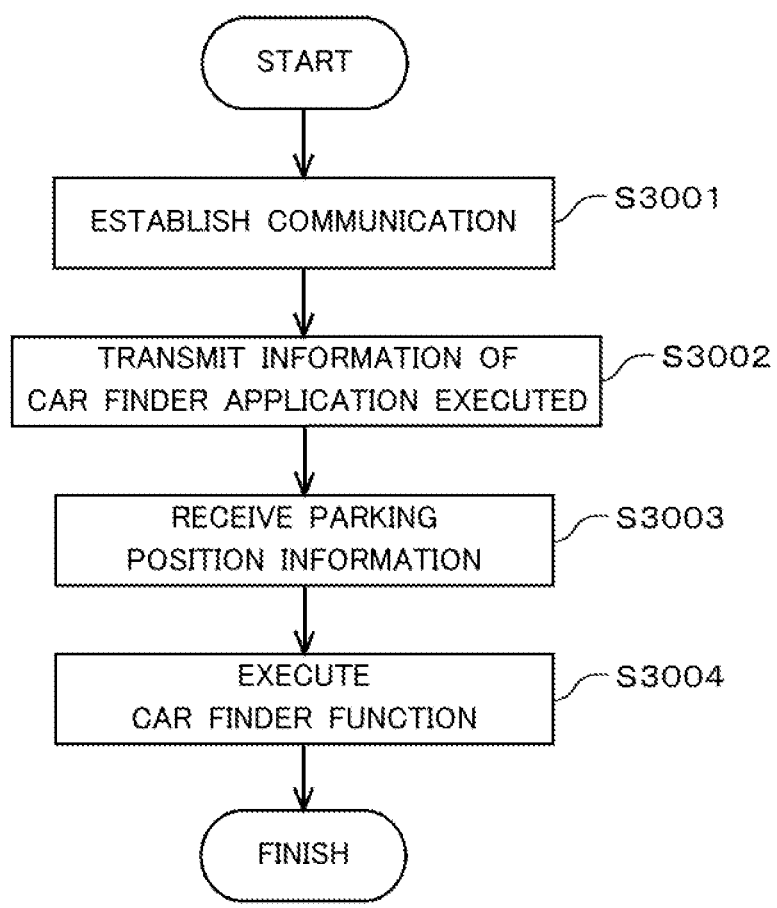
FIG. 30 shows another flowchart of the processing on the mobile terminal.

Described next is the processing for executing the car finder on the mobile terminal 50. FIG. 30 shows the flowchart of processing for executing the car finder on the mobile terminal 50.

The processing for executing the car finder on the mobile terminal 50 starts with running the application 54d for the car finder stored in the mobile terminal 50. After the application 54d for the car finder is run, the controller 51 establishes the communication with the center 60 (step S3001). The communication with the center 60 can be established in the same manner as the one described above.

After the communication with the center 60 is established, the controller 51 transmits via the communicator 53 the car finder execution information (step S3002). The car finder execution information indicates that the application 54d for the car finder has been run. Transmitting the car finder execution information is to obtain the parking position information from the center 60 and to update the car finder execution history table stored in the center 60.

Next, the controller 51 receives the parking position information from the center 60 (step S3003). Upon receiving the parking position information, the controller 51 executes the function of the application 54d for the car finder based on the received parking position information and the current position information of the mobile terminal 50 (step S3004).

Then, when the user shuts down the application 54d for the car finder to complete the usage of the car finder, the procedure for executing the car finder is finished.

<2-5. Processing on Center>

Figure 31:
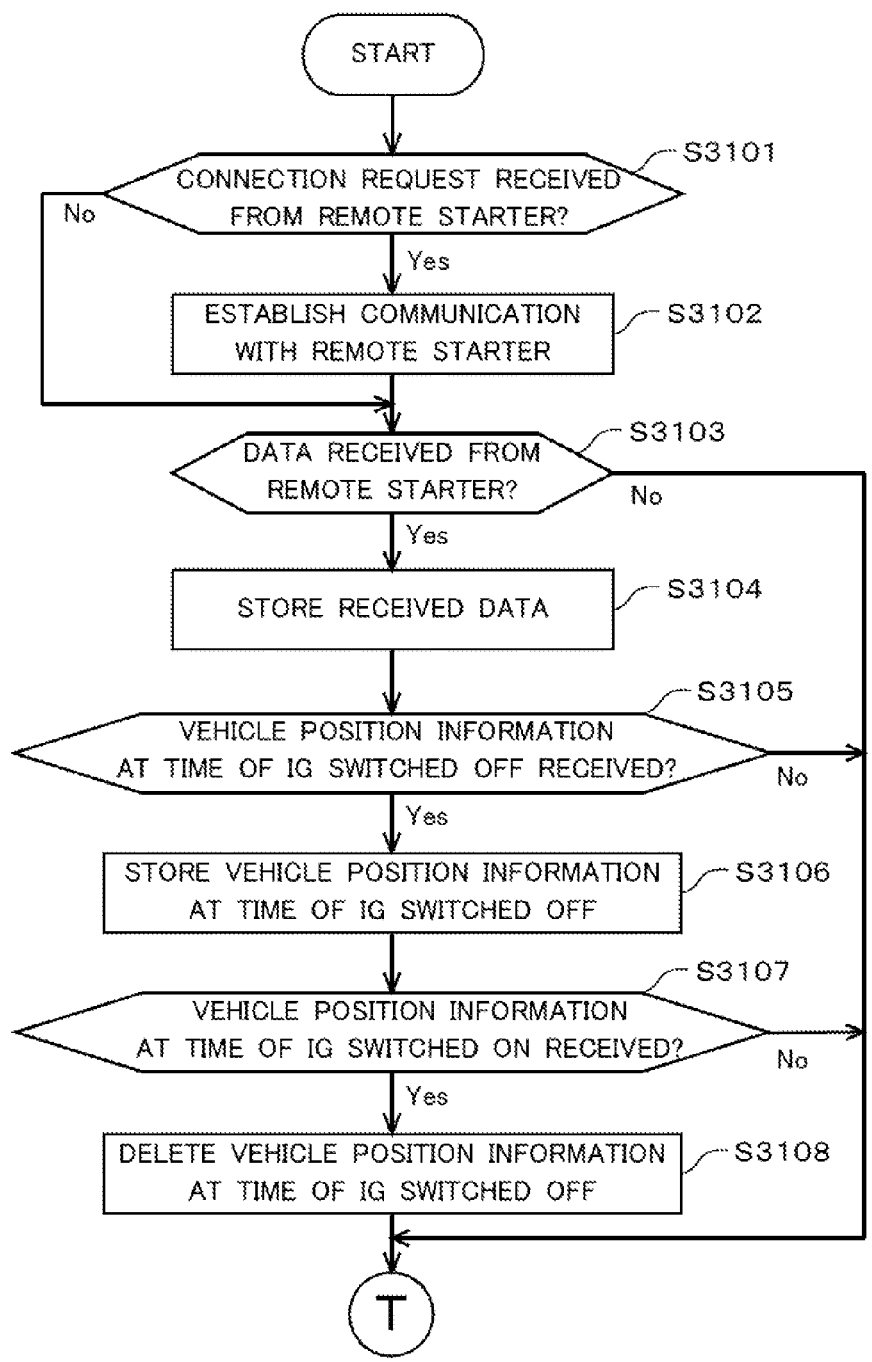
FIG. 31 shows another flowchart of the processing on the center.
Figure 32:
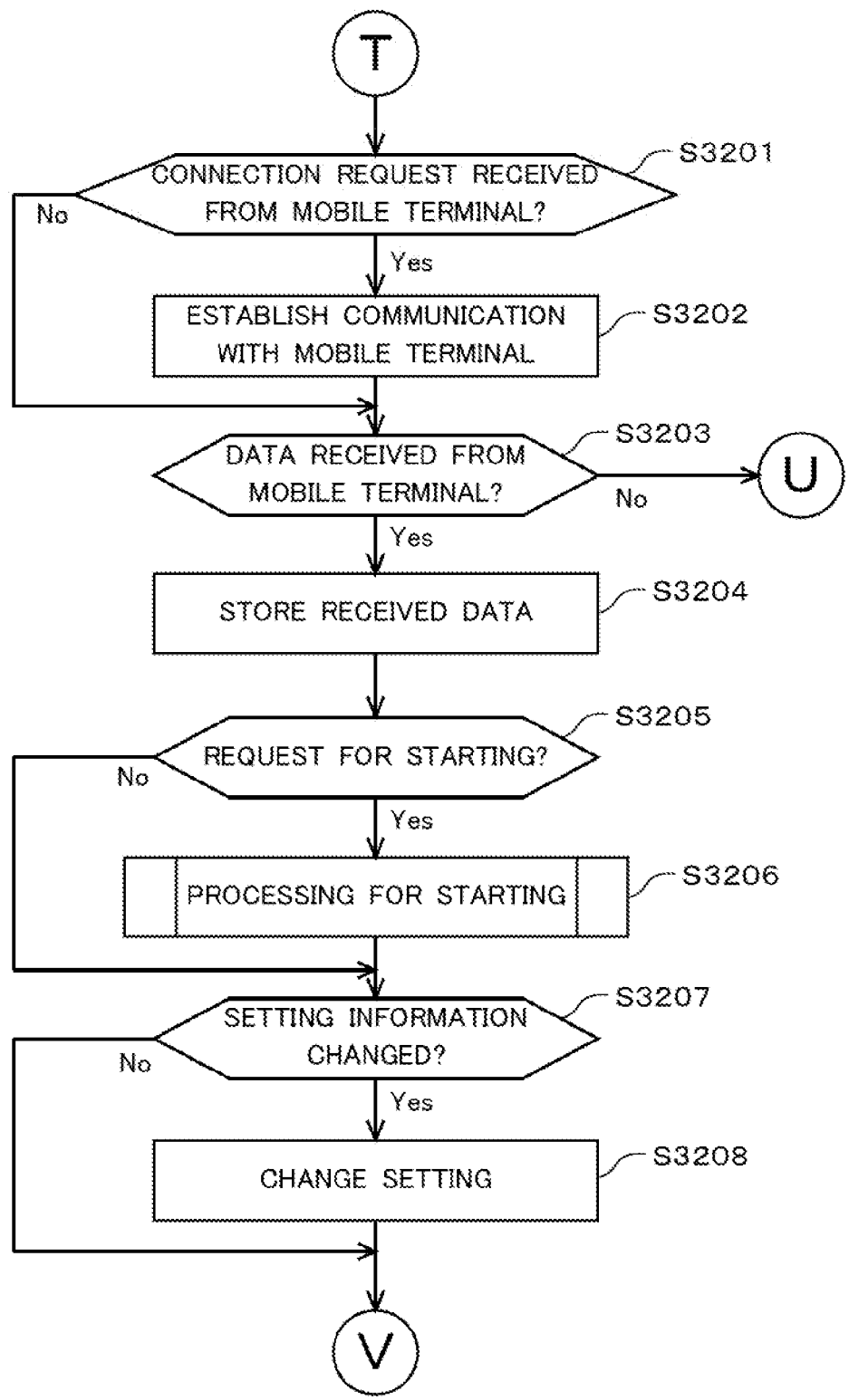
FIG. 32 shows another flowchart of the processing on the center.
Figure 33:
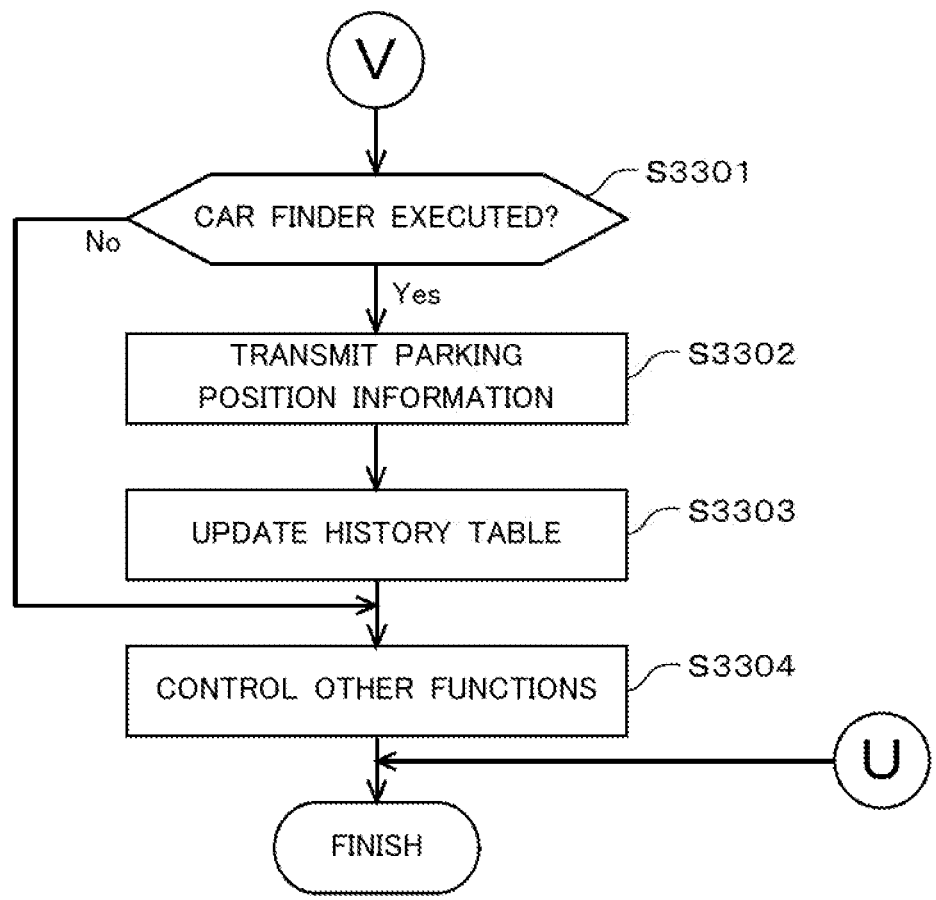
FIG. 33 shows another flowchart of the processing on the center.

Next, the processing on the center 60 is described. Each of FIG. 31, FIG. 32, FIG. 33, FIG. 34, FIG. 35 and FIG. 36 shows a flowchart of the processing on the center 60. Described first is the processing for remote starting by communicating with the remote starter 40 and the mobile terminal 50 for transmitting and receiving information. Each of FIG. 31, FIG. 32 and FIG. 33 shows the flowchart of the processing for remote starting on the center 60.

The center 60 judges whether the request for connection has been received from the remote starter 40 (step 3101). When judging that the request for connection has been received from the remote starter 40 (Yes at the step S3101), the controller 61, if available, permits the connection with the remote starter 40 to establish the communication (step S3102). When the controller 61 judges that the request for connection has not been received from the remote starter 40

(No at the step S3101), the procedure moves to the next step without execution of the processing for establishing the communication.

Next, the controller 61 judges whether any data have been received from the remote starter 40 (step S3103). When judging that some data have been received from the remote starter 40 (Yes at the step S3103), the controller 61 stores the received data in the memory 63 (step S3104). Then, an information judging part 61a judges whether reception data 63f include vehicle position information 63b obtained at the time when the ignition switch has been switched off, that is, the vehicle position information at the time of the parking start (step S3105).

When the information judging part 61a judges that the reception data 63f include the vehicle position information 63b at the time when the ignition switch has been switched off (Yes at the step S3105), the controller 61 stores in the memory 63 the vehicle position information 63b as "the vehicle position information 63b at the time when the ignition switch has been switched off," that is, the parking start position (step S3106). When the reception data 63f correspond to the undetermined-information, the undetermined-information is stored in the memory 63 as "the vehicle position information 63b at the time when the ignition switch has been switched off."

Next, the information judging part 61a judges whether the reception data 63f include the vehicle position information 63b obtained at the time when the ignition switch has been switched on (step S3107). When the information judging part 61a judges that the reception data 63f include the vehicle position information 63b at the time when the ignition switch has been switched on (Yes at the step S3107), the controller 61 deletes "the vehicle position information 63b at the time when the ignition switch has been switched off" stored in the memory 63 (step S3108). Then, the procedure on the controller 61 moves to the next step (T in FIG. 31).

When the controller 61 judges that any data have not been received from the remote starter 40 (No at the step S3103), the procedure moves to the next step without execution of the processing to respond to this (T in FIG. 31). When the information judging part 61a judges that the reception data 63f do not include the vehicle position information 63b at the time when the ignition switch has been switched off (No at the step S3105), or that the reception data 63f do not include the vehicle position information 63b at the time when the ignition switch has been switched on (No at the step S3107), the procedure moves to the next step without execution of the processing to respond to this (T in FIG. 31).

Next, the center 60 judges whether the request for connection has been received from the mobile terminal 50 (step 3201). When judging that the request for connection has been received from the mobile terminal 50 (Yes at the step S3201), the controller 61, if available, permits the connection with the mobile terminal 50 to establish the communication (step S3202). When the controller 61 judges that the request for connection has not been received from the mobile terminal 50 (No at the step S3201), the procedure moves to the next step without execution of the processing for establishing the communication.

Next, the controller 61 judges whether any data have been received from the mobile terminal 50 (step S3203). When judging that some data have been received from the mobile terminal 50 (Yes at the step S3203), the controller 61 stores the received data in the memory 63 (step S3204). When the controller 61 judges that any data have not been received from the mobile terminal 50 (No at the step S3203), the procedure of the processing for remote starting is finished without execution of the processing to respond to this (U in FIG. 32).

After the data received from the mobile terminal 50 are stored, the information judging part 61a judges whether the reception data 63f include a command 63g of the request for starting (step S3205). When the information judging part 61a judges that the reception data 63f include the command 63g of the request for starting (Yes at the step S3205), the controller 61 executes the processing for starting (step S3206). The processing for starting is detailed later. When the information judging part 61a judges that the reception data 63f do not include the command 63g of the request for starting (No at the step S3205), the procedure moves to the next step without execution of the processing for starting.

Next, the information judging part 61a judges whether the reception data 63f include the data for changing setting information 63d (step S3207). When the information judging part 61a judges that the reception data 63f include the data for changing the setting information 63d (Yes at the step S3207), the controller 61 changes the setting information 63d based on the received data, and stores the changed setting information 63d in the memory 63 (step S3208). Then, the procedure moves to the next step (V in FIG. 32). When the information judging part 61a judges that the reception data 63f do not include the data for changing the setting information 63d (No at the step S3207), the procedure moves to the next step without execution of the processing for changing the setting (V in FIG. 32). The procedure from the step S3101 to the step S3208 is the same procedure from the step S1201 to the step S1308.

Next, the information judging part 61a judges whether the reception data 63f include the car finder execution information (step S3301). When it is judged that the car finder execution information is included (Yes at the step S3301), the controller 61 transmits the parking position information to the mobile terminal 50 (step S3302). That is, upon receiving the car finder execution information, the controller 61 reads out from the memory 63 the parking position information needed for executing the application 54d for the car finder, and transmits the read out parking position information to the mobile terminal 50 via the communicator 62.

Moreover, upon receiving the car finder execution information, the controller 61 updates the car finder execution history table (step S3303). That is, having received the car finder execution information indicates that the application 54d for the car finder has been run on the mobile terminal 50. Therefore, the controller 61 executes the processing for adding "1" to the number of times of the car finder executed at the parking position corresponding to the parking position information in the car finder execution history table shown in FIG. 27.

When the information judging part 61a judges that the reception data 63f do not include the car finder execution information (No at the step S3301), the procedure moves to the next step without execution of the processing for this.

Next, the controller 61 executes the control of other functions (step S3304). The procedure of the step S3304 is the same procedure of the step S1309. Then the procedure of the processing for remote starting on the center 60 is finished.

Figure 34:
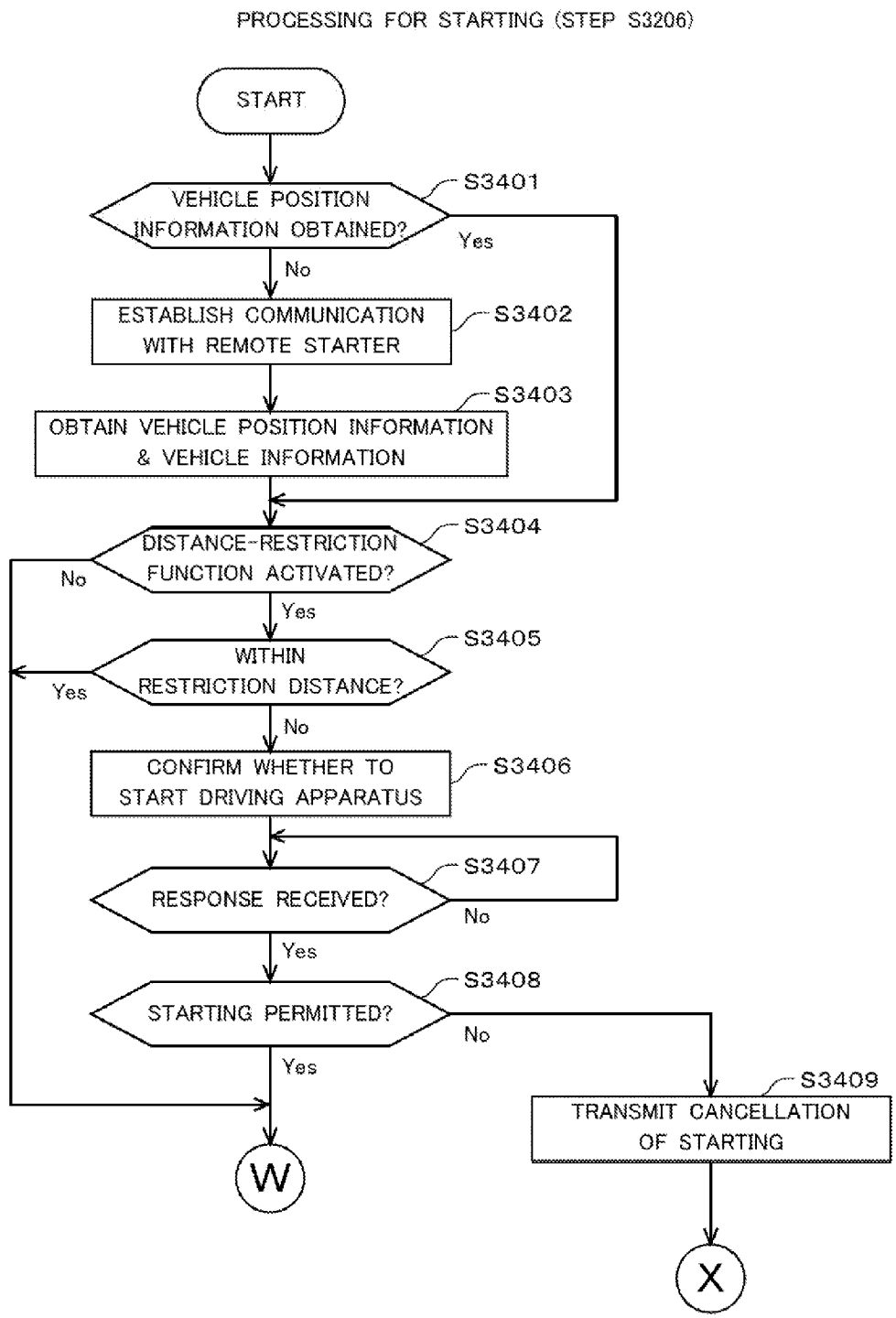
FIG. 34 shows another flowchart of the processing on the center.
Figure 35:
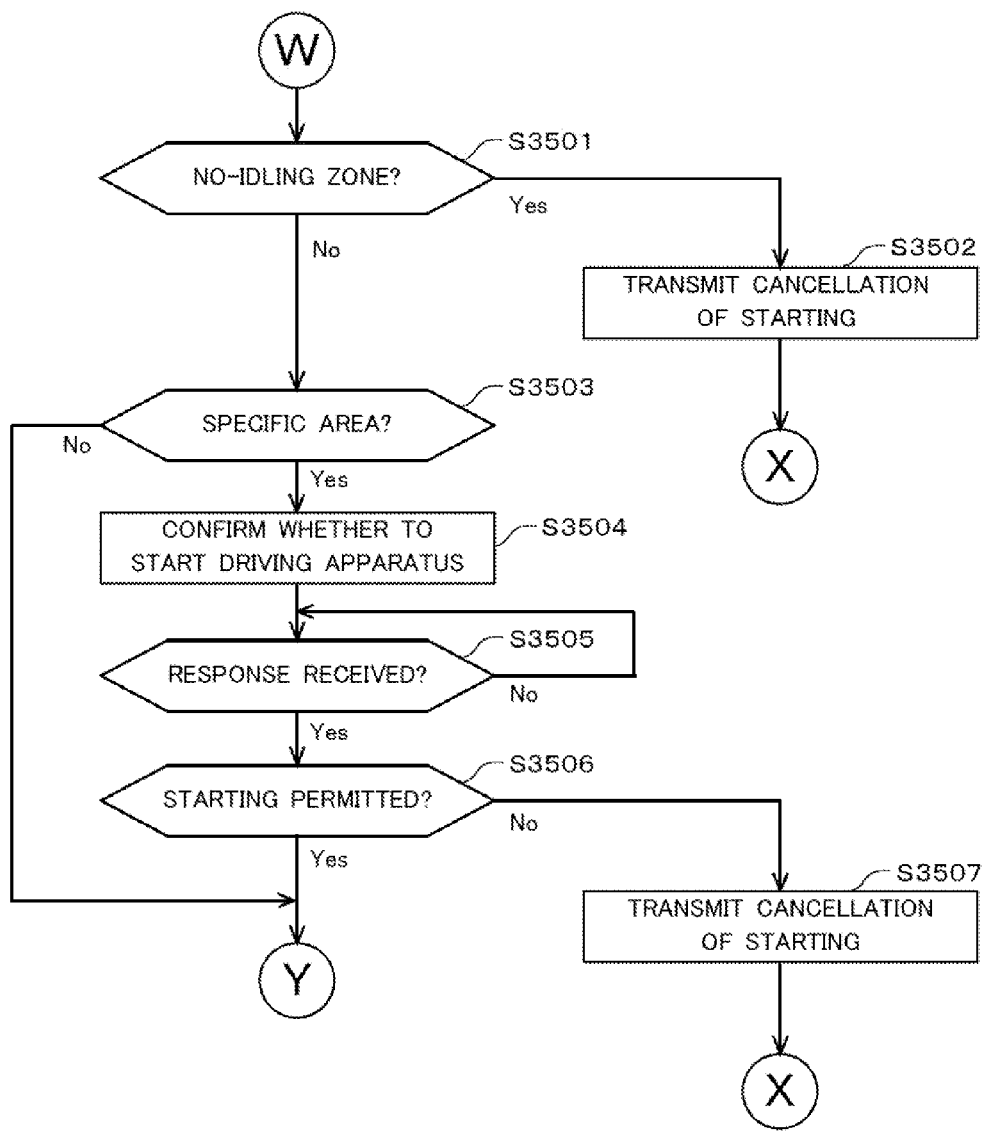
FIG. 35 shows another flowchart of the processing on the center.
Figure 36:
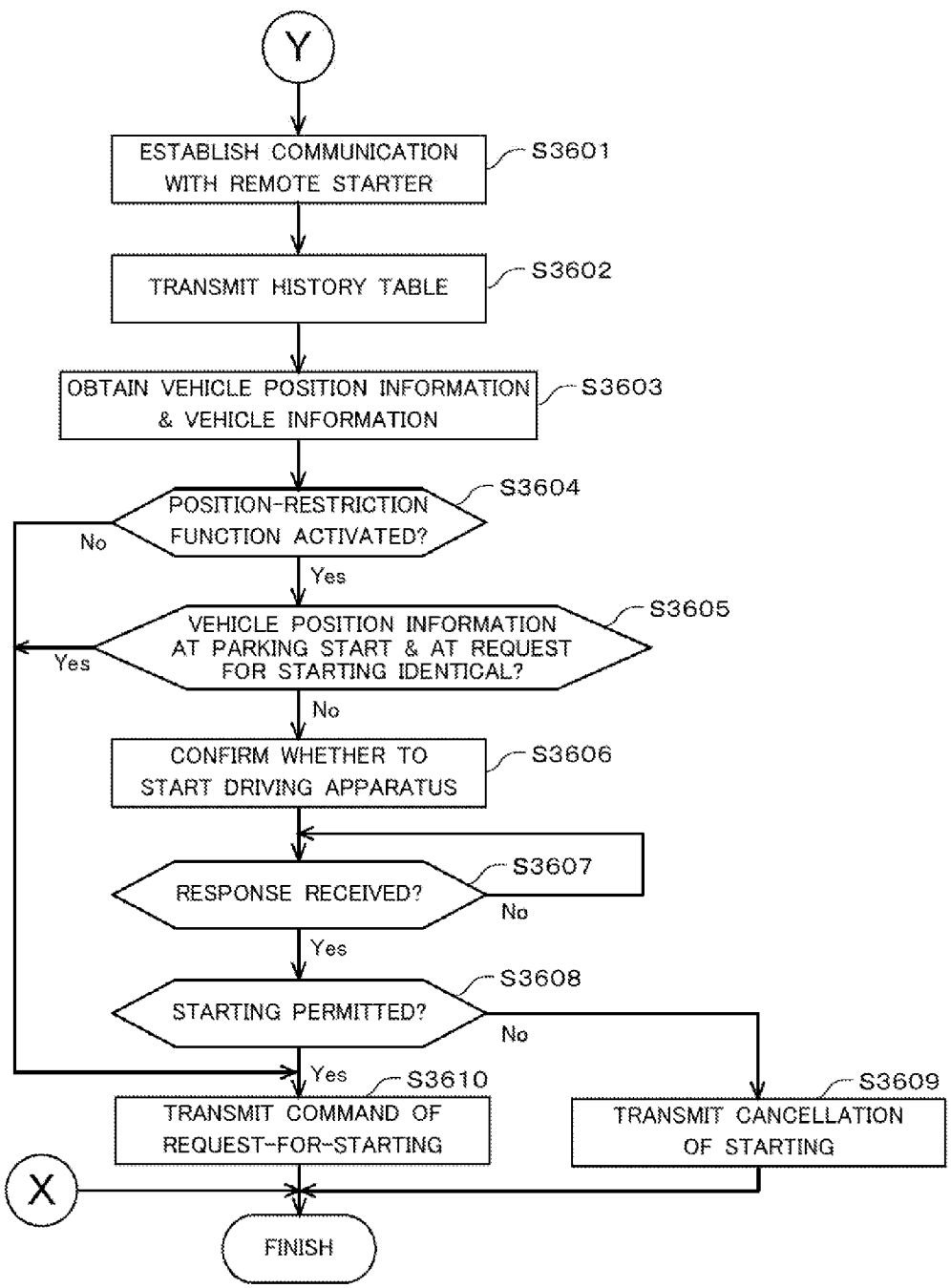
FIG. 36 shows another flowchart of the processing on the center.

Described next is the processing for starting executed by the controller 61 (step S3206). Each of FIG. 34, FIG. 35 and FIG. 36 shows the flowchart of the processing for starting executed by the controller 61.

After the processing for starting is started, the controller 61 first judges whether the vehicle position information has been obtained (step S3401). In the second embodiment, the processing for transmitting the vehicle position information is restricted in accordance with the application execution history stored in the mobile terminal 50. Therefore, in some cases, the center 60 might not have obtained the vehicle position information. Therefore, the controller 61 judges whether the vehicle position information at the time of the parking start has been obtained from the remote starter 40 at the step S3401.

When the controller 61 judges that the vehicle position information has been obtained (Yes at the step S3401), the procedure moves to the next step of the processing for starting without execution of the processing for the communication connection with the remote starter 40. When judging that the vehicle position information has not been obtained (No at the step S3401), the controller 61 executes the processing for obtaining the vehicle position information so as to execute the following steps of the processing for starting. First, the controller 61 transmits the command of the request for communication connection to the remote starter 40 via the communicator 62, and establishes the communication with the remote starter 40 (step S3402).

After the communication is established, the controller 61 obtains the vehicle position information and the vehicle information from the remote starter 40 via the communicator 62 (step S3403). In the configuration of the second embodiment, when the vehicle is parked in the location where the application stored in the mobile terminal 50 is rarely executed, the processing on the remote starter 40 for transmitting the vehicle position information to the center 60 is restricted. However, the center 60 needs to judge whether to transmit the request for starting when the user makes the request for starting. Therefore, in such a case, the center 60 communicates with the remote starter 40 to make the request for transmitting the vehicle information.

After the vehicle position information is obtained, a starting restricting part 61b judges whether the distance-restriction function is activated (step S3404). When the starting restricting part 61b judges that the distance-restriction function is not activated (No at the step S3404), the procedure on the controller 61 moves to the next step of the processing for starting (W in FIG. 34). When judging that the distance-restriction function is activated (Yes at the step S3404), the starting restricting part 61b judges whether the distance between the position of the mobile terminal 50 and the vehicle position is equal to or shorter than the restriction distance (step S3405).

When the starting restricting part 61b judges that the calculated distance is equal to or shorter than the restriction distance as a result of the comparison (Yes at the step S3405), the procedure moves to the next step of the processing for starting (W in FIG. 34). When the starting restricting part 61b judges that the calculated distance is longer than the restriction distance (No at the step S3405), the procedure on the controller 61 moves to the step for confirming whether to continue the processing for starting (step S3406).

Then, the controller 61 monitors whether the response to the inquiry has been received from the mobile terminal 50 (step S3407). When judging that the response has not been received from the mobile terminal 50 (No at the step S3407), the controller 61 repeats the step for the monitoring until receiving the response. When judging that the response has been received from the mobile terminal 50 (Yes at the step S3407), the controller 61 judges whether the contents of the response indicate permission to continue the processing for starting (step S3408).

When the controller 61 judges that the contents of the response from the mobile terminal 50 indicate permission to continue the processing for starting (Yes at the step S3408), the procedure moves to the next step of the processing for starting (W in FIG. 34). When judging that the contents of the response from the mobile terminal 50 indicate non-permission to continue the processing for starting (No at the step S3408), the controller 61 cancels the processing for starting and transmits the information indicating the cancellation to the mobile terminal 50 (step S3409), and the procedure of the processing for remote starting is finished (X in FIG. 34).

Next, a position judging part 61c judges whether the vehicle is in a no-idling zone (step S3501). When the position judging part 61c judges that the parking start position of the vehicle is in the no-idling zone (Yes at the step S3501), since no vehicle is allowed to be kept in the idling condition by the remote starting, the controller 61 cancels the processing for starting without confirming with the mobile terminal 50 on whether to start the driving apparatus, and transmits the information indicating the cancellation to the mobile terminal 50 (step S3502), and the procedure of the processing for remote starting is finished (X in FIG. 35).

When judging that the parking start position of the vehicle is not in the no-idling zone (No at the step S3501), the position judging part 61c judges whether the parking start position of the vehicle is in the specific area (step S3503). When the position judging part 61c judges that the parking start position of the vehicle is not in the specific area (No at the step S3503), the procedure on the controller 61 moves to the next step of the processing for starting (Y in FIG. 35). When the position judging part 61c judges that the parking start position of the vehicle is in the specific area (Yes at the step S3503), the procedure on the controller 61 moves to the step of the processing for confirming whether to continue the processing for starting (step S3504).

Then, the controller 61 monitors whether the response to the inquiry has been received from the mobile terminal 50 (step S3505). When judging that the response has not been received from the mobile terminal 50 (No at the step S3505), the controller 61 repeats the step for the monitoring until receiving the response. When judging that the response has been received from the mobile terminal 50 (Yes at the step S3505), the controller 61 judges whether the contents of the response indicate permission to continue the processing for starting (step S3506).

When the controller 61 judges that the contents of the response from the mobile terminal 50 indicate permission to continue the processing for starting (Yes at the step S3506), the procedure moves to the next step of the processing for starting (Y in FIG. 35). When judging that the contents of the response from the mobile terminal 50 indicate non-permission to continue the processing for starting (No at the step S3506), the controller 61 cancels the processing for starting and transmits the information indicating the cancellation to the mobile terminal 50 (step S3507), and the procedure of the processing for remote starting is finished (X in FIG. 35).

Next, the controller 61 transmits the command of the request for communication connection to the remote starter 40 via the communicator 62, and establishes the communication with the remote starter 40 (step S3601). The procedure from the step S3401 to the step S3601 is the same procedure from the step S1401 to the step S1601.

After the communication is established, the controller 61 transmits via the communicator 62 the car finder execution history table (step S3602). The remote starter 40 is not capable of understanding directly the car finder execution history on the mobile terminal 50. Thus, the center 60 updates the execution history and transmits the updated history table at the time when the communication with the remote starter 40 is established. The car finder execution history table may be transmitted every time the communication with the remote starter 40 is established, or only when the history table is updated.

The controller 61 obtains the vehicle position information and the vehicle information from the remote starter 40 via the communicator 62 (step S3603). Next, the starting restricting part 61*b* judges whether a position-restriction function is activated (step S3604). When it is judged that the position-restriction function is not activated (No at the step S3604), a starting directing part 61*d* transmits the command of the request for starting to the remote starter 40 (step S3610), and the procedure of the processing for remote starting is finished. When judging that the position-restriction function is activated (Yes at the step S3604), the starting restricting part 61*b* judges whether the vehicle position at the time of the parking start (parking start position) is identical to the vehicle position at the time of the request for remote starting that has been received at the step S3603 (step S3605).

When it is judged that the positions are identical (Yes at the step S3605), the starting directing part 61*d* transmits the command of the request for starting to the remote starter 40 (step S3610), and the procedure of the processing for remote starting is finished. When it is judged that the two positions are different (No at the step S3605), the procedure of the controller 61 moves to the step for confirming whether to continue the processing for starting (step S3606).

Then, the controller 61 monitors whether the response to the inquiry has been received from the mobile terminal 50 (step S3607). When judging that the response has not been received from the mobile terminal 50 (No at the step S3607), the controller 61 repeats the step for the monitoring until receiving the response. When judging that the response has been received from the mobile terminal 50 (Yes at the step S3607), the controller 61 judges whether the contents of the response indicate permission to continue the processing for starting (step S3608).

When the controller 61 judges that the contents of the response from the mobile terminal 50 indicate permission to continue the processing for starting (Yes at the step S3608), the starting directing part 61*d* transmits the command of the request for starting to the remote starter 40 (step S3610), and the procedure of the processing for remote starting is finished. When judging that the contents of the response from the mobile terminal 50 indicate non-permission to continue the processing for starting (No at the step S3608), and the controller 61 cancels the processing for starting, transmits the information indicating the cancellation to the mobile terminal 50 (step S3609), and then, the procedure of the processing for remote starting is finished. The procedure from the step S3603 to the step S3610 is the same procedure from the step S1602 to the step S1609. The communication with the remote starter 40 is terminated in the same manner as the one of the first embodiment.

In the distance-restriction function (from the step S3401 to the step S3409) and the restriction function in the no-idling zone and the specific area (from the step S3501 to the step S3507) based on the processing for remote starting described above, the center 60 judges whether the remote starting is available, by use of the vehicle position information received at the time when the ignition switch has been switched off. Only when the remote starting is available, the center 60 transmits the command of the request for starting by establishing the communication with the remote starter 40. Therefore, it is no need for the center 60 to establish communication with the remote starter 40 every time the request for remote starting is received from the mobile terminal 50, which reduces communication costs.

The position-restriction function (from the step S3605 to the step S3610) restricts the starting when the vehicle position at the time of the parking start is different from the vehicle position at the time of the request for starting, that is, when the starting is not suitable, which prevents useless starting.

In the second embodiment described above, the center 60 executes the processing for starting based on the distance-restriction function, the processing for starting based on the judgment in terms of the no-idling zone and the specific area, and the processing for starting based on the position-restriction function, as the processing for remote starting. However, it is not necessary to execute all of the processing. One or more processing for starting including the processing for starting based on the distance-restriction function may be executed individually or in appropriate combination.

Further, in the second embodiment described above, the information of the ignition switch being switched off is used as the parking start information. When the ignition switch is switched off, it is judged that parking has started. Thus, the vehicle position information is transmitted to the center. However, making the judgment on the parking start is not limited to this case. Other kinds of the vehicle information are acceptable as long as the information helps to make the judgment on the parking start. In an example of using an engine as the driving apparatus, the judgment that parking has started may be made based on the engine revolution indicating that the engine has stopped. In another example on the vehicle equipped with a keyless entry apparatus, the judgment that parking has started may be made based on the information indicating that a door has been locked by the keyless entry apparatus. The point is just transmitting the vehicle position information after judging that parking has started. The processing for executing the antitheft function is omitted from the description in the second embodiment because the antitheft function is not directly relevant to the invention.

<2-6. Modification>

The second embodiment has been described so far. However, the invention is not limited to the embodiment above. Various modifications are permitted. Hereafter, the modifications are described. The embodiment described above and all the embodiments to be described hereafter can be arbitrarily combined.

In the second embodiment, when executing the processing for remote starting, the remote starter 40 executes the processing for updating the history table. However, the center 60 may execute the processing for updating the history table. In this case, the center 60 stores the history table, and updates the part corresponding to the parking position in the history table when the center 60 transmits the command of the request for starting to the remote starter 40. The center 60 transmits the updated history table to the remote starter 40. After receiving the updated history table from the center 60, the remote starter 40 executes the processing for updating the history table by storing the received history table in the memory 44.

Moreover, in the second embodiment, the vehicle control system 200 includes the remote starter 40 and the mobile terminal 50 that stores the remote starting application. However, the mobile terminal 50 may store only the car finder application and the security application without the remote starting application. In this case, instead of the remote starter 40, an electronic device (vehicle controller) having the function for transmitting the vehicle position information is available. In this case, the processing for starting the driving apparatus is omitted.

As for the terms of the vehicle controller and the vehicle control system of the invention, each of the vehicle controller and the vehicle control system may not control a vehicle itself, or may be a controller that uses vehicle information. Therefore, in the case of the mobile terminal 50 only storing the car finder application, the vehicle controller is configured mainly to transmit the vehicle position information. Here, while not controlling the vehicle, the controller can be named the vehicle controller as long as it uses the vehicle information.

Further, in the second embodiment described above, various functions are executed by software, specifically by CPU processing based on programs. However, some of these functions may be executed by electrical hardware circuits. Contrarily, some of the functions executed through hardware circuits in the above descriptions may be executed through software.

In the invention, upon detecting parking start of a vehicle, a vehicle controller obtains parking position information and transmits the obtained parking position information to an information processor. The vehicle controller includes a memory that stores an execution history of the application stored in a mobile terminal. Moreover, the vehicle controller judges whether to transmit the parking position information based on the execution history of the application stored in the memory. This allows the processing for transmitting the parking position information to be restricted in accordance with the execution frequency of the application. Therefore, the vehicle controller can transmit the parking position information to the information processor while controlling communication costs.

Moreover, in the invention, the vehicle controller stores the information of a parking position and the number of times of execution in an associated manner, thus can obtain the execution history used for judging whether to transmit the parking position information.

Moreover, in the invention, transmitting the parking position information is to be permitted only when the number of times of the remote starting executed at a parking start position is equal to or above a predetermined number. This judgment restricts transmitting the information of the parking position where remote starting is rarely executed, which can control the communication costs.

Moreover, in the invention, a date or a season is associated in the execution history. Thus, whether to transmit information can be judged based on more detailed conditions.

Moreover, in the invention, transmitting the parking position information is to be permitted only when the number of times of an application executed at the parking start position is equal to or above the predetermined number. This judgment restricts transmitting the information of the parking position where the application is rarely executed, which can control the communication costs.

Moreover, in the invention, whether to transmit the parking position information is judged based on parking lot information. This judgment restricts transmitting the information of the parking position in the parking lot where the application is rarely executed, which can control the communication costs.

Moreover, in the invention, the parking position information is transmitted until when the number of times of parking at one parking position reaches a predetermined number. This allows more accurate judgment on whether the parking position is the position that uses the parking position information or not. Moreover, when the number of times of parking exceeds the predetermined number, whether to transmit the parking position information is judged based on the execution history, which controls the communication costs.

Moreover, in the invention, in the case of a mobile terminal storing an application to execute an antitheft function for a vehicle, the parking position information is transmitted regardless of the parking position or its execution history, which avoids that execution of the antitheft function is disturbed. Moreover, in the case of a mobile terminal not storing the application to execute the antitheft function, whether to transmit the parking position information is judged based on its execution history, which controls the communication costs.

While the invention has been shown and described in detail, the foregoing description is in all aspects illustrative and not restrictive. It is therefore understood that numerous other modifications and variations can be devised without departing from the scope of the invention.

What is claimed is:

1. A vehicle controller that is installed in a vehicle and that transmits parking position information to an information processor that is located outside the vehicle upon detection of parking start of the vehicle, the vehicle controller comprising:
   a communicator that communicates with the information processor by transmitting and receiving information;
   a detector that detects the parking start of the vehicle;
   a position-information-obtaining-part that obtains the parking position information, the parking position information being a location where the vehicle is parked;
   a memory that stores an execution history of an application that is installed in a mobile terminal which communicates with the information processor, and that uses the parking position information; and
   a controller that judges whether to transmit the parking position information based on the execution history, when the parking start of the vehicle is detected by the detector, the execution history being information that associates the parking position information with a number of times of the application executed at the location where the vehicle is parked.

2. The vehicle controller of claim 1, wherein
   when the application is an application for executing a processing for remote starting of a driving apparatus of the vehicle, the controller judges that transmission of the parking position information is permitted when a number of times of the remote starting executed at the location where the vehicle is parked is equal to or above a predetermined number of times.

3. The vehicle controller of claim 2, wherein
   the execution history is information that associates the parking position information with the number of times of the application executed that uses the parking position information, and with a date and time or a season of parking, and
   the controller judges that the transmission of the parking position information is permitted further when the number of times of the remote starting executed corresponding to the date and time or the season when the vehicle has been parked is equal to or above the predetermined number of times.

4. The vehicle controller of claim 1, wherein
   when the application is an application for providing a function for displaying on the mobile terminal a direction or a distance from a current position of the mobile terminal to the location where the vehicle is parked,
   the controller judges that transmission of the parking position information is permitted when the number of times of the application executed at the location where the vehicle is parked is equal to or above the predetermined number of times.

5. The vehicle controller of claim 1, wherein
the memory stores parking lot information including position information of a parking lot and an area or parking capacity of the parking lot, and
when the application is an application for providing a function for displaying on the mobile terminal a direction or a distance from a current position information of the mobile terminal to the location where the vehicle is parked,
the controller judges that transmission of the parking position information is permitted when one of either the area or the parking capacity of the parking lot corresponding to the location where the vehicle parked is equal to or above predetermined values.

6. The vehicle controller of claim 1, wherein
the memory stores a number of times of parking at the location where the vehicle is parked, and
the controller judges that the parking position information is to be transmitted until a number of times of parking at the location where the vehicle is parked reaches a predetermined number of times, while after the number of times exceeds the predetermined number of times of parking at the location where the vehicle is parked, the controller judges whether to transmit the parking position information at the parking start based on the execution history.

7. The vehicle controller of claim 1, wherein
in a case where an application for executing an antitheft function of the vehicle is included among applications that are installed in the mobile terminal, the controller judges that the parking position information is to be transmitted, while in another case where the application for executing the antitheft function is not included, the controller judges whether to transmit the parking position information based on the execution history.

8. A vehicle control system comprising:
a vehicle controller;
a mobile terminal that stores an application using parking position information; and
an information processor that obtains the parking position information from the vehicle controller and that transmits the parking position information to the mobile terminal,
the vehicle controller being installed in a vehicle and transmitting the parking position information to the information processor, which is located outside the vehicle, upon detection of parking start of the vehicle, the vehicle controller including:
a communicator that communicates with the information processor by transmitting and receiving information;
a detector that detects the parking start of the vehicle;
a position-information-obtaining-part that obtains the parking position information, the parking position information being a location where the vehicle is parked;
a memory that stores an execution history of the application that is installed in the mobile terminal which communicates with the information processor, and that uses the parking position information; and
a controller that judges whether to transmit the parking position information based on the execution history, when the parking start of the vehicle is detected by the detector, the execution history being information that associates the parking position information with a number of times of the application executed at the location where the vehicle is parked.

* * * * *